(12) United States Patent
Takatori

(10) Patent No.: US 11,442,315 B2
(45) Date of Patent: Sep. 13, 2022

(54) LIQUID CRYSTAL DISPLAY DEVICE COMPRISING A FIRST PIXEL FOR DISPLAYING A FIRST-VIEWPOINT IMAGE AND A SECOND PIXEL FOR DISPLAYING A SECOND-VIEWPOINT IMAGE

(71) Applicant: TIANMA MICROELECTRONICS CO., LTD., Shenzhen (CN)

(72) Inventor: Kenichi Takatori, Kanagawa (JP)

(73) Assignee: TIANMA MICROELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 17/391,333

(22) Filed: Aug. 2, 2021

(65) Prior Publication Data

US 2022/0019111 A1 Jan. 20, 2022

Related U.S. Application Data

(62) Division of application No. 15/588,856, filed on May 8, 2017, now Pat. No. 11,106,090, which is a division
(Continued)

(30) Foreign Application Priority Data

Feb. 8, 2011 (JP) .................................. 2011-025474
Dec. 27, 2011 (JP) .................................. 2011-285586

(51) Int. Cl.
 *G02F 1/1337* (2006.01)
 *G02F 1/13* (2006.01)
 (Continued)

(52) U.S. Cl.
 CPC ...... *G02F 1/133753* (2013.01); *G02F 1/1323* (2013.01); *G02F 1/13712* (2021.01); *G02F 1/133742* (2021.01); *G02F 1/133757* (2021.01)

(58) Field of Classification Search
 CPC . G02F 1/139; G02F 1/133757; G02F 1/13712
 See application file for complete search history.

(56) References Cited

U.S. PATENT DOCUMENTS 7,808,593 B1 * 10/2010 Kim .................. G02F 1/133788
 349/123
2006/0098281 A1 5/2006 Fukushima et al.
(Continued)

FOREIGN PATENT DOCUMENTS

CN 101568875 A 10/2009
CN 101893788 A 11/2010
(Continued)

OTHER PUBLICATIONS

Communication dated Feb. 11, 2015, issued by the State Intellectual Property Office in the People's Republic of China in corresponding application No. 201210029655.2.
(Continued)

*Primary Examiner* — Paul C Lee
(74) *Attorney, Agent, or Firm* — Sughrue Mion, PLLC

(57) ABSTRACT

To provide a vertical alignment liquid crystal display device capable of achieving a high-definition image display. Tilt directions of liquid crystal molecules when a voltage is applied are within a plane that is in parallel to a border between a first pixel and a second pixel, and are different by 180 degrees between the first and second pixels. The first pixel is constituted with three sub-pixels for R, G, and B arranged in a direction in parallel to the border. Similarly, the second pixel is constituted with three sub-pixels for R, G, and B. The tilt directions of the liquid crystal molecules when a voltage is applied are different by 180 degrees from each other between the sub-pixels for R of the first and
(Continued)

second pixels, between the sub-pixels for G of the first and second pixels, and between the sub-pixels for B of the first and second pixels.

3 Claims, 68 Drawing Sheets

Related U.S. Application Data of application No. 13/367,966, filed on Feb. 7, 2012, now Pat. No. 9,678,388.

(51) Int. Cl.
    *G02B 30/27*     (2020.01)
    *G02F 1/137*     (2006.01)

(56) References Cited

U.S. PATENT DOCUMENTS

| | | |
|---|---|---|
| 2006/0250556 A1 | 11/2006 | Kataoka et al. |
| 2009/0279005 A1 | 11/2009 | Fukushima et al. |
| 2009/0284702 A1* | 11/2009 | Seo .................. G02F 1/133753 349/128 |
| 2010/0039418 A1 | 2/2010 | Chen et al. |
| 2010/0156947 A1 | 6/2010 | Moon et al. |
| 2010/0157223 A1* | 6/2010 | Shin .................. G02F 1/133753 349/187 |
| 2010/0208183 A1* | 8/2010 | Kim .................. C09K 19/12 428/1.23 |
| 2012/0008055 A1* | 1/2012 | Chen .................. G02B 30/27 348/51 |
| 2013/0208216 A1* | 8/2013 | Hayano .................. G02F 1/133753 349/96 |

FOREIGN PATENT DOCUMENTS

| | | |
|---|---|---|
| GB | 2405518 A | 3/2005 |
| GB | 2 426 352 A | 11/2006 |
| JP | 2004-302315 A | 10/2004 |
| JP | 2005-208567 A | 8/2005 |
| JP | 2008-261980 A | 10/2008 |
| JP | 2008-268733 A | 11/2008 |
| JP | 2010-146008 A | 7/2010 |
| WO | 2006/109498 A1 | 10/2006 |
| WO | 2008/069181 A1 | 6/2008 |
| WO | 2009/101734 A1 | 8/2009 |

OTHER PUBLICATIONS

Communication dated Jun. 23, 2014, issued by the European Patent Office in counterpart European application No. 13195704.5.
Communication dated Sep. 1, 2015 from the Japanese Patent Office in counterpart application No. 2011-285586.
Extended European Search Report dated Sep. 26, 2012, issued by the European Patent Office in counterpart European Application No. 12153969.6.

* cited by examiner

FIG. 34
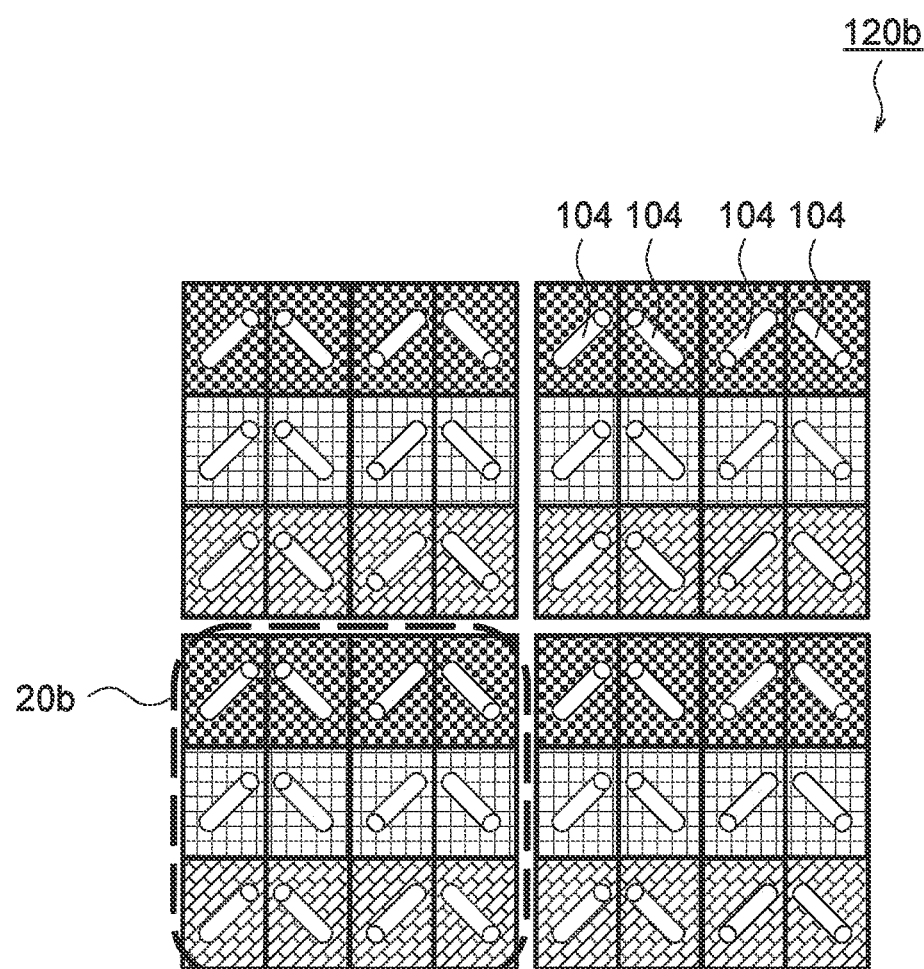
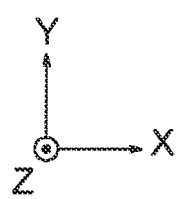

FIG. 36
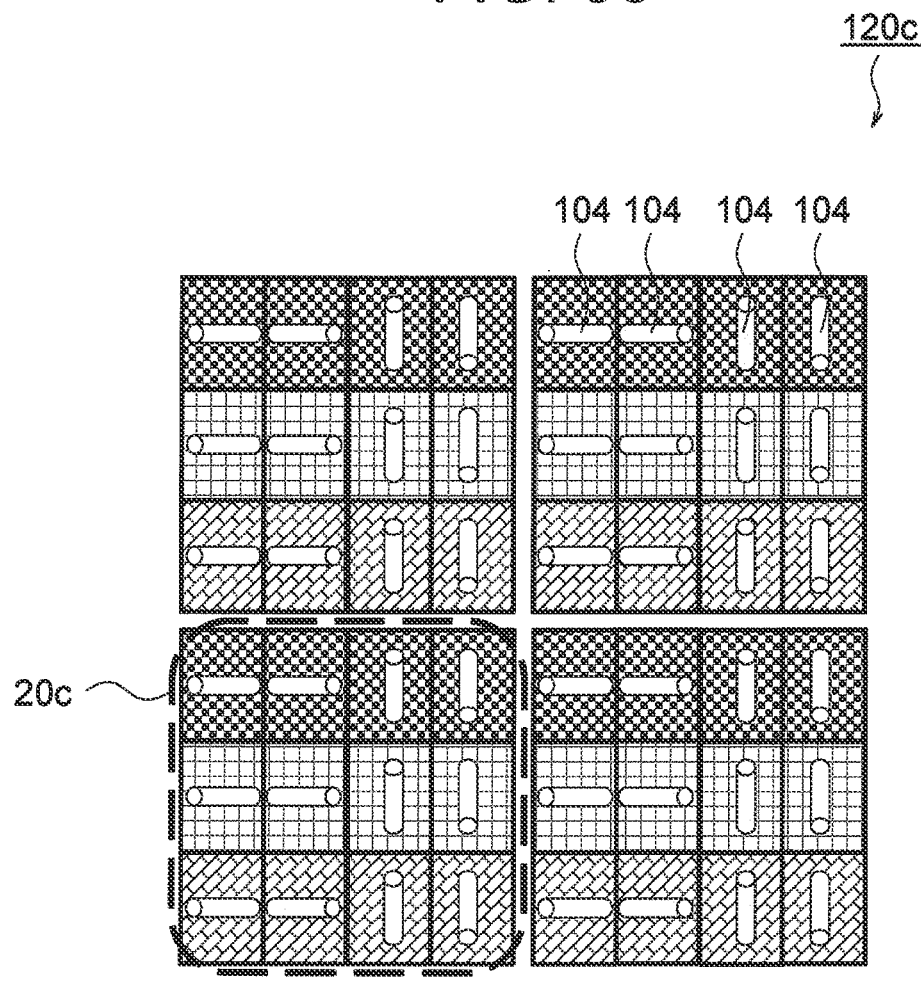
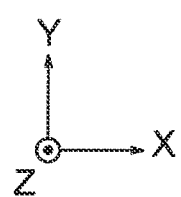

LIQUID CRYSTAL DISPLAY DEVICE COMPRISING A FIRST PIXEL FOR DISPLAYING A FIRST-VIEWPOINT IMAGE AND A SECOND PIXEL FOR DISPLAYING A SECOND-VIEWPOINT IMAGE

CROSS-REFERENCE TO RELATED APPLICATIONS

This is a divisional application of U.S. patent application Ser. No. 15/588,856, filed on May 8, 2017, which is a divisional of U.S. patent application Ser. No. 13/367,966, filed on Feb. 7, 2012 and issued as U.S. Pat. No. 9,678,388 on Jun. 13, 2017, which claims the benefit of priority from Japanese patent application No. 2011-025474, filed on Feb. 8, 2011, and Japanese patent application No. 2011-285586, filed on Dec. 27, 2011, the disclosures of which are incorporated herein in their entirety by reference.

BACKGROUND OF THE INVENTION

1. Field of the Invention

The present invention relates to a liquid crystal display device. More specifically, the present invention relates to a technique for achieving a high-definition display in a device which displays different images towards each of a plurality of viewpoints.

2. Description of the Related Art

In accordance with developments in mobile phones and information terminals, size reduction and high-definition imaging of image display devices are being advanced. In the meantime, as an image display device having a new added value, image display devices with which an observer can visually recognize different images depending on observing positions, i.e., an image display device with which different images can be visually recognized at a plurality of viewpoints and a stereoscopic image display device with which an observer can visually recognize an image three-dimensionally by making different images as parallax images on left and right sides, are drawing attentions.

As a method for proving different images from each other towards a plurality of viewpoints, there is known a method which displays an image by interlacing image data for each of viewpoints on a display panel, separates the displayed interlaced image by an optical separating module constituted with a lens and a barrier (a light-shielding plate) having slits, and provides the images to the respective viewpoints. The principle of image separations is implemented by restricting pixels viewed in each of viewpoint directions by using an optical module such as a barrier having slits or a lens. As the image separation module, generally used are a parallax barrier constituted with a barrier having a great number of stripe slits and a lenticular lens in which a great number of cylindrical lenses exhibiting the lens effect in one direction are arranged.

The stereoscopic image display device using the optical image separating module is suited to be loaded on a terminal device such as a mobile phone in respect that it is not necessary for users to wear special eyeglasses so that the users are free from having a trouble of wearing the eyeglasses. Portable phones on which a stereoscopic image display device constituted with a liquid crystal panel and a stereoscopic image display device have already been developed into manufactured products.

With the above-described method, i.e., with the stereoscopic image display device which provides different images from each other towards a plurality of viewpoints by using an optical separating module, there are cases where borders between images are viewed dark when the image to be visually recognized is switched because the viewpoint position of the observer is shifted. This phenomenon is caused due to a fact that a non-display area (a light-shielding part called as a black matrix in general in a liquid crystal panel) between the pixels for each of the viewpoints is visually recognized. The above-described phenomenon caused in accordance with the shift in the viewpoint of the observer does not occur with a general stereoscopic image display device that has no optical separating module. Thus, the observer feels a sense of discomfort or deterioration of the display quality for the above-described phenomenon that occurs in a multi-viewpoint stereoscopic image display device or a stereoscopic image display device having an optical separating module. This is a phenomenon generally called as "3D moire".

In order to improve the issue caused due to the optical separating module and the light-shielding part, there is proposed a stereoscopic image display device which suppresses the deterioration of the display quality through devising shapes and layout of the pixel electrode and the light-shielding part of the display panel (e.g., Japanese Unexamined Patent Publication 2005-208567 (FIG. 37, etc.) (Patent Document 1).

FIG. 50 is a plan view showing a display panel of a display device disclosed in Patent Document 1. In FIG. 50, drawn are cylindrical lenses 1003a, first viewpoint pixels 1041, aperture parts 1075, wirings 1070, second viewpoint pixels 1042, light-shielding parts 1076, longitudinal direction 1011, lateral direction 1012, and the like. In the display device disclosed in Patent Document 1, the proportion of the light-shielding parts (the wiring 1070 and the light-shielding part 1076) and the aperture parts 1075 is substantially constant, when a display panel sectional view is assumed along the longitudinal direction that is vertical to the arranging direction of the cylindrical lenses 1003a at an arbitrary point of the lateral direction 1012.

Therefore, even when the observer shifts the viewpoint in the lateral direction 1012 that is the separating direction of the image so that the observing direction becomes changed, the proportion of the light-shielding part to be visually recognized is substantially constant. That is, the observer does not observe only the light-shielding part from a specific direction and, further, the display is not viewed dark. In other words, deterioration of the display quality caused due to the light-shielding region can be prevented.

Now, "3D moire" and "3D crosstalk" will be described in details. In this Specification, periodic luminance unevenness (may also mean color unevenness in some cases) caused when displaying different videos in different angular directions, particularly fluctuation in the angular direction of luminance (luminance angular fluctuation), is defined as "3D moire", and an amount of leak of a image for the left or the right eye into the respective other eye is defined as "3D crosstalk".

In general, a stripe pattern generated when structures of different periods from each other interfere with each other is called as "moire fringes". The moire fringes are an interference fringes generated depending on the periodicity and pitch of the structures. In the meantime, "3D moire" is luminance unevenness generated due to an image forming characteristic of the image separating module. Thus, in this Specification, "3D moire" and "moire fringes" are used in a distinctive manner.

There may be cases where "3D moire" is not an issue, depending on the visually recognizing positions. However, when there is a large fluctuation in the luminance angular direction, it is considered that there is an influence that is not preferable for stereoscopic visions. Thus, it is preferable to set the luminance fluctuation to be equal to or lower than a prescribed amount. Further, when the amount of "3D crosstalk" becomes great, a stereoscopic sense is lost and an influence may be imposed on the observer such as fatigue of the eyes. Thus, it is preferable to set the crosstalk amount to be equal to or lower than a prescribed amount.

Incidentally, a multi-domain vertical aligned (referred to as "MVA" hereinafter) method as one of liquid crystal display modes exhibits a wide viewing angle characteristic, and is used widely (WO 2008069181 (Patent Document 4) and Japanese Unexamined Patent Publication 2010-146008 (Patent Document 5), for example). With this MVA method, a liquid crystal exhibiting negative dielectric anisotropy is aligned almost vertical to a substrate. Further, it is so designed that the tilt directions of the liquid crystal when a voltage is applied are divided into a plurality of different regions. The liquid crystal molecules in the divided regions compensate the viewing angle characteristics of each other, so that wide viewing angles can be acquired. There is Japanese Unexamined Patent Publication 2004-302315 (FIGS. 1A and 1B, etc.) (Patent Document 2) as an example of implementing a stereoscopic image display device by using the MVA method.

FIG. 51 is an explanatory chart of a stereoscopic image display device according to Patent Document 2. The right side of FIG. 51 is a lateral sectional schematic view of a main part of a liquid crystal panel 2017. The left side of FIG. 51 is an optical conceptual view 2018 which shows images (2010a, 2010b, 2011a, 2011b) reflected on the left and right eyes of the observer who looks at the liquid crystal panel 2017 from the front side. In the liquid crystal panel 2017, a protrusion 2006 is provided on a TFT (thin film transistor) substrate 204 as a domain restricting structure for locally restricting the alignment of liquid crystal molecules 2007. On both of left and right sides (on top and bottom on the sheet) of the protrusion 2006, pixel electrodes 2009A and 2009B formed with divided ITO (indium tin oxide) transparent electrodes are provided. In the meantime, a common electrode 2008 formed with an ITO transparent electrode is provided on a surface of a color filter substrate 2003 opposing to the TFT substrate 2004. A liquid crystal exhibiting negative dielectric anisotropy is inserted between the color filter substrate 2003 and the TFT substrate 2004. Further, a vertical alignment film (not shown) is provided to cover the surfaces of both of the opposing ITO transparent electrodes, respectively. Furthermore, polarization plates 2001 and 2002 are disposed on the surfaces of the color filter 2003 and the TFT substrate 2004, respectively, in a crossed-Nicol state. Individual signal voltages 2005A and 2005B are applied between the common electrode 2008 and the pixel electrodes 2009A, 2009B. The regions corresponding to the pixel electrodes 2009A and 2009B are domains 2000A and 2000B, respectively.

In a state where a voltage is not applied, the liquid crystal panel 2017 displays "black" because the liquid crystal molecules 2007 are aligned vertically on the surface of the ITO transparent electrodes. In accordance with an applied voltage, the liquid crystal molecules 2007 are tilted in the opposite directions from each other with respect to the protrusion 2006 as the domain restricting structure, thereby forming the domains 2000A and 2000B shown in the drawing. Under such alignment state, light at an angle close to be in parallel to the length direction of the liquid crystal molecules 2007 exhibits small deflection caused by the optical anisotropy. Thus, the transmission amount of the light becomes small, so that it is radiated as weak light. In the meantime, light at an angle close to be vertical to the length direction of the liquid crystal molecules 2007 exhibits large deflection caused by the optical anisotropy. Thus, the transmission amount of the light becomes large, so that it is radiated as strong light. In FIG. 51, the weak light radiated from the domain 2000A is shown by a dotted-line arrow 2013, and the weak light radiated from the domain 2000B is shown by a dotted-line arrow 2016. In the meantime, the strong light radiated from the domain 2000A is shown by a solid-line arrow 2015, and the strong light radiated from the domain 2000B is shown by a solid-line arrow 2014. Angle θ of the radiated light with respect to a normal 2019 of the liquid crystal panel 2017 is the viewing angle.

An image signal captured from a camera placed at the position of the right eye is sent to the domains 2000A of each pixel via an applied voltage 2005A simultaneously, while an image signal captured from a camera placed at the position of the left eye is sent to the domains 2000B of each pixel via an applied voltage 2005B simultaneously. Upon this, a bright image 2010b by the strong light 2014 radiated from each of the domains 2000B and a dark image 2010a by the weak light 2013 radiated from each of the domains 2000A are formed simultaneously on the retina of the left eye of the observer who looks at the liquid crystal panel 2017 from the front side. In the meantime, a bright image 2011a by the strong light 2016 radiated from each of the domains 2000A and a dark image 2011b by the weak light 2016 radiated from each of the domains 2000B are formed simultaneously on the retina of the right eye. However, only the bright images 2010b and 2011a on the left and right eyes are fused in the head and the dark images by the weak light are unconsciously ignored, so that the observer who looks at the liquid crystal panel 2017 from the front side see an optical illusion as if a stereoscopic image emerges on the liquid crystal panel 2017. In a moving picture, this illusion is more prominent. A condition under which such phenomenon occurs is that the light amount of the weak light is equal to or less than ½ of the light amount of the strong light. Desirably, it is equal to or less than ⅒.

In the meantime, as an example of a case which achieves a multiple view display by using a vertical alignment as a liquid crystal display mode, there is Japanese Unexamined Patent Publication 2008-261980 (FIGS. 1A and 1B, etc.) (Patent Document 3).

A multiple view display 3001 shown in FIG. 52 and FIGS. 53A and 53B includes: a liquid crystal panel 3004 including a display device 302 and an optical device 3003 provided integrally with the display device 3002; and a backlight, not shown, which radiates planar white light to the display device.

The display device 3002 is formed by interposing a liquid crystal layer 3007 between an array substrate 3005 and a counter substrate 3006 disposed by facing the array substrate 3005, which forms a rectangular display region including sub-pixels P as a plurality of pixels formed in matrix. Further, polarization plates 3008 and 3009 are laminated on the main surfaces on the outer side of the substrates 3005 and 3006, respectively.

The display device 3002 can display a plurality of different images by the use of a drive circuit, not shown. That is, among the plurality of sub-pixels P, two pixel groups are formed with a pixel group constituted with a plurality of sub-pixels Pa and a plurality of sub-pixels Pb located alternately by one column each in the direction such as the left-and-right directions towards which the image is separated by the parallax, for example. This makes it possible to display individual images by each of the pixel groups.

The array substrate 3005 includes a plurality of scan lines 3012 and a plurality of signal lines 3014 on a transparent substrate 3011 in a grating form, and a TFT 3015 is provided at each intersection between the scan line 3012 and the signal line 3014. Further, an insulating layer 3016 is provided to cover the TFT 3015, a pixel electrode 3018 provided on the insulating layer 3016 is electrically connected to the TFT 3015 via a contact hole 3017 provided to the insulating layer 3016, and a vertical alignment film 3019 for aligning liquid crystal molecules LC that constitute the liquid crystal layer 3007 is formed on the pixel electrode 3018.

The pixel electrode 3018 is formed with ITO, and formed for each sub-pixel. Further, a slit S is formed between the neighboring pixel electrodes 3018, respectively. The TFT 3015 is constituted with a source electrode 3015s, a drain electrode 3015d, a gate electrode 3015g, a semiconductor layer 3015p, and the like.

In the counter substrate 3006, a color filter layer 3022 having colored layers 3022r, 3022g, and 3022b corresponding to the three primary colors RGB is formed on the transparent substrate 3021. Further, on the color filter layer 3022, a counter electrode 3023 formed with ITO is formed at positions corresponding to each sub-pixel P. Three sub-pixels P corresponding to the colored layers 3022r, 3022g, and 3022b of the color filter layer 3022 constitute a single pixel unit.

Further, a rib-shaped counter protrusion 3025 is formed, respectively, at prescribed positions of the counter electrodes 3023. Furthermore, a vertical alignment film 3026 for aligning the liquid crystal molecules LC is formed by covering the counter electrodes 3023 and the counter protrusions 3025.

The sectional view of the counter protrusion 3025 is formed in a triangular shape whose tip is projected towards the array substrate 3005 side, and formed linearly along the end of two sub-pixels Pa, Pb which are neighboring to each other on the left and right sides and corresponding to different images. Therefore, the counter protrusion 3025 is provided for every two sub-pixels Pa, Pb.

The liquid crystal layer 3007 is of an MVA type which exhibits negative dielectric anisotropy. Further, the liquid crystal molecules LC among the liquid crystal materials constituting the liquid crystal layer 3007 are designed to be aligned along the right direction of FIG. 52 for the sub-pixel Pa and the left direction of FIG. 52 for the sub-pixel Pb, i.e., along the opposite directions for the neighboring sub-pixels Pa and Pb, under a state where a voltage is applied between the pixel electrode 3018 and the counter electrode 3023. In order to achieve such alignment design, utilized are the existence of the counter protrusions 3025, effects such as the tilt of the electric field on the outer side of the slits S by the electric field discretion effect between the pixel electrode 3018 and the counter electrode 3023, etc. That is, The alignment directions of the liquid crystal molecules LC is set by corresponding to the viewing angle directions from which the different display images are visually recognized, and the liquid crystal layer 3007 is divided into a plurality of domains for each of the neighboring sub-pixels Pa and Pb.

In the meantime, the optical device 3003 separates the image so that each of the images displayed on the display device 3002 is visually recognized only along prescribed directions. In the optical device 3003, a parallax barrier layer 3032 as the light-shielding part and a slit part 3033 as a transmission part are formed on the transparent substrate 3031. Further, the optical device 3003 is bonded to the display surface side that is the opposite side of the liquid crystal layer 3007 of the transparent substrate 3021 that constitutes the counter substrate 3006 via an adjusting layer 3034 as a refractive index adjusting layer formed by a transparent adhesive or the like.

The parallax barrier layer 3032 is for shielding the light of the images by pixel groups in the direction different from the viewing angle direction, and it is formed with chrome as a non-light transmitting metal or a resin into which a black pigment such as carbon black is dispersed. The parallax barrier layer 3032 is formed by corresponding to a position between the two sub-pixels Pa and Pb which are neighboring to each other on the left and right sides and corresponding to different images. Therefore, one each of the parallax barrier layer 3032 is provided for a single domain at a position superimposing on (opposing to) the counter protrusion 3025.

Through writing different signals with a pixel group constituted with a plurality of sub-pixels Pa and a pixel group constituted with a plurality of sub-pixels Pb located alternately by each column along the direction (left-and-right direction of FIG. 52) that separates an image by the parallax, the state of the liquid crystal molecules LC of each domain changes from the vertical state to the tilted state according to the image signals.

As a result, when viewed from a prescribed viewing angle direction L1, an image displayed with the pixel group of the plurality of sub-pixels Pb with a surface light radiated from a backlight is shielded at the parallax barrier layer 3032, and the image displayed with the pixel group of the plurality of sub-pixels Pa is visually recognized from the slit parts 3033 via each of the colored layers 3022r, 3022g, and 3022b of the color filter layer 3022.

In the meantime, when viewed from a prescribed viewing angle direction R1, an image displayed with the pixel group of the plurality of sub-pixels Pa with a surface light radiated from a backlight is shielded at the parallax barrier layer 3032, and the image displayed with the pixel group of the plurality of sub-pixels Pb is visually recognized from the slit parts 3033 via each of the colored layers 3022r, 3022g, and 3022b of the color filter layer 3022.

At this time, light passed through the color filter layer 3022 of each of the colors RGB is visually recognized in each of the viewing angle directions L1 and R1, so that images of those colors are mixed and visually recognized as a color image.

When the viewing angle is largely shifted and viewed from the viewing angle directions L2 and R2 shifted in the left-and-right directions of the drawing with respect to the viewing angle directions L1 and R1, respectively, the liquid crystal molecules LC are aligned in the reverse directions and viewed only as black even when the sub-pixel Pa or the sub-pixel Pb neighboring to each other comes into the viewing angle. Thus, it is not likely to be visually recognized as image crosstalk.

With the stereoscopic image display device depicted in Patent Document 2, it is not possible to implement the stereoscopic display intended by the document in a fine manner.

Regarding the viewing angle characteristics of the vertical alignment liquid crystal, Patent Document 2 utilizes the region where the characteristics become asymmetric when the angles are fixed to given azimuth directions (e.g., 0-degree and 180-degree directions, 90-degree and 270-degree directions within a display face) and the angle of depression (polar angle when expressed as polar coordinates) is changed. Such azimuthal angle directions normally include the direction to which the liquid crystal molecules are tilted by the electric field. Regarding the vertical alignment liquid crystal of this case, FIG. 54 shows an example of the viewing angle characteristics in the polar angle direction of the luminance. In this drawing, shown are the viewing angle characteristics in the polar angle directions (written as the tilt angles in the drawing) of the luminance when the voltage to be applied to the liquid crystal is changed as 0 V, 2 V, 3 V, 4 V, and 5 V. Considering the condition of a voltage of 3 V, the luminance at the tilt angle of 30 degrees is equal to or higher than 30, and the luminance at the tilt angle −30 degrees is about 3. When those are used in combination, the condition of the light amount equal to or less than 1/10 described in the section of related technique regarding Patent Document 2 can be satisfied.

However, considering the condition of a voltage of 5 V, the luminance at the tilt angle of 30 degrees is equal to or higher than 30, and the luminance at the tilt angle −30 degrees is about 25. Thus, even the condition of the light amount equal to or less than ½ described in the section of the related technique cannot be satisfied. Further, considering the condition of a voltage of 2 V, the luminance at the tilt angle of 30 degrees is about 0.2, and the luminance at the tilt angle −30 degrees is about 5.5. Thus, it is completely opposite characteristic from the condition of the light amount described in the section of the related technique. As described, for satisfying the condition of the light amount depicted in Patent Document 2 by using the vertical alignment liquid crystal, the voltages are limited to an extremely narrow range. Therefore, it is not practical, and a fine stereoscopic display cannot be achieved.

With the multiple view display depicted in Patent Document 3, it is not possible to achieve the multiple views intended by the document in a fine manner.

As in the case of Patent Document 2, Patent Document 3 utilizes the fact that the viewing angle characteristics in a given azimuth angle direction of the vertical alignment liquid crystal become asymmetric. Regarding a case where a parallax barrier layer is provided in the vertical alignment liquid crystal as depicted in Patent Document 3, FIG. 55 shows an example of the viewing angle characteristics in the polar angle direction of the luminance. Note here that in the barrier layer, the transmission region and the non-transmission region are arranged to be disposed alternately in the direction where the pixel Pa and the pixel Pb are disposed alternately as depicted in the section of the related technique regarding Patent Document 3. That is, it is so designed that the transmission region and the non-transmission region of the barrier layer are arranged alternately in the direction that is orthogonal to the border between the pixel Pa and the pixel Pb as a set.

In the chart, two conditions of 2 V and 5 V are shown as the voltage to be applied to the liquid crystal. A case of shifting the viewing angle greatly to the angle of 40 degrees or more will be investigated. The luminance is close to 35 at 5 V between 40 degrees and 45 degrees. In the meantime, the luminance is about 18 at 5 V between 40 degrees and 50 degrees. The luminance is decreased about to a half from 45 degrees to 50 degrees. However, it is not deteriorated down to a state of black display as mentioned in the section of the related technique and the image can be fully recognized, thereby generating image crosstalk. That is, in the vicinity of 45 degrees, the luminance is equal to or higher than 10, and crosstalk of about 30% for the maximum luminance of about 35 is generated. Further, when the characteristic at a voltage of 2 V is considered, the luminance from 40 degrees to 45 degrees is about 1.3, while the luminance from 45 degrees to 50 degrees is about 16. This relationship is completely opposite from the characteristic of 5 V, and the state of the image crosstalk becomes greatly different by a halftone. This means that a proper image cannot be recognized. As described, it is difficult to satisfy the condition of Patent Document 3 by using the vertical alignment liquid crystal and the barrier layer, and a fine multiple view display cannot be achieved.

A structure which achieves a wide viewing angle stereoscopic image display by combining the technique depicted in Patent Document and the MVA method will be investigated, although it is not a related technique. Considered is a case of achieving 2-viewpoints color stereoscopic image display device using a right-eye image and a left-eye image is achieved by the pixel structure of FIG. 50. In that case, it is considered to employ a structure that uses a display unit, which is constituted with six sub-pixels of three colors lined along the longitudinal direction as the right-eye sub-pixels and the left-eye sub-pixels as in FIG. 56A by corresponding to each of the colors of red, blue, and green by using a color filter corresponding to each of those colors, as the minimum repeating unit. Symbols are allotted to each of the sub-pixels by using R for the right-eye image, L for the left-eye image, r for red, b for blue, and g for green. For example, Rr is a right-eye red sub-pixel, and Lb is left-eye blue sub-pixel.

In a case of employing the MVA method for the pixel alignment, it is necessary to divide each sub-pixel into four domains having different liquid crystal alignment. This is for improving the viewing angle characteristic when viewing the display face from the top and bottom as well as left-and-right directions. That is, a single display unit, i.e., the six sub-pixels, is divided into twenty-four domains in total. This divided state can be conceptually shown as in FIG. 56B. For example, the sub-pixel Lr is constituted with four domains Lr1, Lr2, Lr3, and Lr4.

However, each of the regions becomes small with this structure, so that it is difficult to divide it into different liquid crystal alignment. This is because it becomes difficult to control the structure and the processing for dividing to the different liquid crystal alignment in small regions. For example, as such structure, there is a structure which controls the electric fields of the projection structure projected from the substrate surface, the slit, the projection part, or the like of the electrodes. As such processing, there are light alignment processing, surface anisotropic processing, i.e., surface processing such as mask rubbing or the like using a mask, etc. Another reason is that the extremely small divided regions of different liquid crystal alignment tend to contract the border towards the minimum energy state so that the energy in the border between the divisions becomes small. Thus, as the border is contracted, the divided regions themselves may rapidly become contracted. Therefore, it is desired for the divided alignment regions to be in a size of more than a specific size.

As a result, when high definition of the pixels is advanced, it becomes extremely difficult to employ the MVA method with the pixel structure of Patent Document 1.

An exemplary object of the present invention is to provide a liquid crystal display device which is capable of achieving a stereoscopic display and a multi-view display with high definition and in a wide viewing angle range. The multi-view display is a display with which different images are observed depending on the observing directions. For example, it is used in a manner where information viewed from the right side of a display device and information viewed from the left side thereof is different. Further, an exemplary object of the present invention is to provide a liquid crystal display device which can achieve a stereoscopic display in which 3D moire and 3D crosstalk are decreased. Another exemplary object of the present invention is to provide a liquid crystal display device capable of switching a stereoscopic display and a multi-view display to a 2D single display, which can achieve the wide viewing angle characteristic in both the stereoscopic display as well as the multi-view display and the 2D single display. A yet another exemplary object of the present invention is to provide a liquid crystal display device capable of achieving a stereoscopic display and a multi-view display with a wide viewing angle range, which can be manufactured easily at a reduced cost.

SUMMARY OF THE INVENTION

The liquid crystal display device according to an exemplary aspect of the invention is a liquid crystal display device which is characterized to include a liquid crystal exhibiting negative dielectric anisotropy sandwiched between a pair of substrates, wherein liquid crystal molecules constituting the liquid crystal are initially aligned almost vertically to the pair of substrates, and display units each including at least a first pixel for displaying a first-viewpoint image and a second pixel for displaying a second-viewpoint image are arranged in matrix. The tilt directions of the liquid crystal molecules when a voltage is applied are within a plane that is in parallel to a border between the first pixel and the second pixel, and are different from each other by 180 degrees between the first pixel and the second pixel.

BRIEF DESCRIPTION OF THE DRAWINGS

FIG. 34 is a plan view showing Comparative Example 2-2 of the second exemplary embodiment;

FIG. 36 is a plan view showing Comparative Example 2-3 of the second exemplary embodiment;

FIGS. 57A, 57B, 57C and 57D show plan views, in which FIG. 57A is a first case, FIG. 57B is a second case, FIG. 57C is a third case, and FIG. 57D is a fourth case;

DETAILED DESCRIPTIONS OF THE PREFERRED EMBODIMENTS

Hereinafter, modes for embodying the present invention (referred to as "exemplary embodiments" hereinafter) will be described by referring to the accompanying drawings.

First Exemplary Embodiment

Figure 1A:
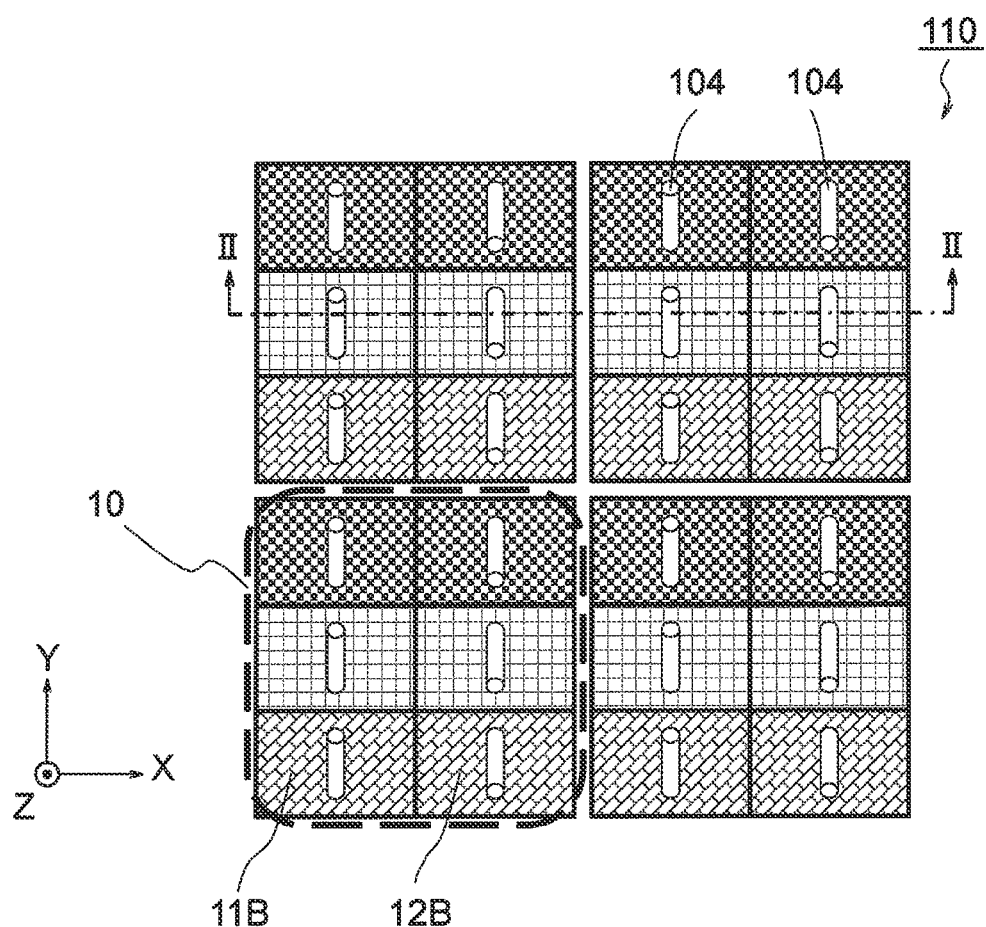
FIG. 1A is a plan view showing a liquid crystal display device according to a first exemplary embodiment.
Figure 1B:
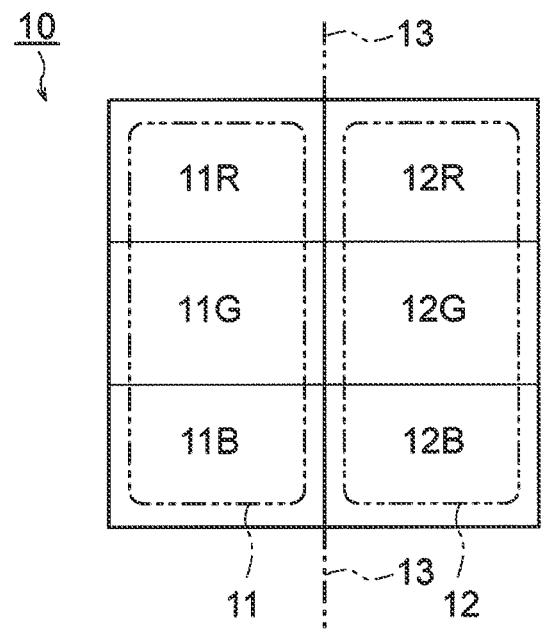
FIG. 1B is a schematic view showing a display unit of FIG. 1A.
Figure 2:
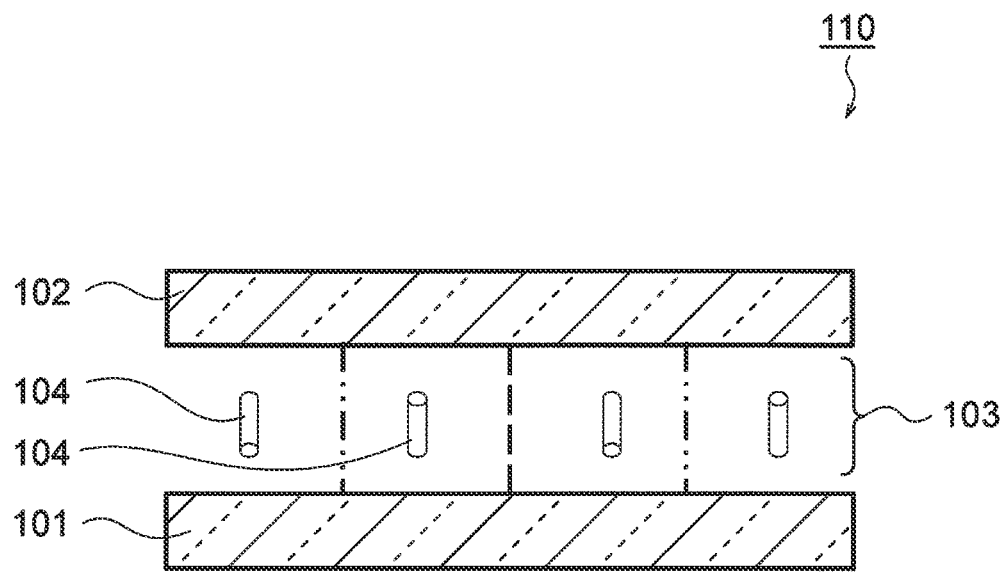
FIG. 2 is a sectional view taken along a line II-II of FIG. 1A.

FIG. 1A is a plan view showing a liquid crystal display device according to a first exemplary embodiment, and FIG. 1B is a schematic view showing a display unit of FIG. 1A. FIG. 2 is a sectional view taken along a line II-II of FIG. 1A. Explanations will be provided based on those drawings.

In a liquid crystal display device 110 according to the first exemplary embodiment, a liquid crystal 103 exhibiting negative dielectric anisotropy is sandwiched between a pair of substrates 101 and 102, liquid crystal molecules 104 constituting the liquid crystal 103 are initially aligned almost vertically to the pair of substrates 101 and 102, and display units 10 each including at least a first pixel 11 for displaying an image for a first viewpoint and a second pixel 12 for displaying an image for a second viewpoint are arranged in matrix.

The tilting directions of the liquid crystal molecules 104 when a voltage is applied are within a plane in parallel to a border 13 between the first pixel 11 and the second pixel 12, and different by 180 degrees from each other between the first pixel 11 and the second pixel 12.

The first pixel 11 is constituted with sub-pixels 11R, 11G, and 11B arranged in a direction in parallel to the border 13, and the second pixel 12 is constituted with sub-pixels 12R, 12G, and 12B arranged in the same manner. The tilt directions of the liquid crystal molecules 104 when a voltage is applied are different by 180 degrees from each other between the sub-pixels 11R and 12R, different by 180 degrees from each other between the sub-pixels 11G and 12G, and different by 180 degrees from each other between the sub-pixels 11B and 12B.

Figure 57A:
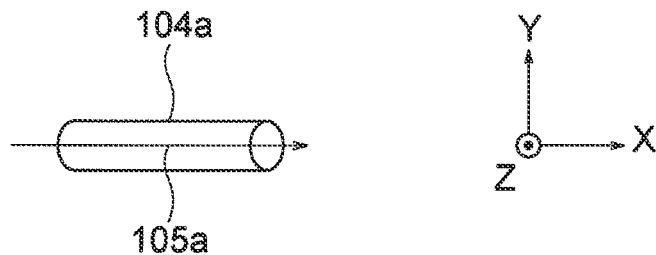
Figure 57B:
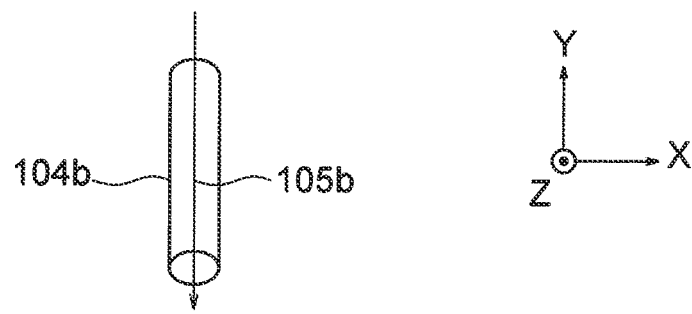
Figure 57C:
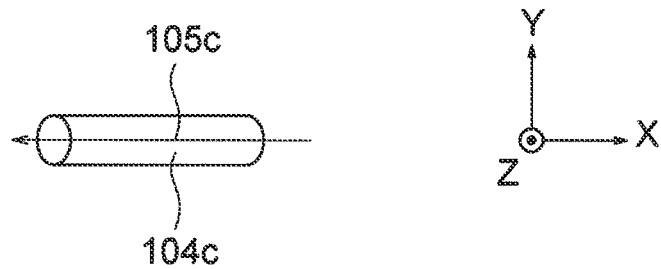
Figure 57D:
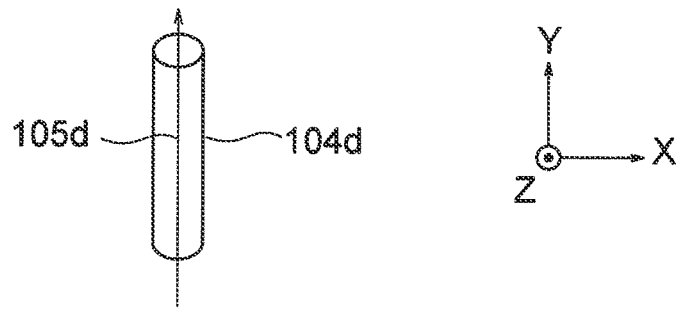

Now, the tilt directions of the liquid molecules 104 will be described by referring to FIGS. 57A, 57B, 57C and 57D. In FIG. 57A, it is so defined that a positive direction of Z-axis, i.e., the direction towards the front side of sheet, as "a sheet upward direction", and a negative direction of the Z-axis, i.e., the direction towards the far side of the sheet, as "a sheet downward direction". In this case, a tilt direction 105a of a liquid crystal molecule 104a is a direction from one end of the sheet downward direction of the liquid crystal molecule 104a towards the other end of the sheet upward direction. When the X-axis direction is taken as a reference, a tilt direction 105a of the liquid crystal molecule 104a is 0 degree. Similarly, a tilt direction 105b of a liquid crystal molecule 104b in FIG. 57B is 90 degrees, a tilt direction 105c of a liquid crystal molecule 104c in FIG. 57C is 270 degrees, and a tilt direction 105d of a liquid crystal molecule 104d in FIG. 57D is 270 degrees. For example, the tilt direction 105a and the tilt direction 105b are different by 90 degrees, the tilt direction 105a and the tilt direction 105c are different by 180 degrees, and the tilt direction 105a and the tilt direction 105d are different by 90 degrees. Note that "the tilt direction of the liquid crystal molecules" may sometimes be called as "an alignment direction of the liquid crystal molecules".

Hereinafter, the first exemplary embodiment will be described in more details.

FIG. 1A is a plan view showing a part of the liquid crystal display device 110 of the first exemplary embodiment. Particularly, FIGS. 1A and 1B show display units 10 arranged in matrix. In this drawing, four display units 10 are illustrated for simplification. However, a greater number of display units are used normally. In the first exemplary embodiment, the display units 10 including the sub-pixels 11B, 11G, 11R for displaying the image for the first viewpoint and the sub-pixels 12B, 12G, 12R for displaying the image for the second viewpoint are arranged in matrix. This drawing shows a state where the liquid crystal molecules 104 are tilted by applying a voltage. That is, the alignment of the liquid crystal molecules 104 is expressed with cylinders, and an oval that is one end face of the cylinder is observed on the side where the molecules are tilted and raised from the sheet. At this time, the tilt directions of the liquid crystal molecules 104 are different by 180 degrees between the sub-pixels 11B, —for displaying the first-viewpoint image and the sub-pixels 12B, —for displaying the second-viewpoint image. Further, there are tilt directions of the liquid crystal molecules 104 within a plane in parallel to the border 13 between the sub-pixels 11B, —for displaying the first-viewpoint image and the sub-pixels 12B, —for displaying the second-viewpoint image within the display units 10, i.e., within a plane including the top-and-bottom direction of the drawing, which is orthogonal to the sheet.

In this drawing, the three sub-pixels 11B, —and the three sub-pixels 12B are drawn within the display unit 10. However, the number of sub-pixels is not limited only to such case. The three sub-pixels 11B, —and the three sub-pixels 12B drawn within the display unit 10 can be corresponded to each of the colors (three colors herein) of a case where the color display is achieved by using a color filter or the like, for example. In other words, this can be expressed as follows. That is, a single display unit 10 corresponds to one pixel to be selected or fused, a single sub-pixel 11B or a single sub-pixel 12B, for example, corresponding to each color corresponds to one dot to be selected, and a combination of a single sub-pixel 11B or a single sub-pixel 12B, for example, corresponding to each color corresponds to one dot to be fused.

The direction mentioned in the explanations above can also be defined by an angle measured towards the direction of the rise of the liquid crystal molecules 104 by the tilt from the X-axis direction or the Y-axis direction within an X-Y plane (i.e., within the sheet), provided that the origin of the right-hand system is taken at the centers of each of the sub-pixels 11B, —in the plan view, the right direction is the X-axis direction, the upper direction is the Y-axis direction, and the front direction of the sheet is the Z-axis direction. For example, in a case of the angle measured from the X-axis direction, the liquid crystal molecules of each of the sub-pixels 11B, —of FIG. 1A are aligned in the direction of −90 degrees (270 degrees) or 90 degrees. Further, the direction towards which the liquid crystal molecules 104 of the sub-pixels 11B, —for displaying the first-viewpoint image are tilted is −90 degrees (270 degrees), and the direction towards which the liquid crystal molecules 104 of the sub-pixels 12B, —for displaying the second-viewpoint image are tilted is 90 degrees. These directions are different by 180 degrees from each other.

FIG. 2 is a sectional view showing a part of the liquid crystal display device 110. This corresponds to a drawing acquired by observing the section taken along the line II-II of FIG. 1A from the bottom-side direction (minus direction of the Y-axis) of FIG. 1A. In the liquid crystal display device 110, a structure including the sub-pixels 11B, —for displaying the first-viewpoint image and the sub-pixels 12B, —for displaying the second-viewpoint image can be achieved by having the liquid crystal 103 sandwiched between the pair of substrates 101 and 102. For example, the substrate 101 is a TFT substrate, and the substrate 102 is a counter substrate.

Figure 3:
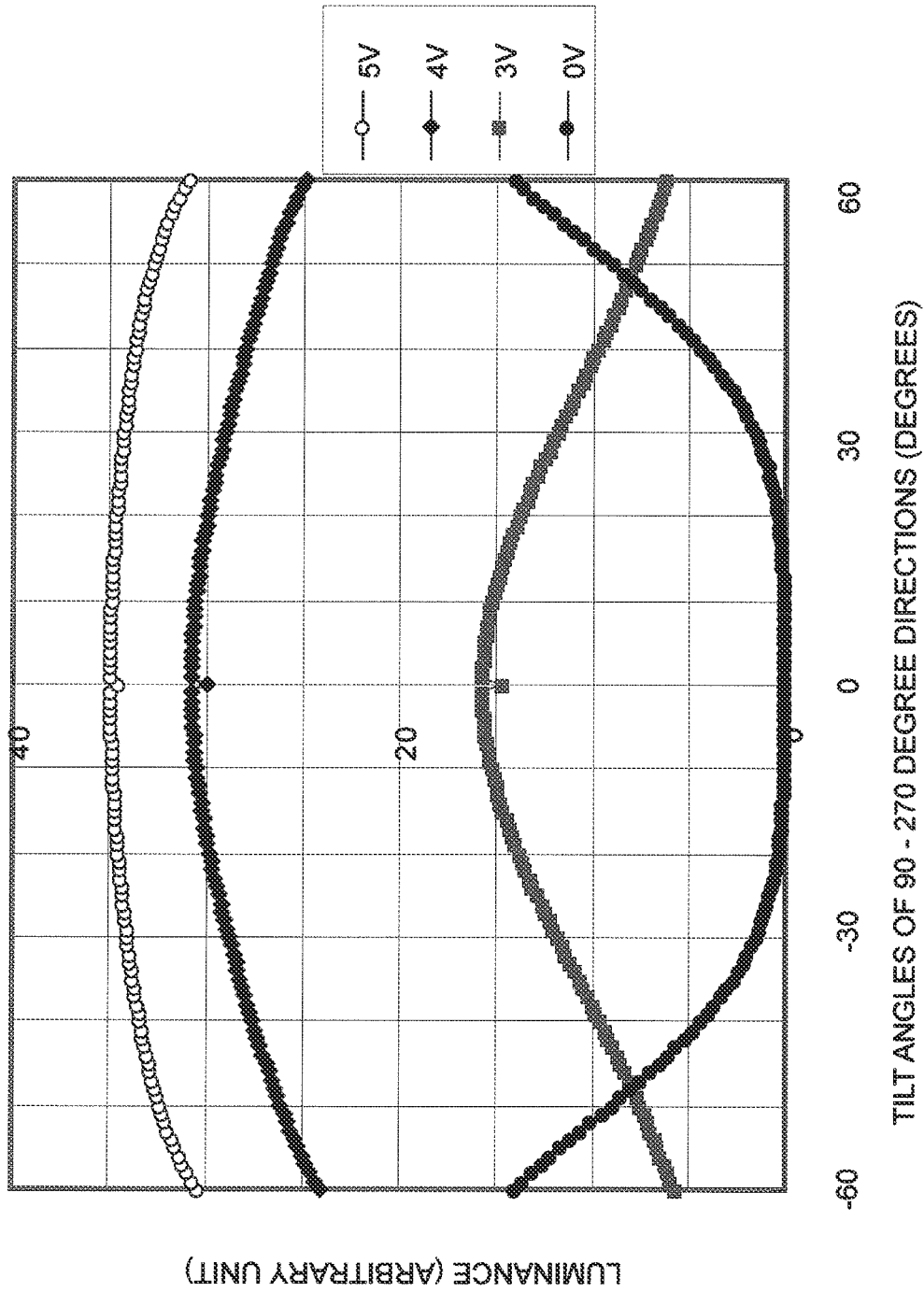
FIG. 3 is a graph showing a viewing angle characteristic for describing the operation effects of the liquid crystal display device according to the first exemplary embodiment.

FIG. 3 will be referred for describing the operation effects of the liquid crystal display device 110. FIG. 3 is a graph showing a viewing angle dependency of the luminance, when the angle is changed to the angle of depression (polar angle) of the vertical alignment liquid crystal. This graph shows the characteristic in a case of fixing to azimuth direction orthogonal to the tilt direction of the liquid crystal molecules 104 when a voltage is applied and changing the viewing angle to the polar angle direction. That is, in the case shown in FIGS. 1A and 1B, it is the viewing angle characteristic when the tilt angle is changed within a plane vertical to the border 13 (i.e., XZ plane) by taking the direction vertical to the sheet (i.e., the Z-axis direction) within the plane (XZ plane) vertical to the border 13 between the sub-pixels 11B for displaying the first-viewpoint image and the sub-pixels 12B, —for displaying the second-viewpoint image as the tilt angle of 0 degree. This graph shows the viewing angle characteristics in the polar angle (written as the tilt angle in the graph) direction of the luminance under four conditions of 0 V, 3 V, 4 V, and 5 V as the voltages to be applied to the liquid crystal.

Figure 54:
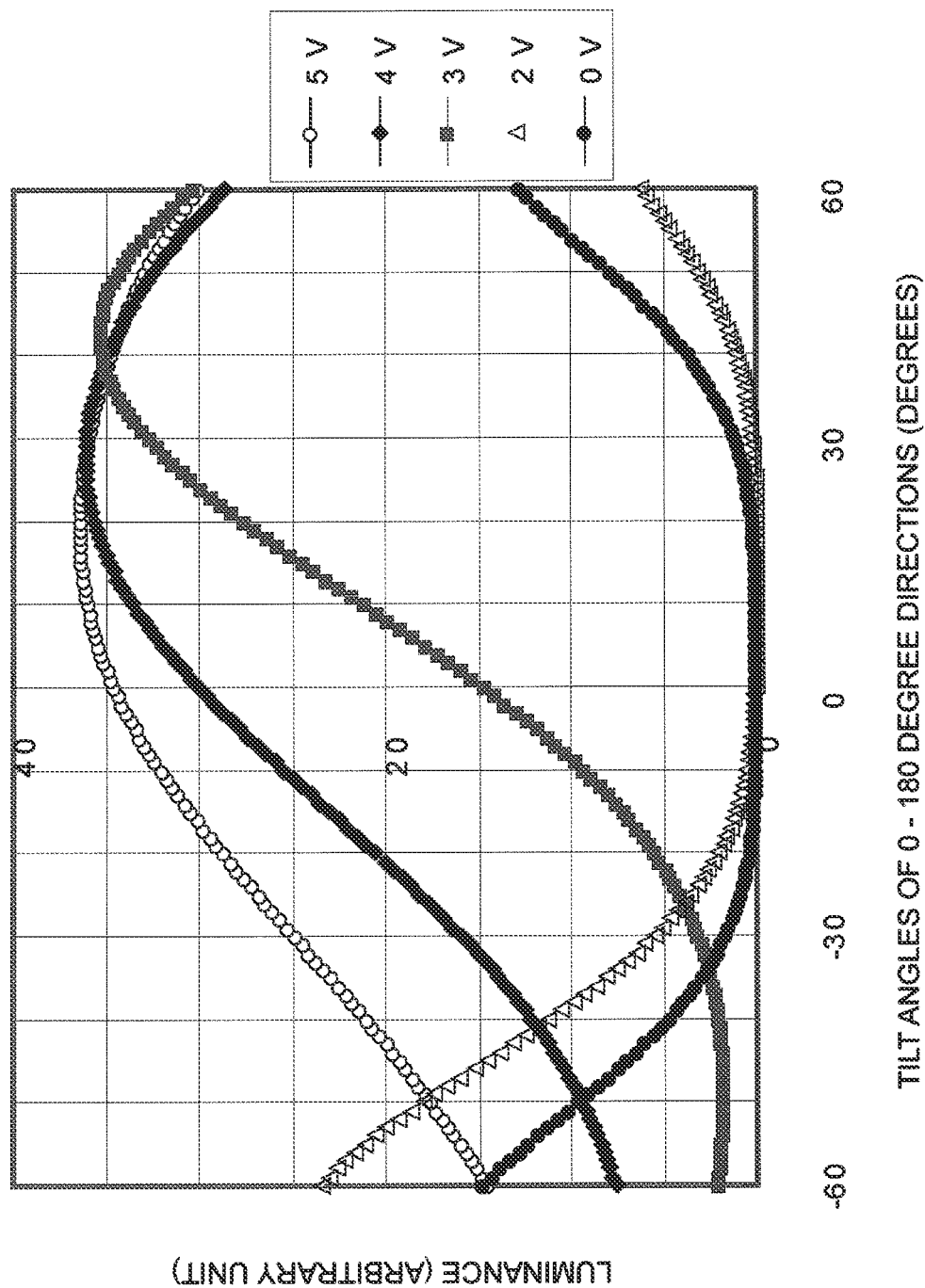
FIG. 54 is a graph showing a viewing angle characteristic of the stereoscopic image display of Patent Document 2.

The viewing angle characteristic shown in FIG. 3 is different by 90 degrees in the azimuth direction with respect to the viewing angle characteristic shown in FIG. 54 described above. FIG. 54 shows the viewing angle characteristic on the XZ plane, and the tilt direction of the liquid crystal molecules is within the XZ plane. The viewing angle characteristic in FIG. 54 is asymmetric on the positive side and the negative side of the tilt angle, whereas it is symmetric on the positive side and the negative side of the tilt angle in FIG. 3. The first exemplary embodiment uses the characteristic of positive side-negative side shown in FIG. 3 and the characteristic of negative side-positive side shown in FIG. 3 inverted by 180 degrees therefrom. As a result, a characteristic that is symmetric on the left and right sides can be acquired when the viewing angle is tilted in the left-and-right direction for the structure shown in FIG. 1A.

When achieving the stereoscopic display or the multi-view display by using the structure of the first exemplary embodiment, there is provided an optical element for distributing light from the pixels corresponding to each viewpoint towards each viewpoint. Described are operation effects of a case using an element for controlling the traveling directions of light as such optical element by providing a region transmitting light and a region not transmitting light, which is called as a parallax barrier or a barrier layer. The optical element will be described in details in Example 1 later.

Figure 4:
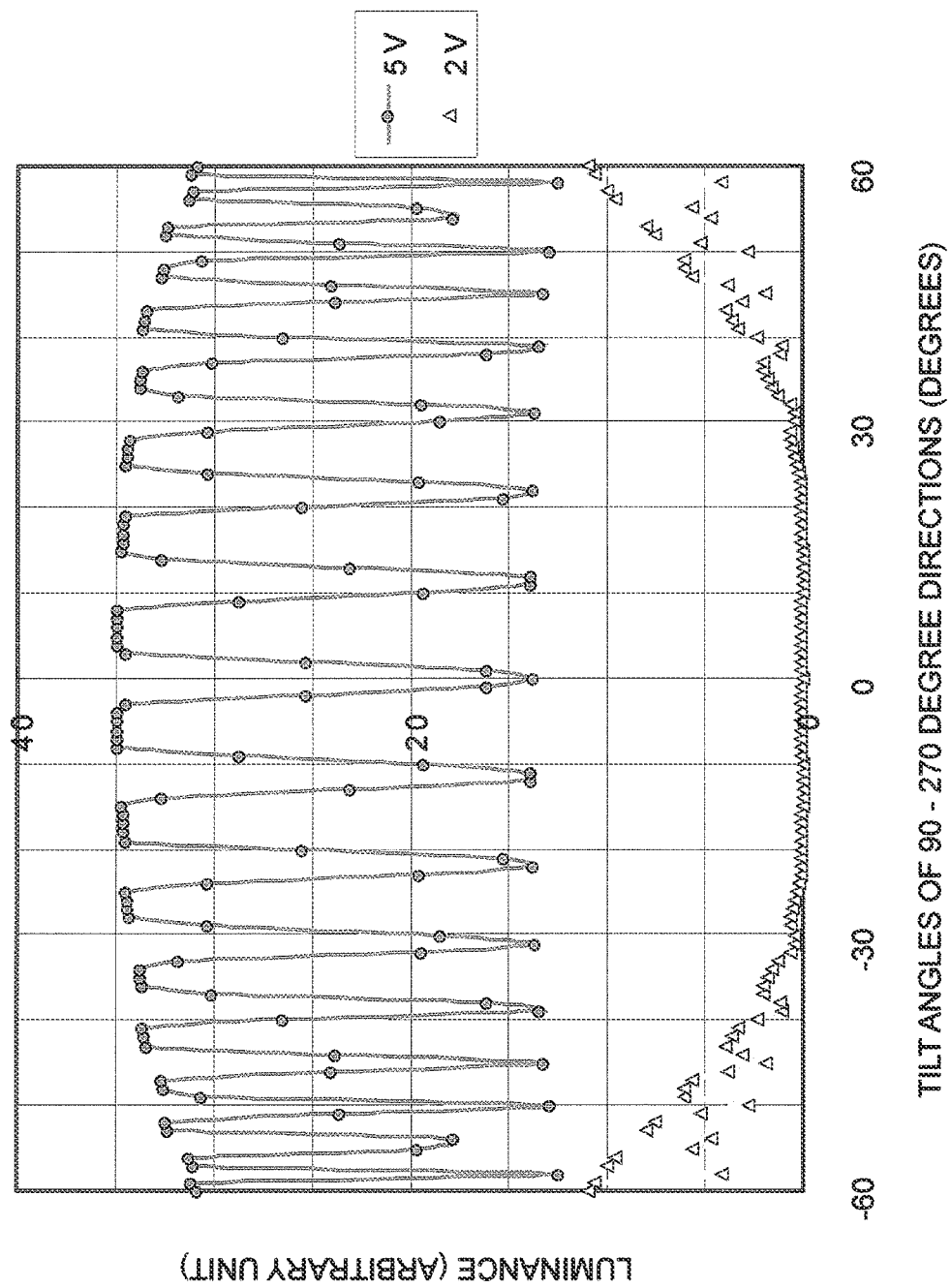
FIG. 4 is a graph showing a viewing angle characteristic of a structure where a barrier layer is provided to the liquid crystal display device according to the first exemplary embodiment, when a same voltage is applied to a first-viewpoint sub-pixel and a second-viewpoint sub-pixel.

FIG. 4 shows a characteristic when the viewing angle is changed to the polar angle direction within the azimuth direction (within the XZ plane) of the direction orthogonal to the tilt direction of the liquid crystal molecules when a voltage is applied in a case where a barrier layer is provided in the first exemplary embodiment. The barrier layer is disposed in such a manner that the transmission region and the non-transmission region are arranged alternately in the direction (X-axis direction) orthogonal to the plane (YZ plane) that is in parallel to the border 13 between the sub-pixels 11B, —for displaying the first-viewpoint image and the sub-pixels 12B, —for displaying the second viewpoint image within the display unit 10. Further, in this graph, a same voltage is applied to both the first-viewpoint sub-pixel 11B and the second-viewpoint sub-pixel 12B.

Figure 55:
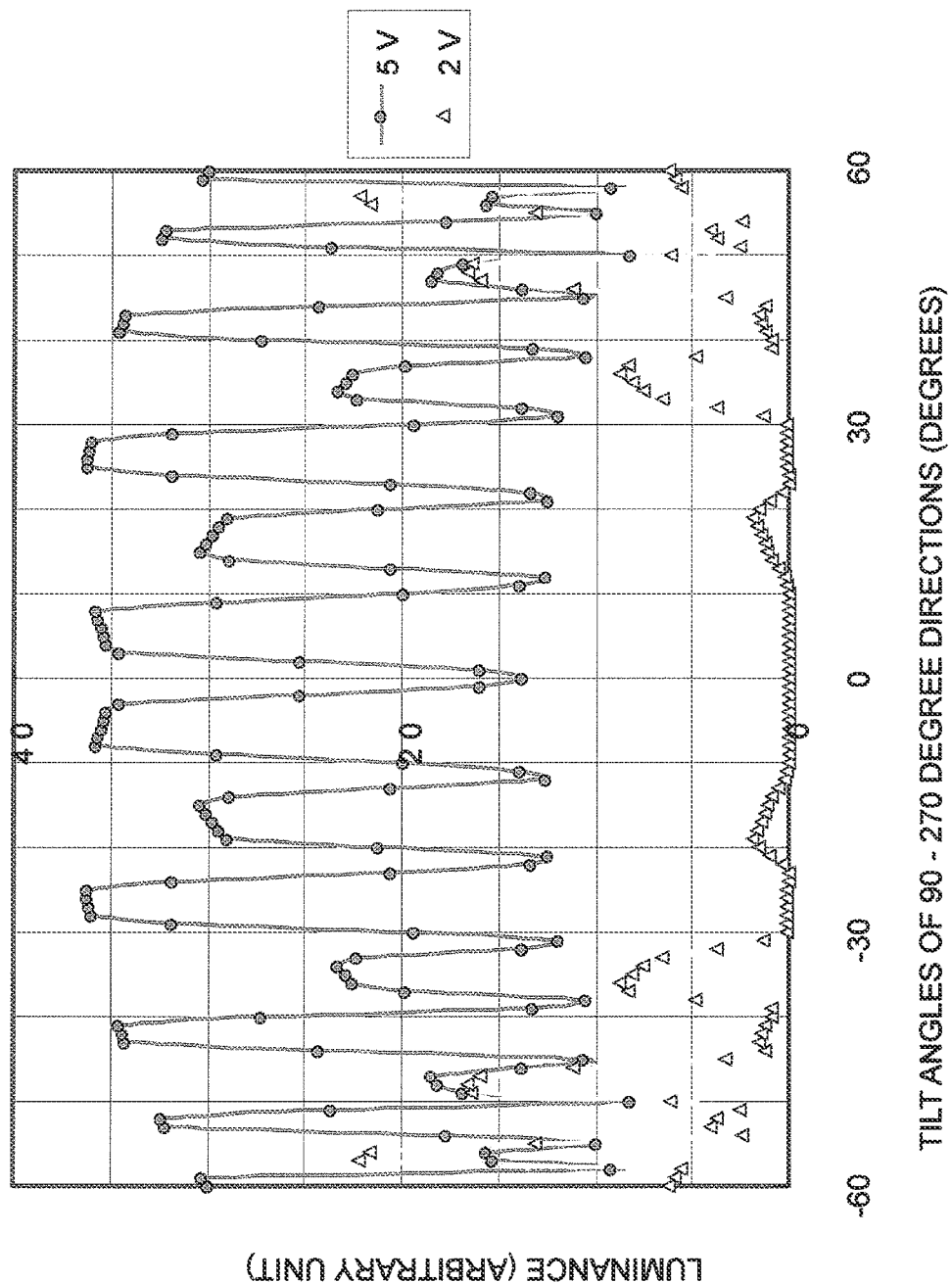
FIG. 55 is a graph showing a viewing angle characteristic of the multiple view display of Patent Document 3.

Regarding the viewing angle characteristic shown in FIG. 4 and the viewing angle characteristic shown in FIG. 55, the alignment directions of the liquid crystal within the divided liquid crystal alignment regions are different while the layout of the barrier layers for the observer is the same. Thereby, the viewing angle characteristic shown in FIG. 4 is a symmetric characteristic on the left and right sides of the graph, in which a change of the luminance is small when the viewing angle is changed. As a result, it is possible with the first exemplary embodiment to achieve fine stereoscopic display and multi-view display with small viewing angle dependency. That is, as can be seen from FIG. 4, low transmittance is kept low and high transmittance is kept high in a range of the tilt angle between −30 and 30 degrees. Further, light separation by the barrier can be done clearly. As a result, the luminance change depending on the viewing angle is small, so that reduction of 3D moire and the like is small.

In FIG. 4, the luminance at each change part between the transmission part and the light-shielding part of the barrier layer is little less than 15, which is little less than a half of the maximum luminance 35. Thus, there is a possibility of having 3D moire remained due to the fall of the luminance. However, this fall of the luminance is 3D moire that can be easily adjusted by devising the design of adjustment and the like of a ratio between the width of the transmission part and the width of the light-shielding part of the barrier layer, and it is not 3D moire determined by the structure itself, i.e., it is not 3D moire based on the difference in the transmission characteristic of the transmission part shown in FIG. 55.

Figure 5:
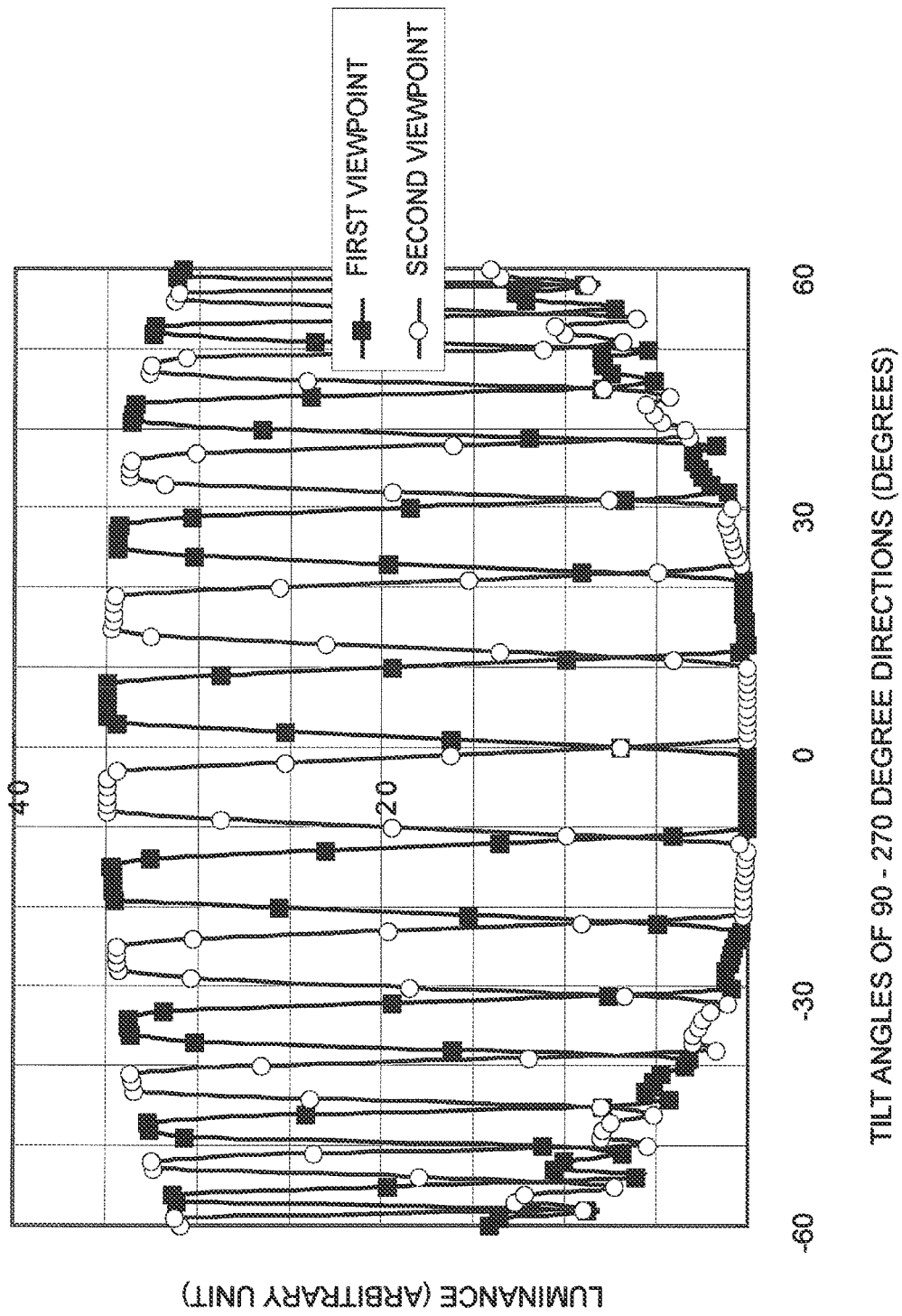
FIG. 5 is a graph showing a viewing angle characteristic of a structure where a barrier layer is provided to the liquid crystal display device according to the first exemplary embodiment, when different voltages are applied to a first-viewpoint sub-pixel and a second-viewpoint sub-pixel.

Next, in order to see the crosstalk between the sub-pixels, FIG. 5 shows a result acquired by changing the method for applying the voltage. In this graph, two following voltage applying conditions are shown. That is, shown are the two conditions, i.e., a condition under which a voltage of 5 V is applied to the first-viewpoint sub-pixel 11B and a voltage of 0 V is applied to the second-viewpoint sub-pixel 12B (marked with black squares) and a condition under which a voltage of 0 V is applied to the first-viewpoint sub-pixel 11B and a voltage of 5 V is applied to the second-viewpoint sub-pixel 12B (marked with white circles). When a voltage (i.e., 5 V) of a condition where the luminance is high is applied to each of the viewpoints, the luminance becomes sufficiently high in a specific viewing angle range, and the luminance is sufficiently low in the other viewing angle range. As a result, the crosstalk between the two conditions is extremely small, e.g., the low luminance is less than ⅕ of the high luminance in the range of the tilt angles between −30 degrees and 30 degrees. Such fine light separating characteristic is acquired, so that it can be found that the crosstalk phenomenon such as 3D crosstalk becomes extremely small with the liquid crystal display device of the first exemplary embodiment.

As an exemplary advantage according to the invention, the present invention makes it possible to achieve a wide viewing angle and high definition vertical alignment liquid crystal display device.

Second Exemplary Embodiment

A liquid crystal display device according to a second exemplary embodiment is the same as the liquid crystal display device according to the first exemplary embodiment in respect to the points that a liquid crystal exhibiting negative anisotropy is sandwiched between a pair of substrates, liquid crystal molecules constituting the liquid crystal are initially aligned almost vertically to the pair of substrates, and display units each including at least a first pixel for displaying an image for a first viewpoint and a second pixel for displaying an image for a second viewpoint are arranged in matrix (see FIG. 2).

Figure 6A:
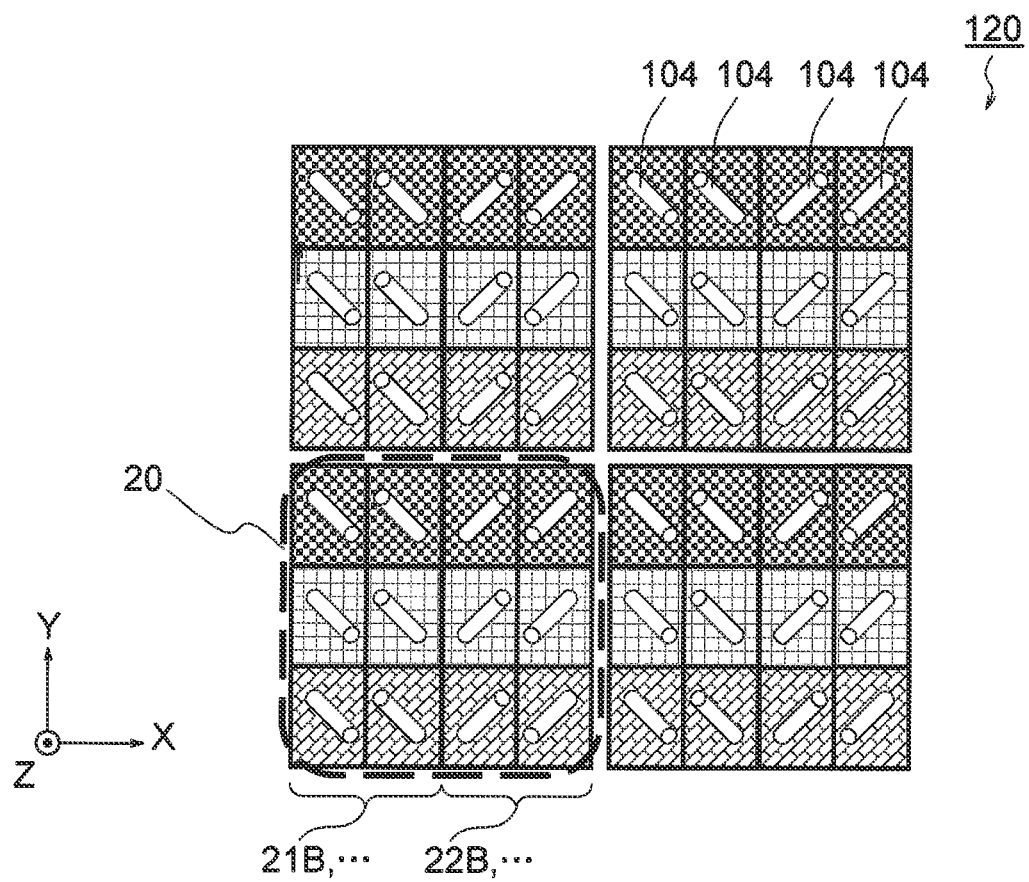
FIG. 6A is a plan view showing a liquid crystal display device according to a second exemplary embodiment.
Figure 6B:
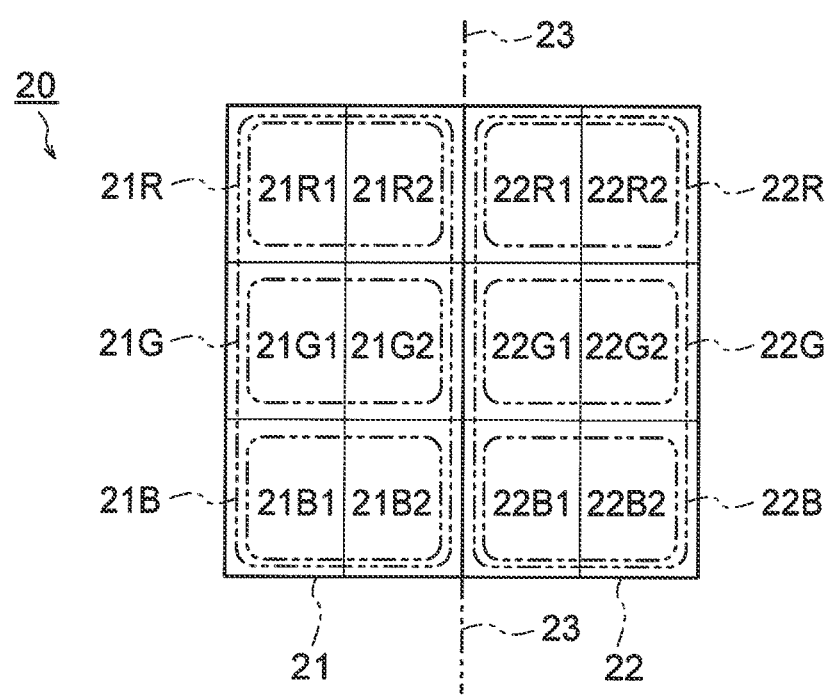
FIG. 6B is a schematic view showing a display unit of FIG. 6A.

FIG. 6A is a plan view showing the liquid crystal display device according to the second exemplary embodiment, and FIG. 6B is a schematic view showing a display unit of FIG. 6A. Hereinafter, explanations will be provided by referring to those drawings.

In the liquid crystal display device 120 according to the second exemplary embodiment, a display unit 20 is constituted with a first pixel 21 and a second pixel 22. The first pixel 21 is constituted with sub-pixels 21R, 21G, and 21B arranged in a direction in parallel to a border 23 between the first pixel 21 and the second pixel 22. Similarly, the second pixel 22 is constituted with sub-pixels 22R, 22G, and 22B. The sub-pixel 21R is constituted with a first domain 21R1 and a second domain 21R2 arranged in a direction vertical to the border 23. Similarly, the sub-pixel 21G is constituted with a first domain 21G1 and a second domain 21G2, the sub-pixel 21B is constituted with a first domain 21B1 and a second domain 21B2, the sub-pixel 22R is constituted with a first domain 22R1 and a second domain 22R2, the sub-pixel 22G is constituted with a first domain 22G1 and a second domain 22G2, and the sub-pixel 22B is constituted with a first domain 22B1 and a second domain 22B2.

The tilt direction of the liquid crystal molecules 104 when a voltage is applied is within a plane that is at an angle of 45 degrees with respect to the border 23. The tilt directions are different from each other by 90 degrees between the first pixel 21 and the second pixel 22, and different from each other by 180 degrees between the first domains 21R1, —and the second domains 21R2, —.

Hereinafter, the second exemplary embodiment will be described in more details.

FIG. 6A is a plan view showing a part of the liquid crystal display device 120 of the second exemplary embodiment. Particularly, FIG. 6A shows the display units 20 arranged in matrix. In this drawing, four display units 20 are illustrated for simplification. However, a greater number of display units are used normally. In the second exemplary embodiment, the display units 20 including the sub-pixels 21B, —for displaying the image for the first viewpoint and the sub-pixels 22B, —for displaying the image for the second viewpoint are arranged in matrix. This drawing shows a state where the liquid crystal molecules 104 are tilted by applying a voltage. At this time, in the sub-pixel 21B for displaying the first-viewpoint image, there are the first domain 21B1 and the second domain 21B2 where the tilt directions of the liquid crystal molecules 104 are different. In the sub-pixel 22B for displaying the second-viewpoint image, there are also the first domain 22B1 and the second domain 22B2 where the tilt directions of the liquid crystal molecules 104 are different. Further, the tilt directions of the liquid crystal molecules 104 are different from each other by 180 degrees between the first domain 21B1 and the second domain 21B2 within the sub-pixels 21B. Similarly, the tilt directions of the liquid crystal molecules 104 are different from each other by 180 degrees between the first domain 22B1 and the second domain 22B2 within the sub-pixels 22B. This is the same for the other sub-pixels 21G, 21R, 22G, and 22R.

There are the tilt directions of the liquid crystal molecules 104 within a plane that is at an angle of 45 degrees with respect to the border 23 between the sub-pixels 21B, —for displaying the image for the first viewpoint and the sub-pixels 22B, —for displaying the image for the second viewpoint within the display unit 20, i.e., within a plane orthogonal to the sheet including a line that is at an angle of 45 degrees clockwise from the top-and-bottom direction of the drawing or within a plane orthogonal to the sheet including a line that is at an angle of 45 degrees counter-clockwise from the top-and-bottom direction of the drawing. As a result, the tilt directions of the liquid crystal molecules 104 at each viewpoint are different from each other by 90 degrees with respect to the border 23. In this drawing, the display unit 20 is divided into the three sub-pixels 21B, —and the three sub-pixels 22B, —, and each of the sub-pixels 21B, —is divided into two domains with different alignment. However, the number of sub-pixels and the number of domains with different alignment are not limited only to such case.

Figure 7:
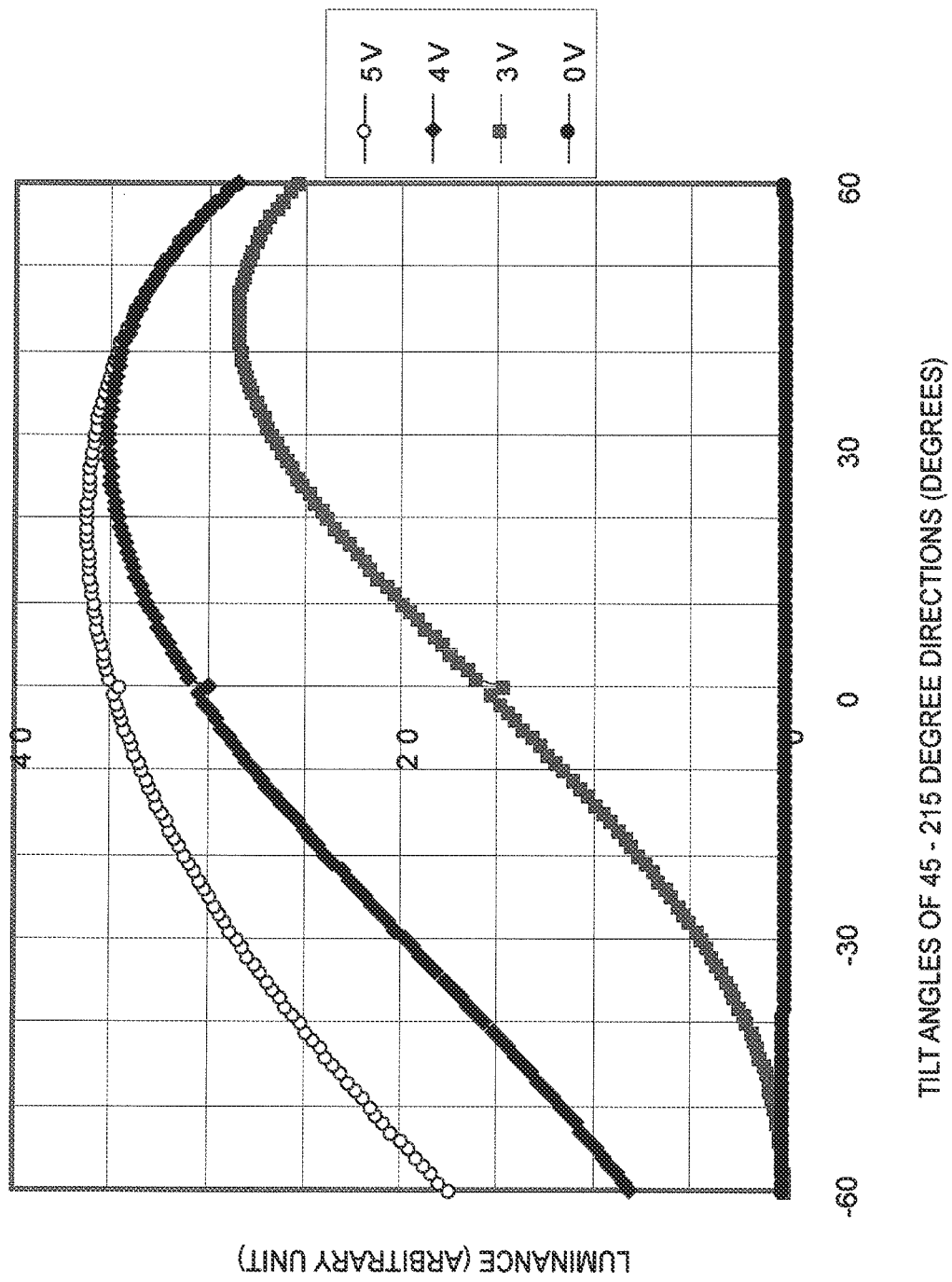
FIG. 7 is a graph showing a viewing angle characteristic for describing the operation effects of the liquid crystal display device according to the second exemplary embodiment.

FIG. 7 will be referred for describing the operation effects of the liquid crystal display device 120. FIG. 7 is a graph showing a viewing angle dependency of the luminance, when the angle is changed to the angle of depression (polar angle) of the vertical alignment liquid crystal. In other words, FIG. 7 shows a characteristic when the viewing angle direction is changed in the polar angle direction within the azimuth direction of a direction that is orthogonal to the tilt angle of the liquid crystal molecules when a voltage is applied. That is, in the case of FIGS. 6A and 6B, it is the viewing angle characteristic of a case where the tilt angle is changed by taking the direction (i.e., Z-axis direction) that is vertical to the sheet within a plane in parallel to the border 23 as 0 degree within a plane that is at 135 degrees (or −45 degrees) with respect to the border 23 between the sub-pixels 21B, —for the first viewpoint and the sub-pixels 22B, —for the second viewpoint. The plane that is at an angle of 135 degrees (or −45 degrees) with respect to the border 23 is a plane that is rotated from the YZ plane clockwise by 135 degrees towards the plus direction of the X-axis direction, and it is also a plane that is rotated from the XZ plane clockwise by 45 degrees in the minus direction of the Y-axis direction. This graph shows the viewing angle characteristic in the polar angle (written as the tilt angle in the graph) direction of the luminance when four conditions of 0 V, 3 V, 4 V, and 5 V as the voltages are applied to the liquid crystal.

FIG. 7 shows the viewing angle characteristic of the direction that is different by 45 degrees in the azimuth direction of FIG. 54, and the characteristic of the direction that is different by −45 degrees in the azimuth direction of FIG. 3. As in the case of FIG. 54, the viewing angle characteristic of FIG. 7 is an asymmetrical characteristic on the positive side and the negative side of the tilt angle. However, in FIG. 7, the characteristic of 0 V, i.e., the characteristic of black display, is almost symmetric on the positive side and the negative side of the tilt angle, and the luminance is sufficiently low. The second exemplary embodiment uses the characteristic shown in FIG. 7 and the characteristic in which the azimuth direction is different by 180 degrees therefrom. That is, the second exemplary embodiment uses the characteristic of positive side-negative side shown in FIG. 7, and the characteristic of negative side-positive side of FIG. 7 that is inverted by 180 degrees therefrom. As a result, when the viewing angle is tilted, the two characteristics compensate with each other.

Further, the first-viewpoint sub-pixels 21B, —and the second-viewpoint sub-pixels 22B, —are in contact with the border 23 between the first pixel 21 and the second pixel 22 within the display unit 20, respectively. In the second domains 21B2, 21G2, 21R2 and the first domains 22B1, 22G1, 22R1 in contact with the border 23, the alignment of the liquid crystal molecules 104 is different by 90 degrees from each other by taking the border 23 as the axis of the line symmetry.

Such alignment provides the characteristics which compensate with each other when the viewing angle is tilted in the left-and-right direction of FIGS. 6A and 6B. Further, the second domains 22B2, 22G2, 22R2 as well as the first domains 21B1, 21G1, 21R1 separate from the border 23 are in the alignment of the liquid crystal molecules 104 different by 90 degrees from each other by taking the border 23 as the axis of the line symmetry. As a result, when the viewing angle is tilted, those can compensate with each other. Therefore, particularly when a same image is displayed on the first pixel 21 and the second pixel 22, four kinds of domains where the tilt directions of the liquid crystal molecules 104 are different from each other by 90 degrees exist within the display unit 20. Thus, a wide viewing angle characteristic of 2D images can be acquired through compensating the characteristics with each other among the domains.

Figure 8:
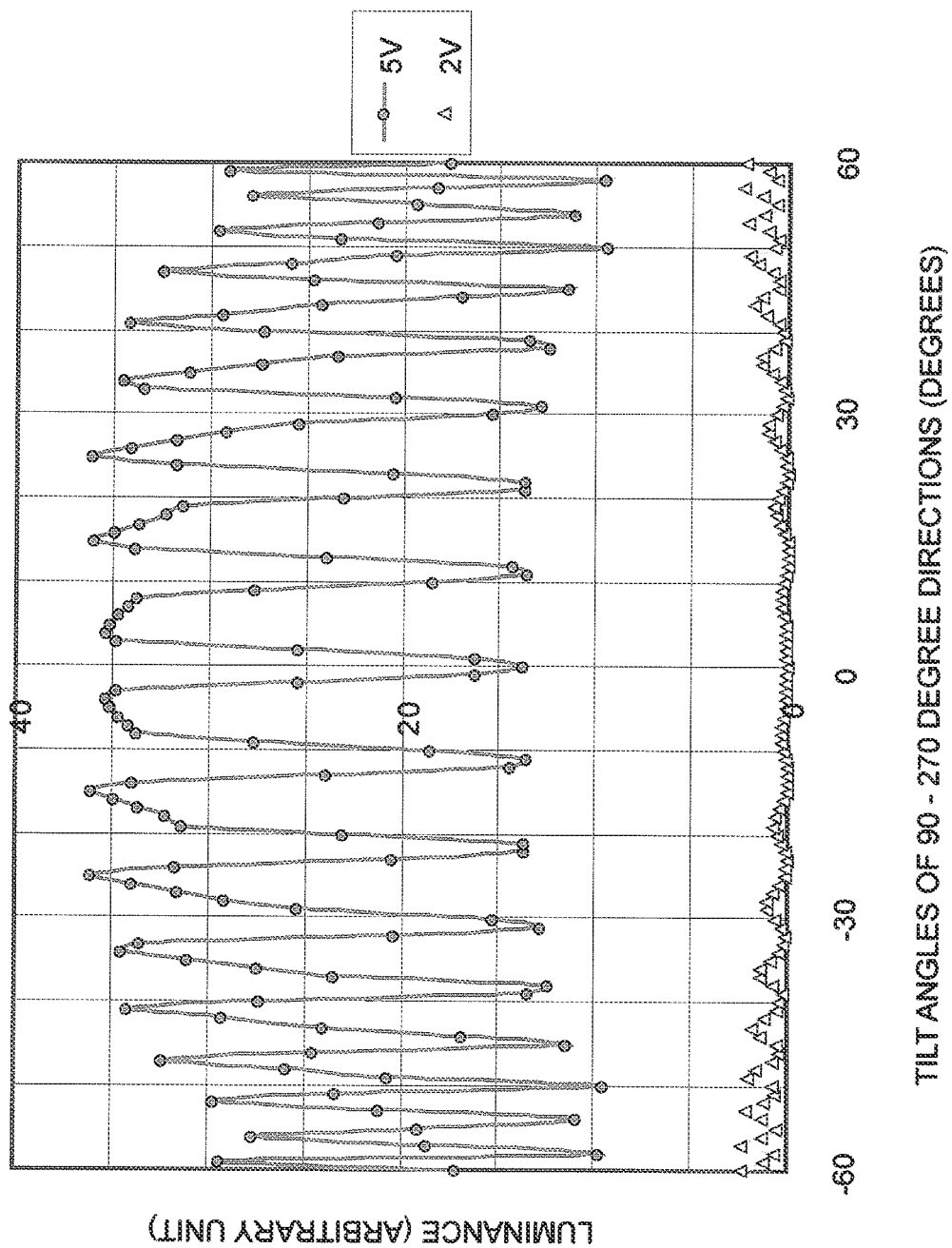
FIG. 8 is a graph showing a viewing angle characteristic of a structure where a barrier layer is provided to the liquid crystal display device according to the second exemplary embodiment, when a same voltage is applied to a first-viewpoint sub-pixel and a second-viewpoint sub-pixel.

FIG. 8 shows a characteristic of a case where a barrier layer is provided in the structure of the liquid crystal display device 120 of the second exemplary embodiment, when the viewing angle is changed to the polar angle direction within the azimuth direction (within the XZ plane) of the direction at an angle of 45 degrees with respect to the tilt direction of the liquid crystal molecules when a voltage is applied. The barrier layer is disposed in the same manner as that of FIG. 4. Further, in this graph, a same voltage is applied to both the first-viewpoint sub-pixel 21B and the second-viewpoint sub-pixel 22B. In FIG. 8, the viewing angle characteristic is a symmetric characteristic on the left and right sides of the graph, in which a change of the luminance is small when the viewing angle is changed. As a result, it is possible with the second exemplary embodiment to achieve a fine stereoscopic display and multi-view display with small viewing angle dependency. That is, as can be seen from the graph, low transmittance is kept low in a range of the tilt angle between −60 and 60 degrees.

Next, in order to see the crosstalk between the sub-pixels, FIG. 5 shows a result acquired by changing the method for applying the voltage. In this graph, two following voltage applying conditions are shown. That is, shown are the two conditions, i.e., a condition under which a voltage of 5 V is applied to the first-viewpoint sub-pixel 21B and a voltage of 0 V is applied to the second-viewpoint sub-pixel 22B (marked with solid black squares) and a condition under which a voltage of 0 V is applied to the first-viewpoint sub-pixel 21B and a voltage of 5 V is applied to the second-viewpoint sub-pixel 22B (marked with hollow white circles). When a voltage (i.e., 5 V) of a condition where the luminance is high is applied to each of the viewpoints, the luminance becomes sufficiently high in a specific viewing angle range, and the luminance is sufficiently low in the other viewing angle range. As a result, the crosstalk between the two conditions is extremely small, e.g., the low luminance is less than ⅕ of the high luminance in the range of the tilt angles between −30 degrees and 30 degrees. Such fine light separating characteristic is acquired, so that it can be found that the crosstalk phenomenon such as 3D crosstalk becomes extremely small with the liquid crystal display device of the second exemplary embodiment.

Further, in a case where the right eye and the left eye are placed at the first viewpoint and the second viewpoint, changes when the viewing angle is tilted are very small in a range between −10 degrees to 10 degrees for both of the viewpoints. Generally, the luminance tends to decrease as the viewing angle is tilted in the ranges between 10 degrees to 30 degrees and between −10 degrees and −30 degrees, etc. In that case, there is also decrease in the first viewpoint and the second viewpoint as well. Thus, the luminance for the right eye and the left eye are to decrease simultaneously. Thereby, the image viewed with both of the right eye and the left eye is so observed that the entire luminance becomes decreased as the viewing angle is increased. Therefore, there is less uncomfortableness felt in the image observed when the viewing angle is changed in a range of angles from 10 degrees to 30 degrees, so that a fine display can be acquired.

Third Exemplary Embodiment

A liquid crystal display device according to a third exemplary embodiment is the same as the liquid crystal display device according to the first exemplary embodiment in respect to the points that a liquid crystal exhibiting negative anisotropy is sandwiched between a pair of substrates, liquid crystal molecules constituting the liquid crystal are initially aligned almost vertically to the pair of substrates and, and display units each including at least a first pixel for displaying an image for a first viewpoint and a second pixel for displaying an image for a second viewpoint are arranged in matrix (see FIG. 2).

Figure 10A:
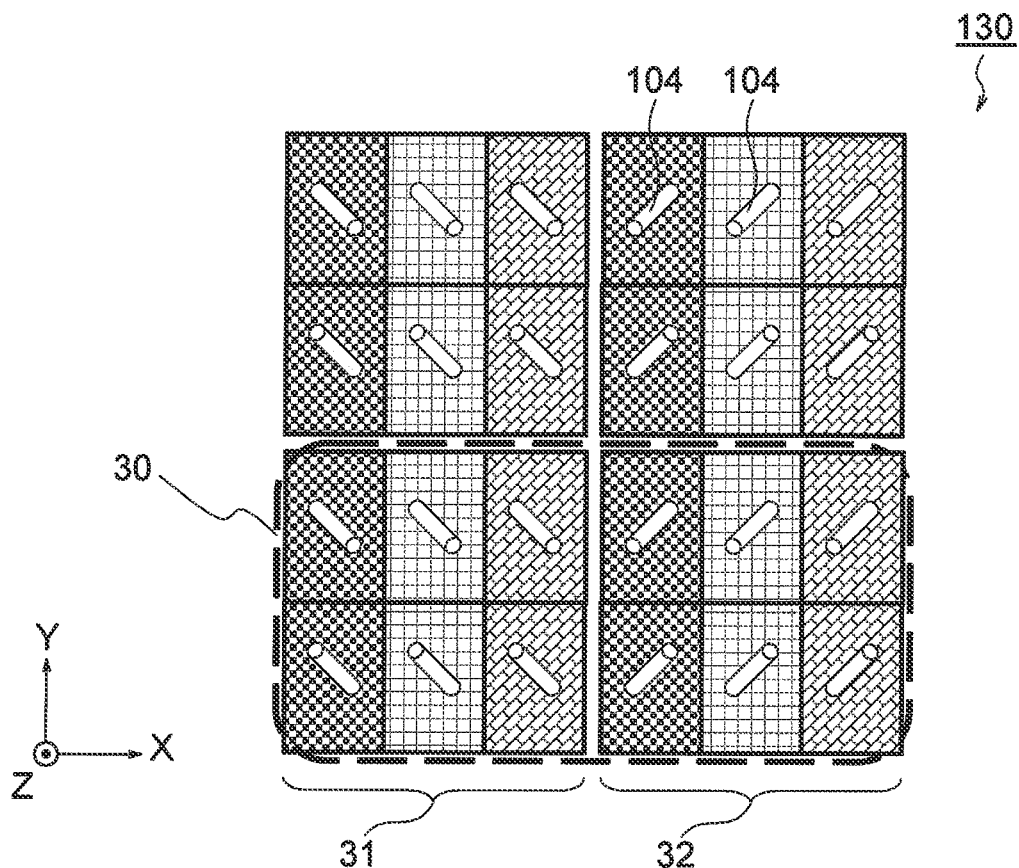
FIG. 10A is a plan view showing a liquid crystal display device according to a third exemplary embodiment.
Figure 10B:
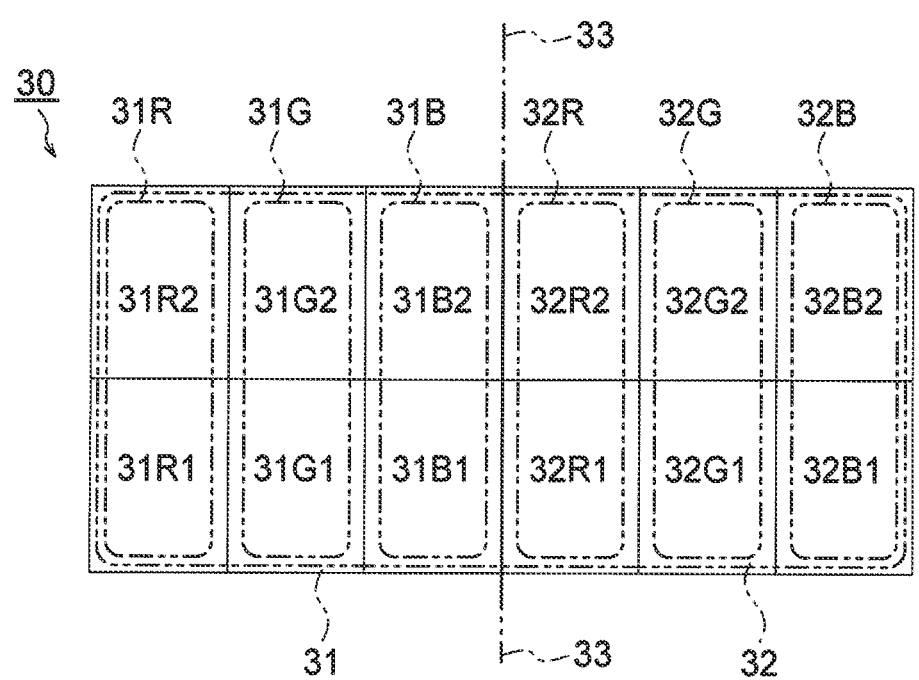
FIG. 10B is a schematic view showing a display unit of FIG. 10A.

FIG. 10A is a plan view showing the liquid crystal display device according to the third exemplary embodiment, and FIG. 10B is a schematic view showing a display unit of FIG. 10A. Hereinafter, explanations will be provided by referring to those drawings.

In the liquid crystal display device 130 according to the third exemplary embodiment, a display unit 30 is constituted with a first pixel 31 and a second pixel 32. The first pixel 31 is constituted with sub-pixels 31R, 31G, and 31B arranged in a direction vertical to a border 33 between the first pixel 31 and the second pixel 32. Similarly, the second pixel 32 is constituted with sub-pixels 32R, 32G, and 32B. The sub-pixel 31R is constituted with a first domain 31R1 and a second domain 31R2 arranged in a direction in parallel to the border 33. Similarly, the sub-pixel 31G is constituted with a first domain 31G1 and a second domain 31G2, the sub-pixel 31B is constituted with a first domain 31B1 and a second domain 31B2, the sub-pixel 32R is constituted with a first domain 32R1 and a second domain 32R2, the sub-pixel 32G is constituted with a first domain 32G1 and a second domain 32G2, and the sub-pixel 32B is constituted with a first domain 32B1 and a second domain 32B2.

The tilt direction of the liquid crystal molecules 104 when a voltage is applied is within a plane that is at an angle of 45 degrees with respect to the border 33. The tilt directions are different from each other by 90 degrees between the first pixel 31 and the second pixel 32, and different from each other by 180 degrees between the first domains 31R1, —and the second domains 31R2, —.

Hereinafter, the third exemplary embodiment will be described in more details.

In the first and second exemplary embodiments, the display unit is close to the structure of the display unit of Patent Document 1, i.e., a single display unit including the first-viewpoint sub-pixel and the second-viewpoint sub-pixel is almost in a square form. In the meantime, the display unit of the third exemplary embodiment is in a structure where the aspect ratio is almost 1:2. In association with the difference in the shapes of the display units, the regions within the sub-pixel where the tilt directions of the alignment are different are provided in the left-and-right directions in the first and second exemplary embodiment, while the regions are provided in the top-and-bottom direction in the third exemplary embodiment.

FIG. 10 is a plan view showing a part of the liquid crystal display device 130 of the third exemplary embodiment. Particularly, FIGS. 10A and 10B show the display units 30 arranged in matrix. In this drawing, two display units 30 are illustrated for simplification. However, a greater number of display units are used normally. In the third exemplary embodiment, the display units 30 including the first pixel 31 for displaying the image for the first viewpoint and the second pixel 32 for displaying the image for the second viewpoint are arranged in matrix. This drawing shows a state where the liquid crystal molecules 104 are tilted by applying a voltage. At this time, in the first pixel 31, there are a plurality of first domains 31R1, —and second domains 31R2, —where the tilt directions of the liquid crystal molecules 104 are different. In the second pixel 32, there are also a plurality of first domains 31R1, —and second domains 32R2, —where the tilt directions of the liquid crystal molecules 104 are different. Further, the tilt directions of the liquid crystal molecules 104 are different from each other by 180 degrees between the first domains 31R1, —and the second domains 31R2, —. Similarly, the tilt directions are different from each other by 180 degrees between the first domain 32R1, —and the second domains 32R2.

Further, there are the tilt directions of the liquid crystal molecules 104 within a plane that is at an angle of 45 degrees with respect to the border 33 between the first pixel 31 and the second pixel 32 within the display unit 30, i.e., within a plane orthogonal to the sheet including a line that is at an angle of 45 degrees clockwise from the top-and-bottom direction of the drawing or within a plane orthogonal to the sheet including a line that is at an angle of 45 degrees counterclockwise from the top-and-bottom direction of the drawing. As a result, the tilt directions of the liquid crystal molecules 104 at each viewpoint are different from each other by 90 degrees with respect to the border 33.

In this drawing, the display unit 30 is divided into sub-pixels 31R, 31G, 31B and sub-pixels 32R, 32G, 32B, and each of the sub-pixels 31R, —is divided into two domains of different alignment. However, the number of sub-pixels and the number of domains with different alignment are not limited only to such case. The sub-pixels 31R, —can be corresponded to each of the colors (three colors herein) of a case where the color display is achieved by using a color filter or the like, for example. In other words, this can be expressed as follows. That is, a single display unit 30 corresponds to one pixel to be selected or fused, a single sub-pixel 31R or a single sub-pixel 32R, for example, corresponding to each color corresponds to one dot to be selected, and a combination of a single sub-pixel 31R and a single sub-pixel 32R corresponding to each color corresponds to one dot to be fused.

As in the case of the second exemplary embodiment, the pixels for displaying the images for each viewpoint compensate with each other in the third exemplary embodiment. However, the viewing angle characteristics are different between the structure where the barrier layer is provided to the liquid crystal display device according to the third exemplary embodiment and the structure where the barrier layer is provided to the liquid crystal display device according to the second exemplary embodiment. That is, in the second exemplary embodiment, the two domains within each sub-pixel where the tilt directions of the liquid crystal molecules are different are arranged in the same direction as the direction (the left-and-right direction or the X-axis direction) along which the transmission region and the non-transmission region of the barrier layer are arranged. As a result, when the viewing angle is tilted at the time of observing an image by using the barrier layer, the two domains where the tilt directions of the liquid crystal molecules are different are separated to different directions from each other. Thus, the respective characteristics are to be exhibited for each of the angles, so that the characteristics thereof compensate with each other only in a part of the regions. In the meantime, with the third exemplary embodiment, the two domains within each sub-pixel where the tilt directions of the liquid crystal molecules are different are arranged in the direction orthogonal to the direction (the left-and-right direction or the X-axis direction) along which the transmission region and the non-transmission region of the barrier layer are arranged. As a result, when the viewing angle is tilted at the time of observing an image by using the barrier layer, the two domains where the tilt directions of the liquid crystal molecules are different are not separated to different directions from each other. Thus, the characteristics thereof compensate with each other.

Figure 9:
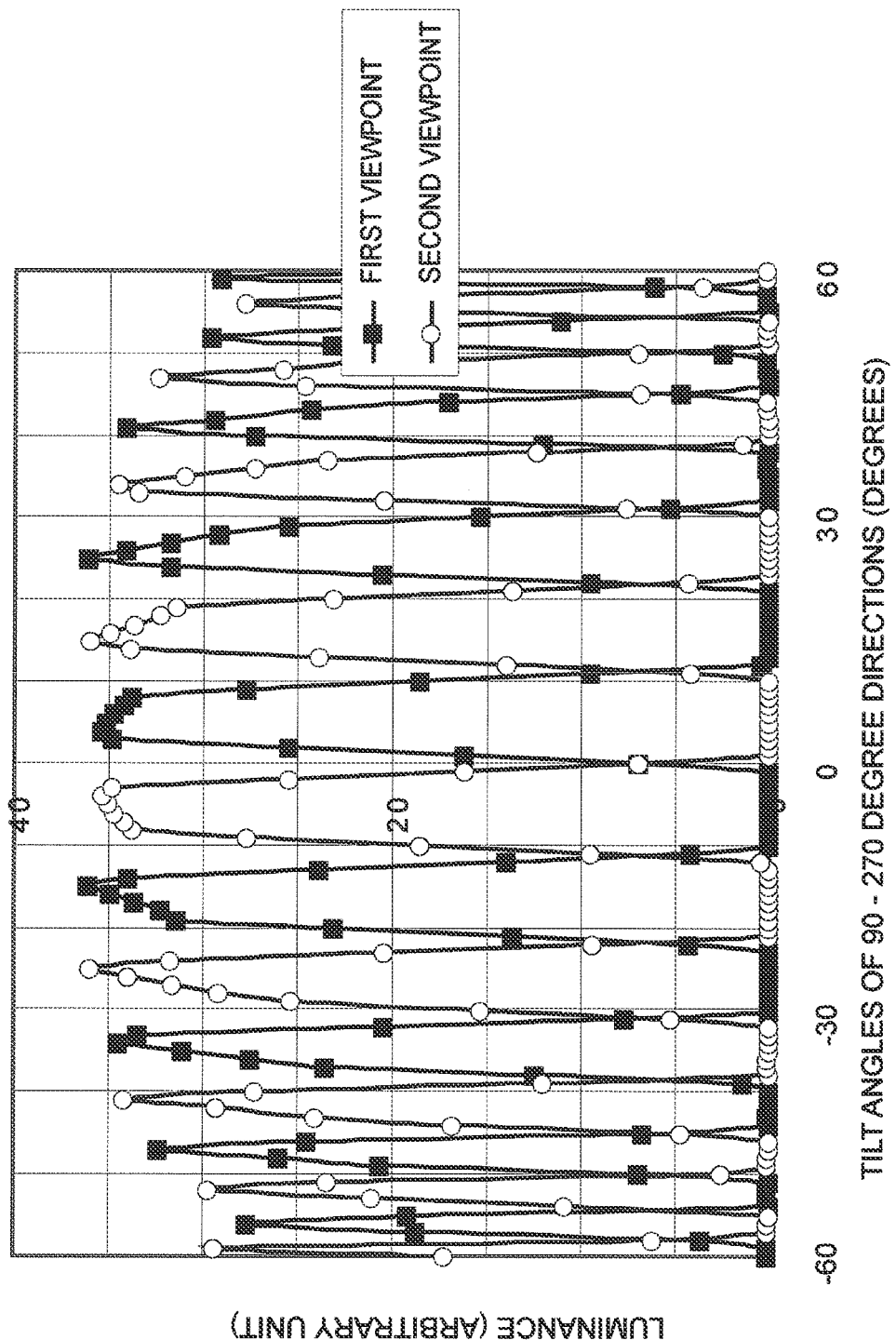
FIG. 9 is a graph showing a viewing angle characteristic of a structure where a barrier layer is provided to the liquid crystal display device according to the second exemplary embodiment, when different voltages are applied to a first-viewpoint sub-pixel and a second-viewpoint sub-pixel.
Figure 11:
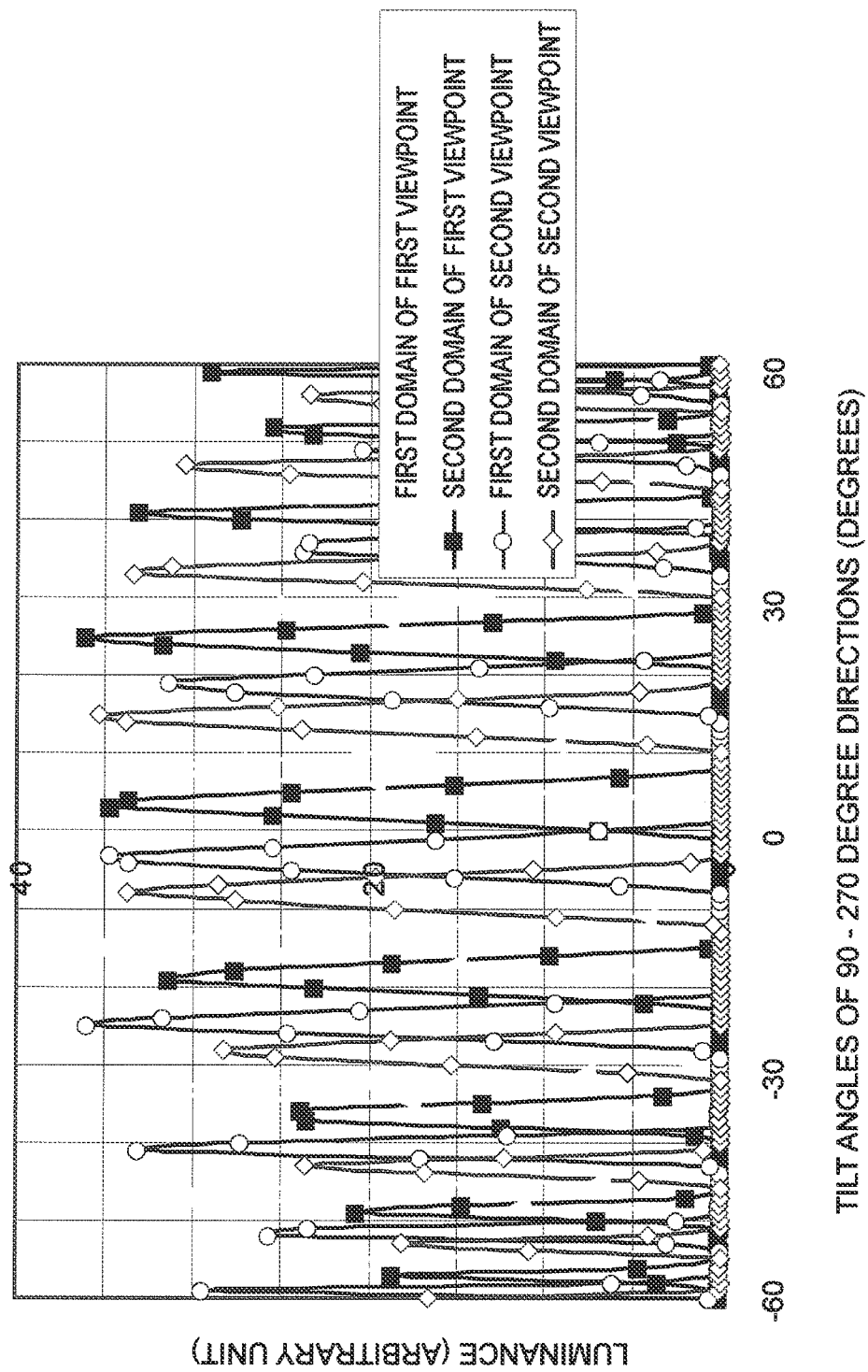
FIG. 11 is a graph showing a viewing angle characteristics of each domain used for describing the operation effects of the liquid crystal display device according to the third exemplary embodiment.

In order to describe this state in details, the viewing angle characteristics of the second exemplary embodiment shown in FIG. 9 are shown in FIG. 11 so that the influences of the viewing angle characteristics of each domain can be known. FIG. 11 shows the viewing angle characteristics of luminance from each domain, when the display units shown in FIGS. 6A and 6B of the second exemplary embodiment are defined as a first domain for the first viewpoint, a second domain for the first viewpoint, a first domain for the second viewpoint, and a second domain for the second viewpoint in order from the left. That is, FIG. 11 corresponds to a chart acquired by dividing the luminance of each viewpoint in FIG. 9 by each domain by considering the domains of different tilt directions of the liquid crystal molecules. Looking at the domains of each viewpoint in this chart, the luminance of the first domain and the luminance of the second domain cross with each other at about 17 in the vicinity of the viewing angle of 5 degrees, for example. The viewing angle characteristics thereof overlap with each other and compensate with each other in the vicinity of this angle, i.e., in a range of about 5 degrees (e.g., from 2 degrees to 8 degrees).

Figure 12:
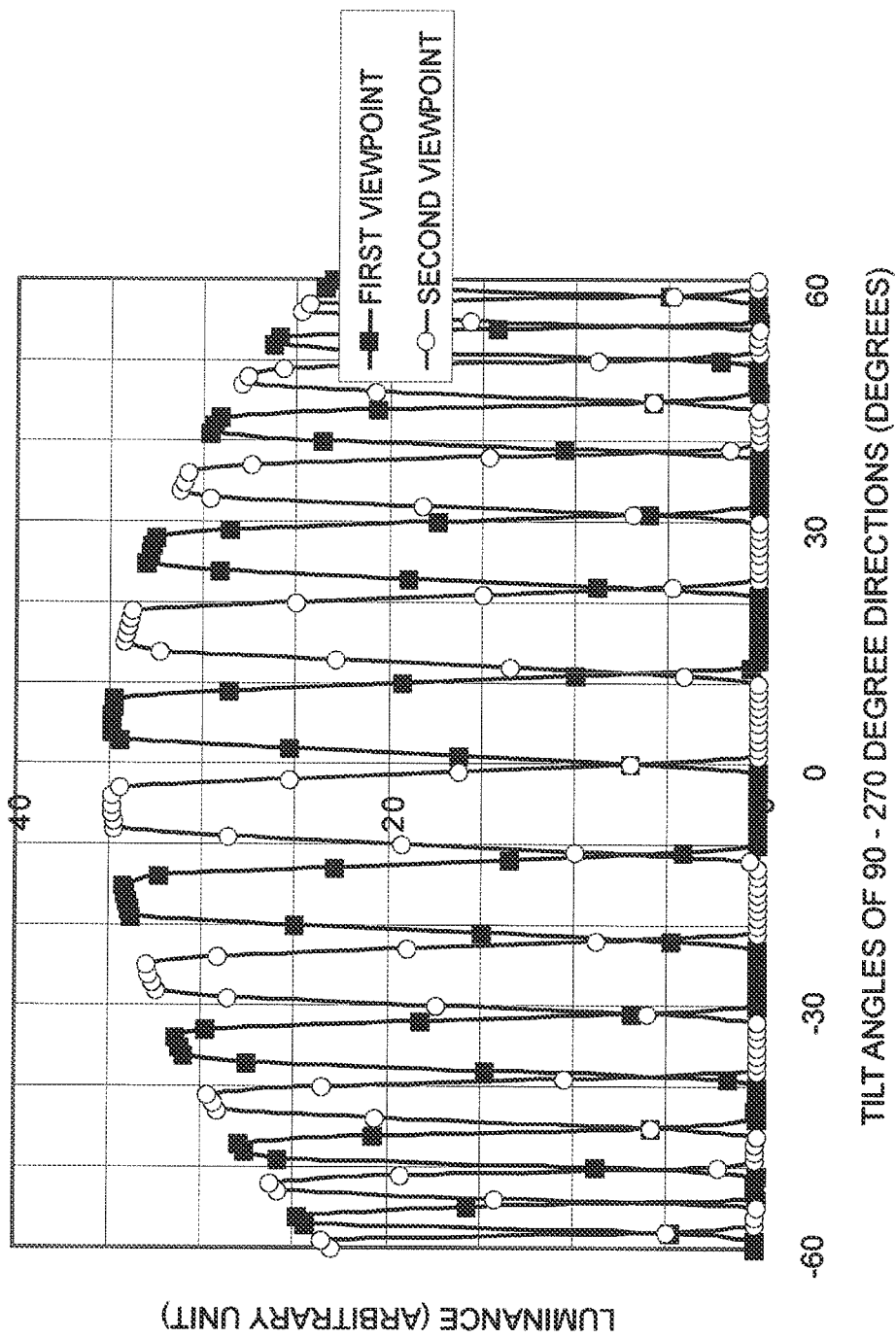
FIG. 12 is a graph showing a viewing angle characteristic of a structure where a barrier layer is provided to the liquid crystal display device according to the third exemplary embodiment, when different voltages are applied to a first-viewpoint sub-pixel and a second-viewpoint sub-pixel.
Figure 13:
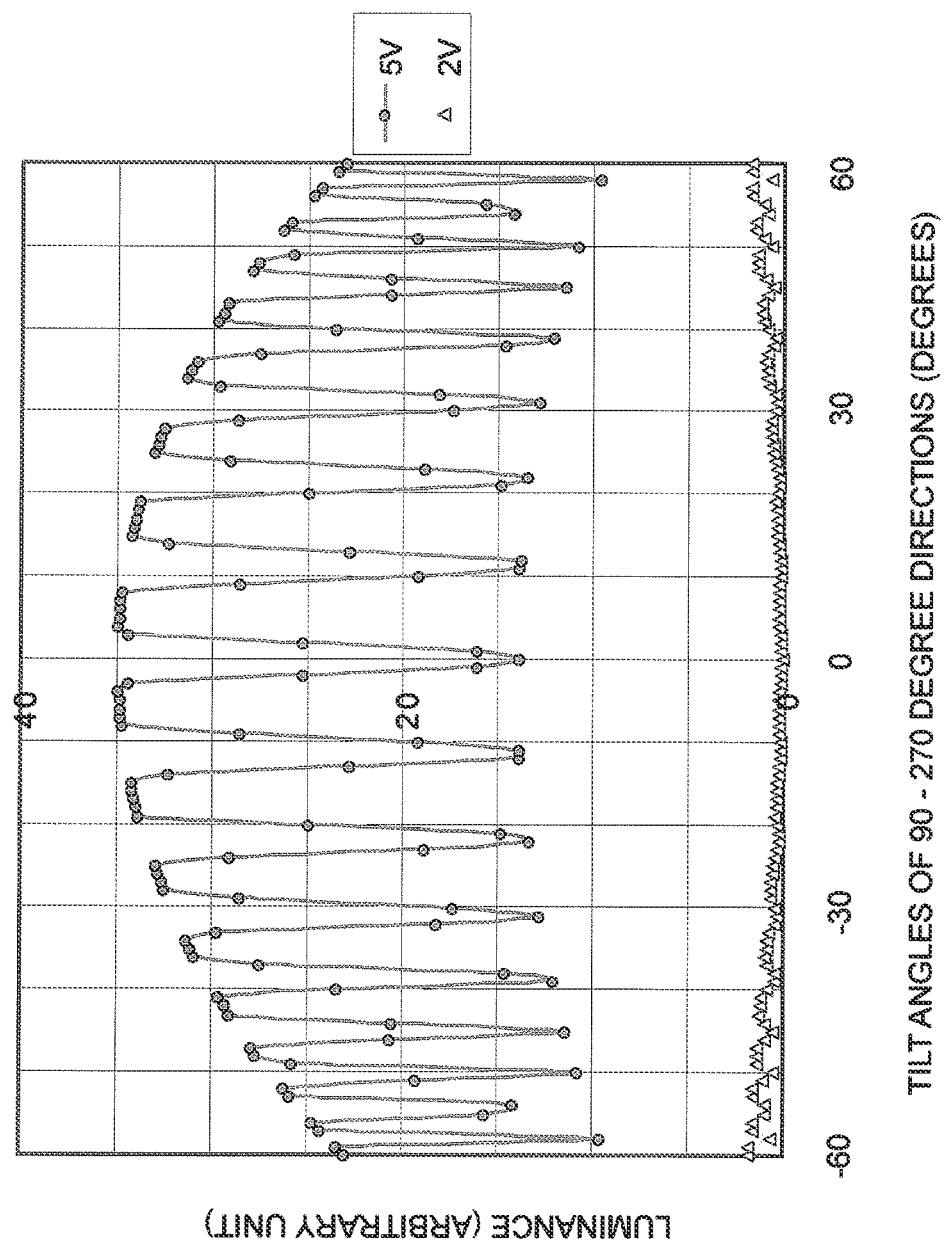
FIG. 13 is a graph showing a viewing angle characteristic of a structure where a barrier layer is provided to the liquid crystal display device according to the third exemplary embodiment, when a same voltage is applied to a first-viewpoint sub-pixel and a second-viewpoint sub-pixel.

In the meantime, in the third exemplary embodiment, the viewing angle characteristics of the domains compensate with each other at all times. Thus, the viewing angle characteristic of the third exemplary embodiment corresponding to FIG. 9 which shows the viewing angle characteristic of the second exemplary embodiment turns out as the one shown in FIG. 12. It is completely symmetric bilaterally, and the luminance change within each viewpoint is small. At the same time, it keeps the feature of the second exemplary embodiment that the luminance in the first viewpoint and the luminance in the second viewpoint change in the same manner. Further, the viewing angle characteristic of the third exemplary embodiment corresponding to FIG. 8 that shows the viewing angle characteristic of the second exemplary embodiment is shown in FIG. 13. It is completely symmetric bilaterally, and the luminance change depending on the viewing angle is small. Based on this, it can be found that the issues of 3D moire and 3D crosstalk is small in the third exemplary embodiment, so that a fine display can be acquired.

Fourth Exemplary Embodiment

Figure 14:
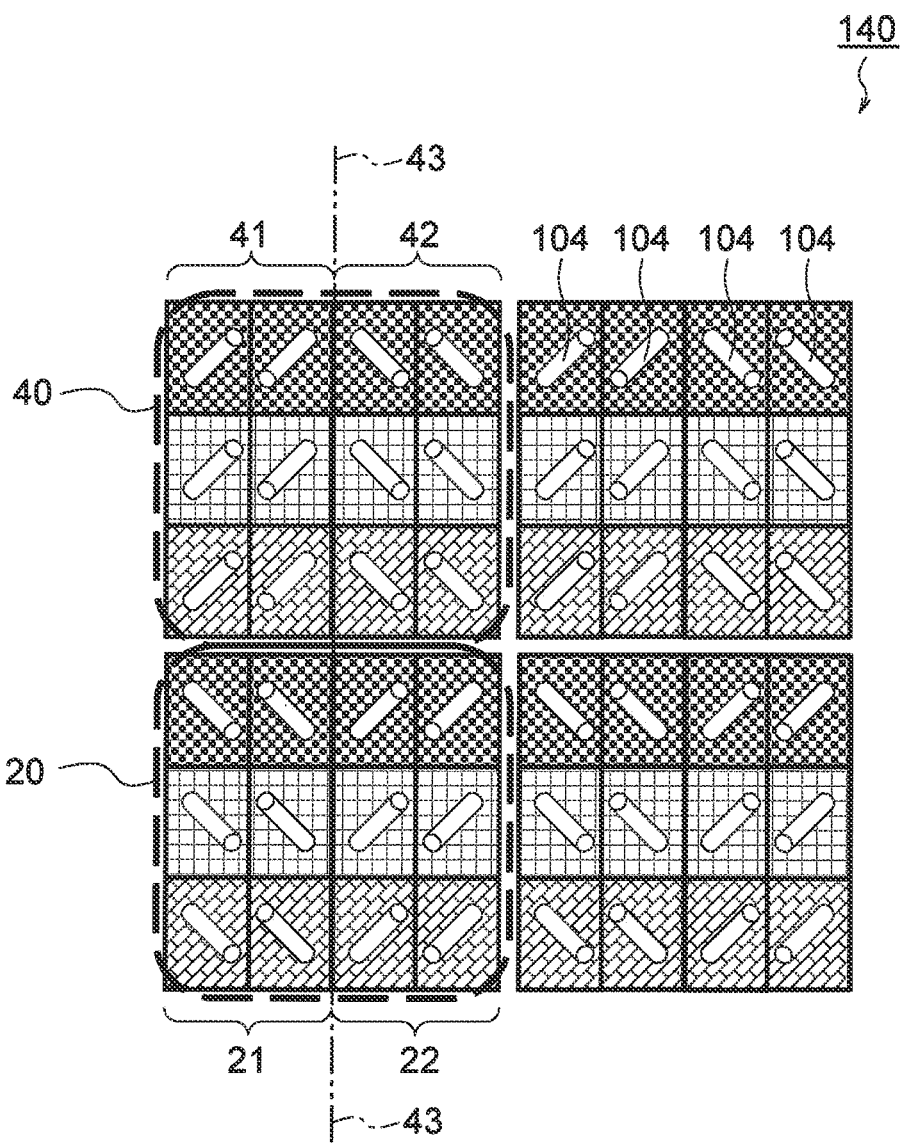
FIG. 14 is a plane view showing a liquid crystal display device according to a fourth exemplary embodiment.

FIG. 14 is a plan view showing a part of a liquid crystal display device according to a fourth exemplary embodiment. Particularly, FIG. 14 shows two kinds of display units arranged in matrix. Hereinafter, explanations will be provided by referring to those drawings.

A display unit 20 is the same as the display unit shown in the second exemplary embodiment. In a liquid crystal display device 140 of the fourth exemplary embodiment, the tilt directions of the liquid crystal molecules 104 when a voltage is applied are different from each other by 90 degrees between first pixels 21 and 41 as well as between second pixels 22 and 42 in two display units 20 and 40 neighboring to each other in the direction in parallel to a border 43. Hereinafter, this will be described in more details.

In FIG. 14, the display units 20 and the display unit 40 are arranged in matrix. In the fourth exemplary embodiment, the display units 40 are provided on the display unit 20. That is, both of the display units 20 and the display units 40 are arranged in matrix in the fourth exemplary embodiment, while only the display units 20 are arranged in matrix in the second exemplary embodiment. At this time, the liquid crystal alignment is different by 90 degrees between the display unit 20 and the display unit 40. That is, regarding the first viewpoint (the first pixels 21, 41), the liquid crystal alignment of the liquid crystal display unit 40 is different by 90 degrees (−90 degrees) counterclockwise with respect to the liquid crystal alignment of the display unit 20. Regarding the second viewpoint (the second pixels 22, 42), the liquid crystal alignment of the liquid crystal display unit 40 is different by 90 degrees (+90 degrees) clockwise with respect to the liquid crystal alignment of the display unit 20.

Figure 15:
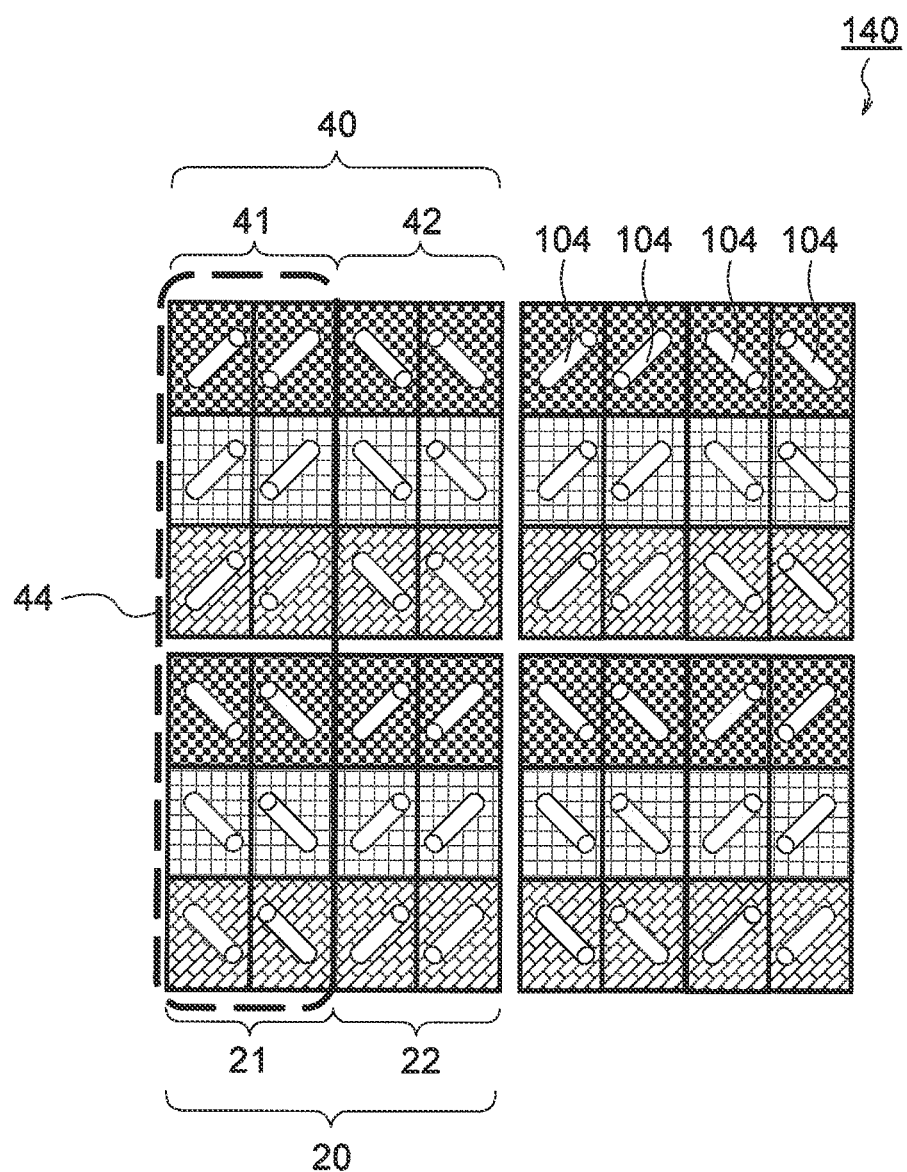
FIG. 15 is a plan view for describing the operation effects of the liquid crystal display device according to the fourth exemplary embodiment.

As a result, as shown in FIG. 15, there is a unit 44 in which the characteristics can compensate with each other in the top-and-bottom direction (i.e., the light distributing direction and the direction orthogonal thereto). In the unit 44, there are four kinds of domains having the alignment different from each other by 90 degrees, and those domains compensate with each other. This makes it possible to acquire a wide viewing angle characteristic even when the viewing angle is tilted in the top-and-bottom direction of the drawing.

Fifth Exemplary Embodiment

Figure 16:
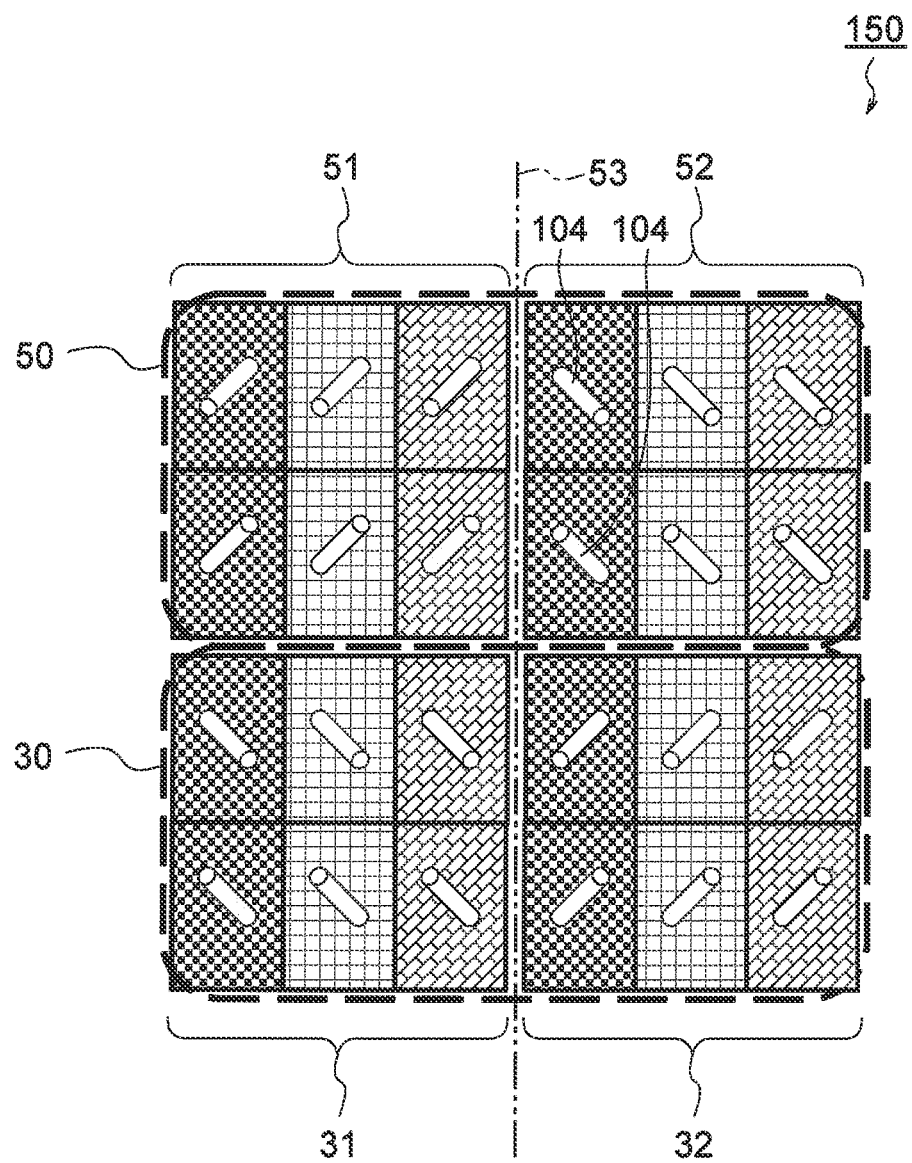
FIG. 16 is a plan view showing a liquid crystal display device according to a fifth exemplary embodiment.

FIG. 16 is a plan view showing a part of a liquid crystal display device according to a fifth exemplary embodiment. Particularly, FIG. 16 shows two kinds of display units arranged in matrix. Hereinafter, explanations will be provided by referring to those drawings.

In a display unit 150 according to the fifth exemplary embodiment, a display unit 30 is the same as the display unit shown in the third exemplary embodiment (FIGS. 10A and 10B). The tilt directions of the liquid crystal molecules 104 when a voltage is applied are different from each other by 90 degrees between first pixels 31 and 51 as well as between second pixels 32 and 52 in two display units 30 and 50 neighboring to each other in the direction in parallel to a border 53. Hereinafter, this will be described in more details.

In FIG. 16, the display units 30 and the display units 50 are arranged in matrix. In the fifth exemplary embodiment, the display units 50 are provided on the display unit 30. That is, both of the display units 30 and the display unit 50 are arranged in matrix in the fifth exemplary embodiment, while only the display units 30 are arranged in matrix in the third exemplary embodiment. At this time, the liquid crystal alignment is different by 90 degrees between the display unit 30 and the display unit 50. That is, regarding the first viewpoint (the first pixels 31, 51), the liquid crystal alignment of the liquid crystal display unit 50 is different by 90 degrees (−90 degrees) counterclockwise with respect to the liquid crystal alignment of the display unit 30. Regarding the second viewpoint (the second pixels 32, 52), the liquid crystal alignment of the liquid crystal display unit 50 is different by 90 degrees (+90 degrees) clockwise with respect to the liquid crystal alignment of the display unit 30.

As a result, as in the case of the fourth exemplary embodiment, it is possible with the fifth exemplary embodiment to acquire a wide viewing angle characteristic even when the viewing angle is tilted in the top-and-bottom direction of the drawing.

Sixth Exemplary Embodiment

Figure 17:
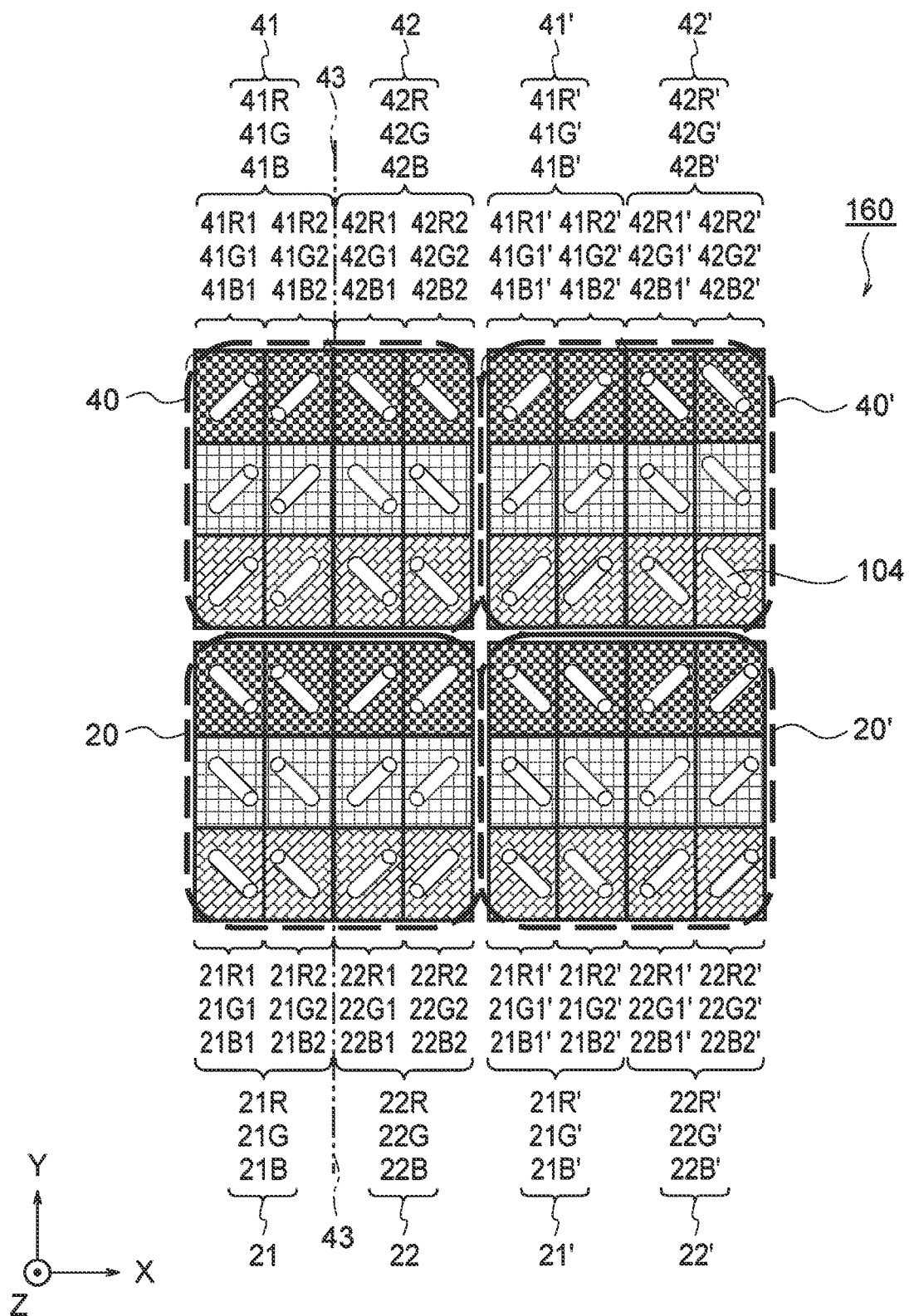
FIG. 17 is a plan view showing a liquid crystal display device according to a sixth exemplary embodiment.

FIG. 17 is a plan view showing a part of a liquid crystal display device according to a sixth exemplary embodiment. Particularly, FIG. 17 shows four kinds of display units arranged in matrix. Hereinafter, explanations will be provided by referring to those drawings.

In a display unit 160 according to the sixth exemplary embodiment, display units 20 and 40 are the same as those shown in the fourth exemplary embodiment (FIG. 14).

The display unit 20 is constituted with a first pixel 21 and a second pixel 22, the first pixel 21 is constituted with sub-pixels 21B, 21G, 21R, and the second pixel 22 is constituted with sub-pixels 22B, 22G, 22R. The sub-pixel 21B is constituted with a first domain 21B1 and a second domain 21B2, the sub-pixel 21G is constituted with a first domain 21G1 and a second domain 21G2, and the sub-pixel 21R is constituted with a first domain 21R1 and a second domain 21R2. The sub-pixel 22B is constituted with a first domain 22B1 and a second domain 22B2, the sub-pixel 22G is constituted with a first domain 22G1 and a second domain 22G2, and the sub-pixel 22R is constituted with a first domain 22R1 and a second domain 22R2.

Similarly, the display unit 40 is constituted with a first pixel 41, a second pixel 42, sub-pixels 41B, 41G, 41R, sub-pixels 42B, 42G, 42R, a first domain 41B1, a second domain 41B2, a first domain 41G1, a second domain 41G2, a first domain 41R1, a second domain 41R2, a first domain 42B1, a second domain 42B2, a first domain 42G1, a second domain 41G2, a first domain 42R1, and a second domain 42R2.

Similarly, a display unit 20' is constituted with a first pixel 21', a second pixel 22', sub-pixels 21B', 21G', 21R', sub-pixels 22B', 22G', 22R', a first domain 21B1', a second domain 21B2', a first domain 21G1', a second domain 21G2', a first domain 21R1', a second domain 21R2', a first domain 22B1', a second domain 22B2', a first domain 22G1', a second domain 21G2', a first domain 22R1', and a second domain 22R2'.

Similarly, a display unit 40' is constituted with a first pixel 41', a second pixel 42', sub-pixels 41B', 41G', 41R', sub-pixels 42B', 42G', 42R', a first domain 41B1', a second domain 41B2', a first domain 41G1', a second domain 41G2', a first domain 41R1', a second domain 41R2', a first domain 42B1', a second domain 42B2', a first domain 42G1', a second domain 41G2', a first domain 42R1', and a second domain 42R2'.

The tilt directions of the liquid crystal molecules 104 when a voltage is applied are different from each other by 90 degrees between the first pixels 21 and 41 as well as between the second pixels 22 and 42 in the two display units 20 and 40 neighboring to each other in the direction in parallel to a border 43. Similarly, the tilt directions of the liquid crystal molecules 104 when a voltage is applied are different from each other by 90 degrees between the first pixels 21' and 41' as well as between the second pixels 22' and 42' in the two display units 20' and 40' neighboring to each other in the direction in parallel to a border 43'.

In addition, the tilt directions of the liquid crystal molecules 104 when a voltage is applied in the two display units 20 and 20' neighboring to each other in the direction vertical to the border 43 are different from each other by 180 degrees between the first pixels 21 and 21' and between the second pixels 22 and 22'. More specifically, the tilt directions are different by 180 degrees from each other between the first domains 21B1 and 21B1', between the first domains 21G1 and 21G1', between the first domains 21R1 and 21R1', between the second domains 21B2 and 21B2', between the second domains 21G2 and 21G2', between the second domains 21R2 and 21R2' of the first pixels 21 and 21', and between the first domains 22B1 and 22B1', between the first domains 22G1 and 22G1', between the first domains 22R1 and 22R1', between the second domains 22B2 and 22B2', between the second domains 22G2 and 22G2', between the second domains 22R2 and 22R2' of the second pixels 22 and 22', respectively.

Similarly, the tilt directions of the liquid crystal molecules 104 when a voltage is applied in the two display units 40 and 40' neighboring to each other in the direction vertical to the border 43 are different from each other by 180 degrees between the first pixels 41 and 41' and between the second pixels 42 and 42'. More specifically, the tilt directions are different by 180 degrees from each other between the first domains 41B1 and 41B1', between the first domains 41G1 and 41G1', between the first domains 41R1 and 41R1', between the second domains 41B2 and 41B2', between the second domains 41G2 and 41G2', between the second domains 41R2 and 41R2' of the first pixels 41 and 41', and between the first domains 42B1 and 42B1', between the first domains 42G1 and 42G1', between the first domains 42R1 and 42R1', between the second domains 42B2 and 42B2', between the second domains 42G2 and 42G2', between the second domains 42R2 and 42R2' of the second pixels 42 and 42', respectively.

FIG. 17 shows the display units 20, 20' and the display unit 40, 40' arranged in matrix. Referring to FIG. 17, in the sixth exemplary embodiment, the display units 20', 40' are additionally provided on the right side of the display units 20, 40 of the fourth exemplary embodiment, respectively. That is, four kinds of the display units 20, 20', 40, 40' are arranged in matrix in the sixth exemplary embodiment, while only two kinds of the display units 20, 40 are arranged in matrix in the fourth exemplary embodiment. At this time, the liquid crystal alignment is different by 180 degrees between the display units 20 and 20' and different by 180 degrees between the display units 40 and 40'.

Figure 18:
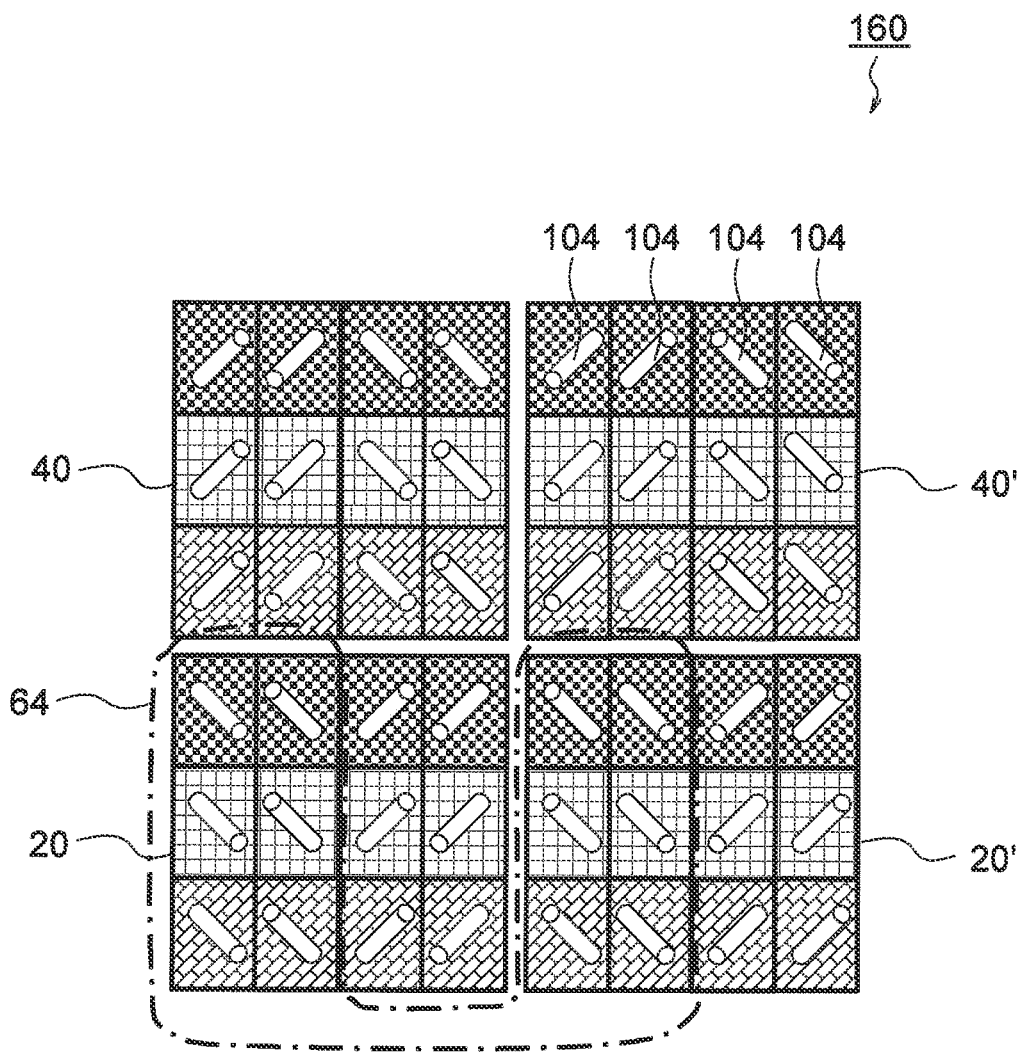
FIG. 18 is a plan view for describing the operation effects of the liquid crystal display device according to the sixth exemplary embodiment.

As a result, as shown in FIG. 18, there is a unit 64 in which the characteristics thereof compensate with each other in the left-and-right direction (i.e., the light distributing direction). In the unit 64, there are four kinds of domains having the alignment different from each other by 90 degrees, and those domains compensate with each other. This makes it possible with the sixth exemplary embodiment to acquire a wide viewing angle characteristic even when the viewing angle is tilted in the top-and-bottom direction of the drawing since the characteristics thereof compensate with each other within each viewpoint.

Seventh Exemplary Embodiment

Figure 19:
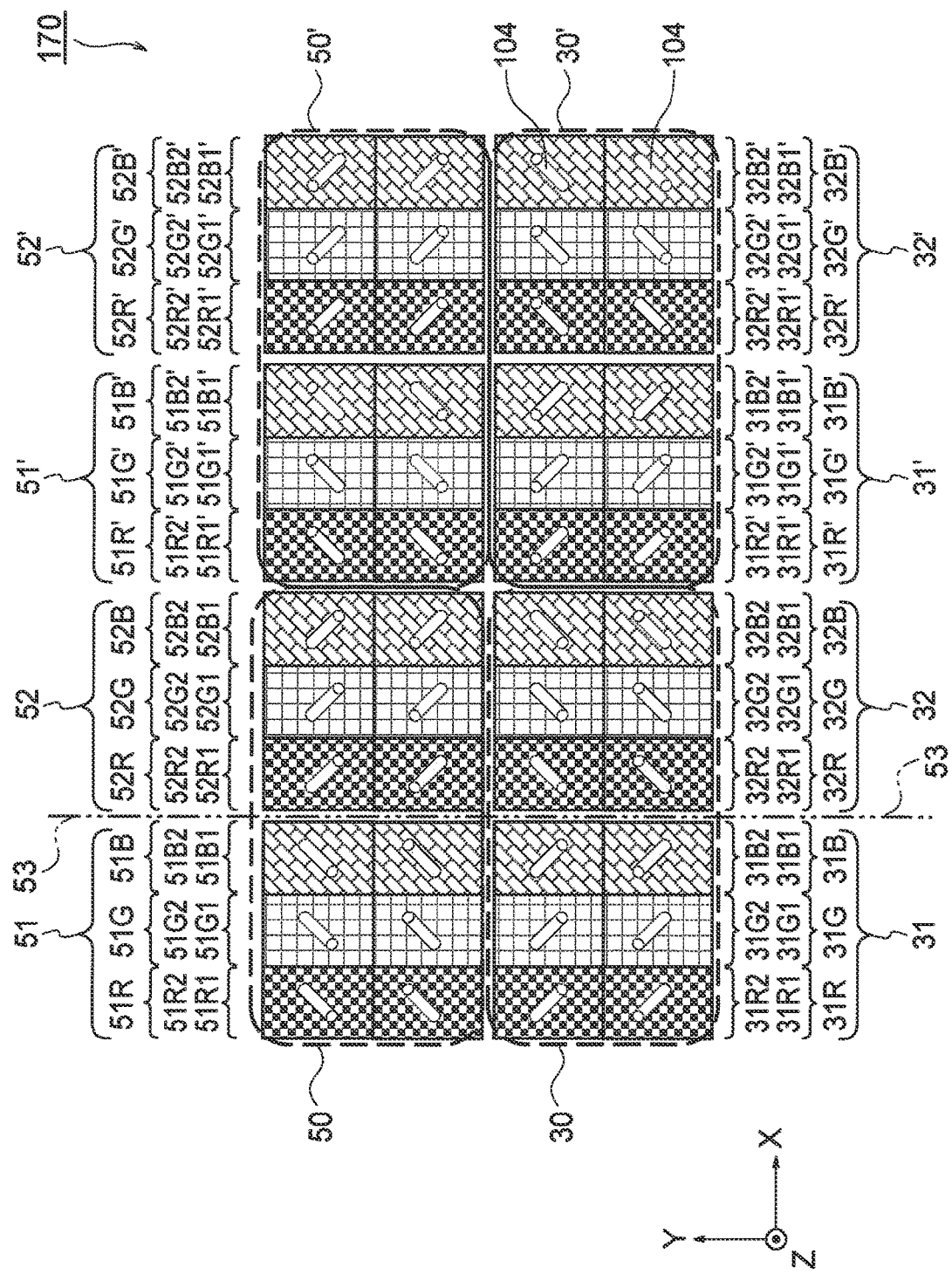
FIG. 19 is a plan view showing a liquid crystal display device according to a seventh exemplary embodiment.

FIG. 19 is a plan view showing a part of a liquid crystal display device according to a seventh exemplary embodiment. Particularly, FIG. 19 shows four kinds of display units arranged in matrix. Hereinafter, explanations will be provided by referring to those drawings.

In a liquid crystal display device 170 according to the seventh exemplary embodiment, display units 30 and 50 are the same as those shown in the fifth exemplary embodiment (FIG. 16).

The display unit 30 is constituted with a first pixel 31 and a second pixel 32. The first pixel 31 is constituted with sub-pixels 31B, 31G, 31R, and the second pixel 32 is constituted with sub-pixels 32B, 32G, and 32R. The sub-pixel 31B is constituted with a first domain 31B1 and a second domain 31B2, the sub-pixel 31G is constituted with a first domain 31G1 and a second domain 31G2, and the sub-pixel 31R is constituted with a first domain 31R1 and a second domain 31R2. The sub-pixel 32B is constituted with a first domain 32B1 and a second domain 32B2, the sub-pixel 32G is constituted with a first domain 32G1 and a second domain 32G2, and the sub-pixel 32R is constituted with a first domain 32R1 and a second domain 32R2.

Similarly, the display unit 50 is constituted with a first pixel 51, a second pixel 52, sub-pixels 51B, 51G, 51R, sub-pixels 52B, 52G, 52R, a first domain 51B1, a second domain 51B2, a first domain 51G1, a second domain 51G2, a first domain 51R1, a second domain 51R2, a first domain 52B1, a second domain 52B2, a first domain 52G1, a second domain 51G2, a first domain 52R1, and a second domain 52R2.

Similarly, a display unit 30' is constituted with a first pixel 31', a second pixel 32', sub-pixels 31B', 31G', 31R', sub-pixels 32B', 32G', 32R', a first domain 31B1', a second domain 31B2', a first domain 31G1', a second domain 31G2', a first domain 31R1', a second domain 31R2', a first domain 32B1', a second domain 32B2', a first domain 32G1', a second domain 31G2', a first domain 32R1', and a second domain 32R2'.

Similarly, a display unit 50' is constituted with a first pixel 51', a second pixel 52', sub-pixels 51B', 51G', 51R', sub-pixels 52B', 52G', 52R', a first domain 51B1', a second domain 51B2', a first domain 51G1', a second domain 51G2', a first domain 51R1', a second domain 51R2', a first domain 52B1', a second domain 52B2', a first domain 52G1', a second domain 51G2', a first domain 52R1', and a second domain 52R2'.

The tilt directions of the liquid crystal molecules 104 when a voltage is applied are different from each other by 90 degrees between the first pixels 31 and 51 as well as between the second pixels 32 and 52 in the two display units 30 and 30' neighboring to each other in the direction in parallel to a border 53. Similarly, the tilt directions of the liquid crystal molecules 104 when a voltage is applied are different from each other by 90 degrees between the first pixels 31' and 51' as well as between the second pixels 32' and 52' in the two display units 30' and 50' neighboring to each other in the direction in parallel to a border 53'.

In addition, the tilt directions of the liquid crystal molecules 104 when a voltage is applied in the two display units 30 and 30' neighboring to each other in the direction vertical to the border 53 are different from each other by 180 degrees between the first pixels 31 and 31' and between the second pixels 32 and 32'. More specifically, the tilt directions are different by 180 degrees from each other between the first domains 31B1 and 31B1', between the first domains 31G1 and 31G1', between the first domains 31R1 and 31R1', between the second domains 31B2 and 31B2', between the second domains 31G2 and 31G2', between the second domains 31R2 and 31R2' of the first pixels 31 and 31', and between the first domains 32B1 and 32B1', between the first domains 32G1 and 32G1', between the first domains 32R1 and 32R1', between the second domains 32B2 and 32B2', between the second domains 32G2 and 32G2', between the second domains 32R2 and 32R2' of the second pixels 32 and 32', respectively.

Similarly, the tilt directions of the liquid crystal molecules 104 when a voltage is applied in the two display units 50 and 50' neighboring to each other in the direction vertical to the border 53 are different from each other by 180 degrees between the first pixels 51 and 51' and between the second pixels 52 and 52'. More specifically, the tilt directions are different by 180 degrees from each other between the first domains 51B1 and 51B1', between the first domains 51G1 and 51G1', between the first domains 51R1 and 51R1', between the second domains 51B2 and 51B2', between the second domains 51G2 and 51G2', between the second domains 51R2 and 51R2' of the first pixels 51 and 51', and between the first domains 52B1 and 52B1', between the first domains 52G1 and 52G1', between the first domains 52R1 and 52R1', between the second domains 52B2 and 52B2', between the second domains 52G2 and 52G2', between the second domains 52R2 and 52R2' of the second pixels 52 and 52', respectively.

In FIG. 19, the display units 30, 30' and the display units 50, 50' arranged in matrix are shown. In FIG. 19, in the seventh exemplary embodiment, the display units 30', 50' are additionally provided on the right side of the display units 30, 50 of the fifth exemplary embodiment, respectively. That is, four kinds of the display units 30, 30', 50, 50' are arranged in matrix in the seventh exemplary embodiment, while only two kinds of the display units 30, 50 are arranged in matrix in the fourth exemplary embodiment. At this time, the liquid crystal alignment is different by 180 degrees between the display units 30 and 30' and also different by 180 degrees between the display units 50 and 50'. As a result, it is possible with the seventh exemplary embodiment to acquire a wide viewing angle characteristic even when the viewing angle is tilted in the left-and-right direction of the drawing, as in the case of the sixth exemplary embodiment.

Eighth Exemplary Embodiment

Figure 20:
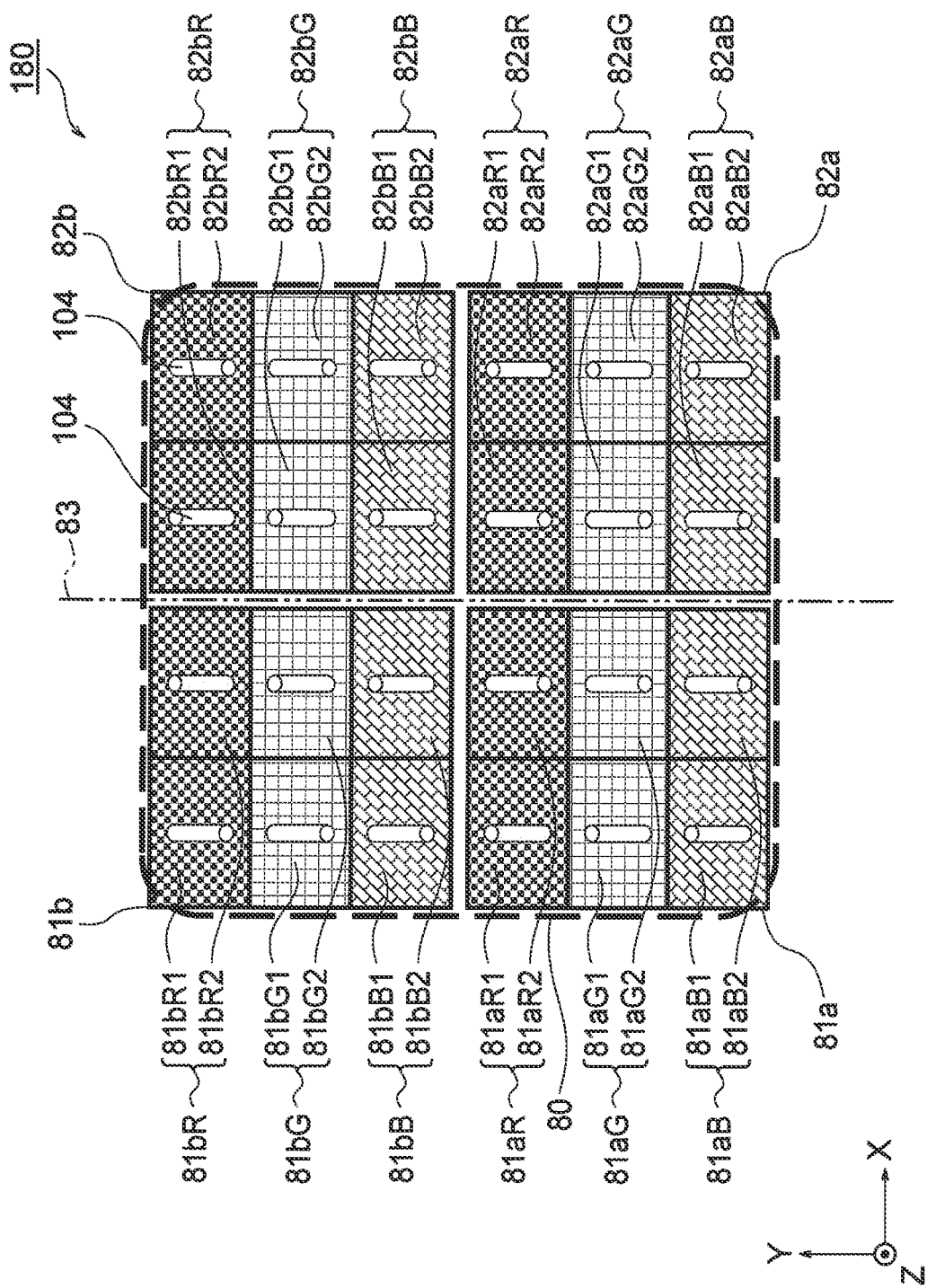
FIG. 20 is a plan view showing a liquid crystal display device according to an eighth exemplary embodiment.

FIG. 20 is a plan view showing a part of a liquid crystal display device according to an eighth exemplary embodiment. Particularly, FIG. 20 shows display units arranged in matrix. Hereinafter, explanations will be provided by referring to those drawings.

In a display unit 180 according to the eighth exemplary embodiment, a display unit 80 includes two first pixels 81A, 81b and two second pixels 82a, 82b. The tilt directions of the liquid crystal molecules 104 when a voltage is applied are different from each other by 180 degrees between the first pixels 81a and 81b as well as between the second pixels 82a and 82b neighboring to each other in the direction in parallel to a border 83. The first pixels 81a, 81b and the second pixels 82a, 82b are similar to the display unit of the first exemplary embodiment (FIGS. 1A and 1B), respectively.

The first pixel 81a is constituted with sub-pixels 81aB, 81aG, 81aR, the first pixel 81b is constituted with sub-pixels 81bB, 81bG, 81bR, the second pixel 82a is constituted with sub-pixels 82aB, 82aG, 82aR, and the second pixel 82b is constituted with sub-pixels 82bB, 82bG, 82bR. The sub-pixel 81aB is constituted with a first domain 81aB1 and a second domain 81aB2, the sub-pixel 81aG is constituted with a first domain 81aG1 and a second domain 81aG2, and the sub-pixel 81aR is constituted with a first domain 81aR1 and a second domain 81aR2. The sub-pixel 81bB is constituted with a first domain 81bB1 and a second domain 81bB2, the sub-pixel 81bG is constituted with a first domain 81bG1 and a second domain 81bG2, and the sub-pixel 81bR is constituted with a first domain 81bR1 and a second domain 81bR2. The sub-pixel 82aB is constituted with a first domain 82aB1 and a second domain 82aB2, the sub-pixel 82aG is constituted with a first domain 82aG1 and a second domain 82aG2, and the sub-pixel 82aR is constituted with a first domain 82aR1 and a second domain 82aR2. The sub-pixel 82bB is constituted with a first domain 82bB1 and a second domain 82bB2, the sub-pixel 82bG is constituted with a first domain 82bG1 and a second domain 82bG2, and the sub-pixel 82bR is constituted with a first domain 82bR1 and a second domain 82bR2.

The first pixels 81a, 81b display an image for the first viewpoint, and the second pixels 82a, 82b displays an image for the second viewpoint. The tilt directions of the liquid crystal molecules 104 are different from each other by 180 degrees between the first domains 81aB1, —and the second domains 81aB2, —. The tilt directions of the liquid crystal molecules 104 are different by 180 degrees between the first pixel 81a and the second pixel 82a neighboring to each other in the direction vertical to the border 83. Similarly, the tilt directions of the liquid crystal molecules 104 are different by 180 degrees between the first pixel 81b and the second pixel 82b. The tilt directions of the liquid crystal molecules 104 are different by 180 degrees between the first pixels 81a and 81b as well as between the second pixels 82a and 82b neighboring to each other in the direction in parallel to the border 83, respectively. That is, the alignment directions are different by 180 degrees between the pixels arranged on the left and right sides of each other and between the pixels arranged on the top and bottom sides of each other, respectively. As a result, it is possible with the eighth exemplary embodiment to acquire a wide viewing angle characteristic since the characteristics of the pixels compensate with each other.

Ninth Exemplary Embodiment

Figure 21:
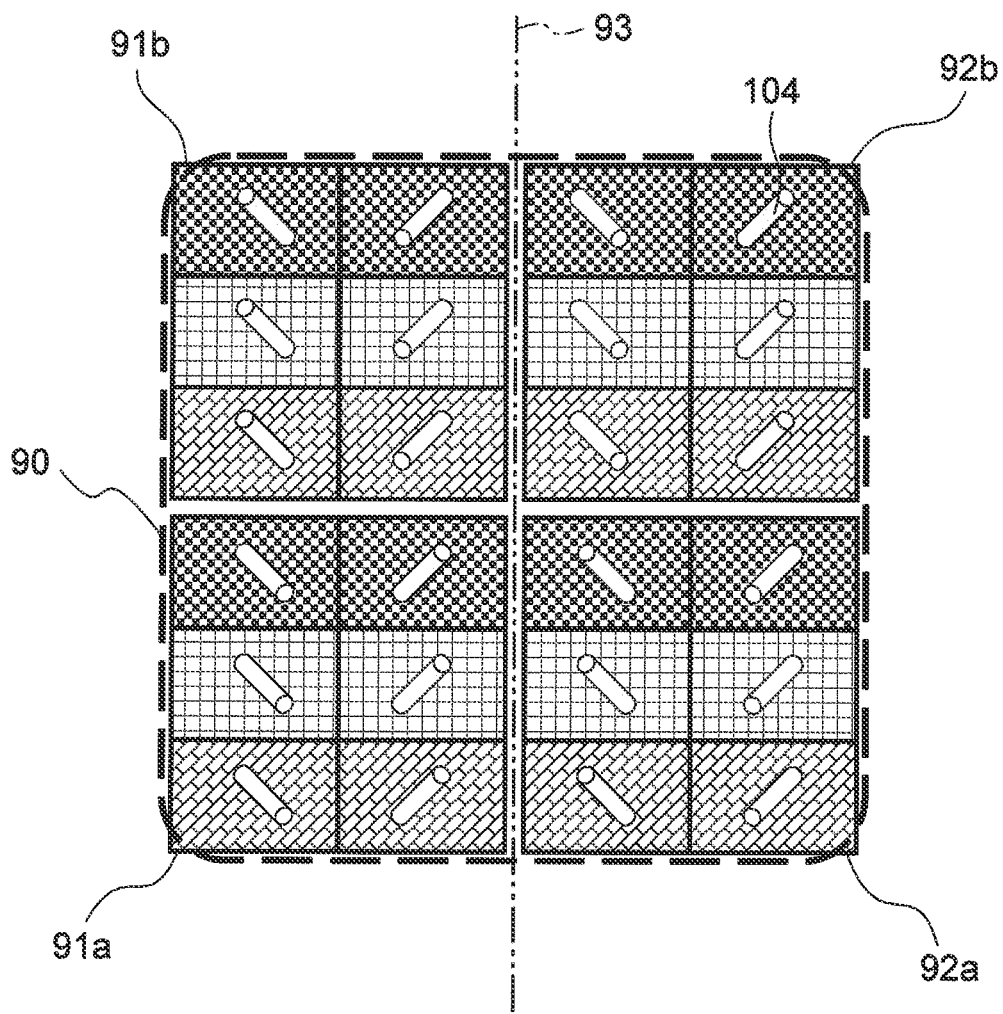
FIG. 21 is a plan view showing a liquid crystal display device according to a ninth exemplary embodiment.

FIG. 21 is a plan view showing a part of a liquid crystal display device according to a ninth exemplary embodiment. Particularly, FIG. 21 shows display units arranged in matrix. Hereinafter, explanations will be provided by referring to those drawings.

A liquid crystal display device according to the ninth exemplary embodiment is the same as the liquid crystal display device according to the first exemplary embodiment in respect to the points that a liquid crystal exhibiting negative anisotropy is sandwiched between a pair of substrates, liquid crystal molecules constituting the liquid crystal are initially aligned almost vertically to the pair of substrates and, and display units each including at least a first pixel for displaying an image for a first viewpoint and a second pixel for displaying an image for a second viewpoint are arranged in matrix (see FIG. 2).

In a liquid crystal display device 190 according to the ninth exemplary embodiment, a display unit 90 includes two first pixels 91a, 91b, and two second pixels 92a, 92b. The first pixels 91a, 91b display an image for a first viewpoint, and the second pixels 92a, 92b display an image for a second viewpoint. The tilt direction of the liquid crystal molecules 104 when a voltage is applied is within a plane that is at an angle of 45 degrees with respect to a border 93 between the first pixels 91a, 91b and the second pixels 92a, 92b. The tilt directions are different from each other by 180 degrees between the first pixels 91a, 91b and the second pixels 92a, 92b, and different from each other by 180 degrees between the first pixels 91a and 91b as well as between the second pixels 92a and 92b neighboring to each other in the direction in parallel to the border 93. The first pixels 91a, 91b and the second pixels 92a, 92b are the same as the first pixel and the second pixel of the eighth exemplary embodiment (FIG. 20), respectively, except for the tilt directions of the liquid crystal molecules 104.

Further, two domains where the tilt directions of the liquid crystal molecules are different are provided within each pixel. The liquid crystal alignment is different by 90 degrees between the two domains. Furthermore, the liquid crystal alignment is different by 180 degrees between each of the pixels arranged on the left and right sides of each other and between each of the pixels arranged on the top and bottom sides of each other. As a result, it is possible to acquire a wide viewing angle characteristic since the pixels compensate with each other. In particular, when a same image is inputted to the first-viewpoint sub-pixel and the second-viewpoint sub-pixel, four domains where the alignment directions of the liquid crystal molecules are different are to exist within the two pixels neighboring to each other in the left-and-right direction. This makes it possible to acquire a wide viewing angle characteristic of 2D images.

Tenth Exemplary Embodiment

A liquid crystal display device according to a tenth exemplary embodiment is the same as the liquid crystal display device according to the first exemplary embodiment in respect to the points that a liquid crystal exhibiting negative anisotropy is sandwiched between a pair of substrates, and liquid crystal molecules constituting the liquid crystal are initially aligned almost vertically to the pair of substrates. In the tenth exemplary embodiment, there are not only the two viewpoints of the first and second viewpoints but three or more viewpoints.

Figure 58:
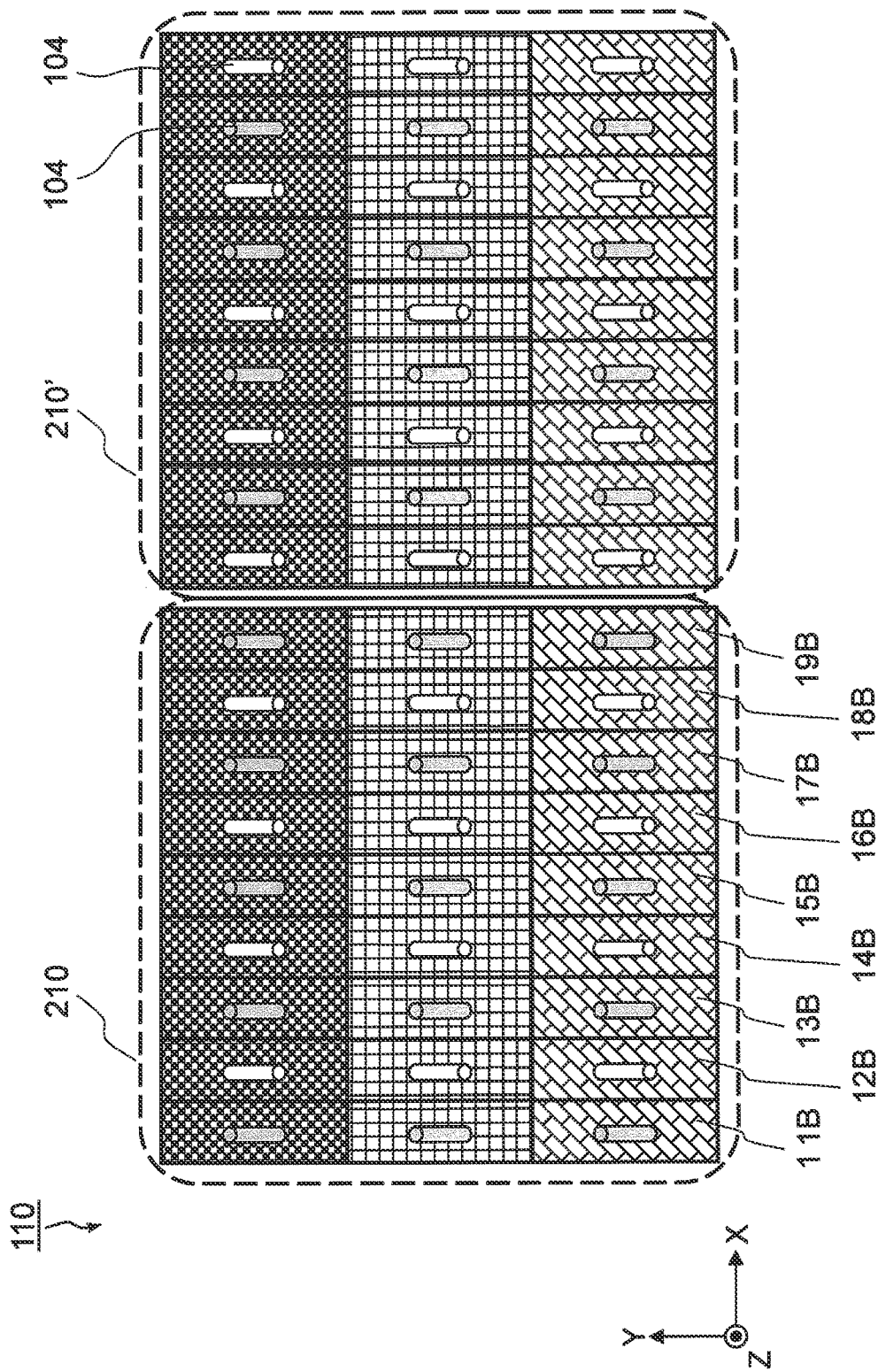
FIG. 58 is a plan view showing a liquid crystal display device according to a tenth exemplary embodiment.
Figure 59:
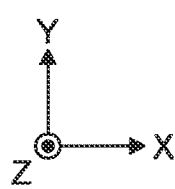
FIG. 59 is a schematic view showing a display unit of FIG. 58.

FIG. 58 is a plan view showing the liquid crystal display device according to the tenth exemplary embodiment, and FIG. 59 is a schematic view showing an example of display units of FIG. 58. In the tenth exemplary embodiment, shown is a 9-parallax (i.e., nine viewpoints) liquid crystal display device to which the liquid crystal display device of the first exemplary embodiment is applied. In FIG. 58, same reference numerals as those of the structural elements of FIGS. 1A and 1B are used for the structural elements that correspond to those of FIGS. 1A and 1B. However, the number of parallaxes is as many as nine (i.e., there are nine viewpoints) in the tenth exemplary embodiment, so that there are more sub-pixels from the sub-pixels 13B, 13G, 13R for displaying an image for a third viewpoint to the sub-pixels 19B, 19G, 19R for displaying an image for a ninth viewpoint in addition to the sub-pixels 11B, TG, 11R for displaying an image for the first viewpoint and the sub-pixels 12B, 12G, 12R for displaying an image for the second viewpoint.

For example, those sub-pixels from 11B, 11G, 11R to 19B, 19G, 19R are included in a display unit 210. A pixel 211 which displays an image for the first viewpoint includes the sub-pixels 11B, 11G, and 11R. While only the display unit 10 exists as the display unit in the first exemplary embodiment, there are two kinds of display units such as 210 and 210' as the display units of the tenth exemplary embodiment.

As in the case of the first exemplary embodiment, regarding the sub-pixels for displaying images for neighboring two viewpoints, the tilt direction of the liquid crystal molecules of the sub-pixel which displays the image of one of the viewpoints is at −90 degrees (270 degrees) when measured from the X-axis direction, and the tilt direction of the liquid crystal molecules of the sub-pixel which displays the image of the other viewpoint is at 90 degrees. These directions are different from each other by 90 degrees. In FIG. 58, among the sub-pixels constituting the display unit 210, for example, the tilt direction of the liquid crystal of the sub-pixel 13B which displays the image of the third viewpoint is −90 degrees (270 degrees), and the tilt directions of the sub-pixel 14B for displaying the image of the fourth viewpoint and the sub-pixel 12B for displaying the image of the second viewpoint neighboring to the sub-pixel 13B are 90 degrees. As a result, it can be found that the same effects as those of the first exemplary embodiment can be achieved with the tenth exemplary embodiment.

However, the number of viewpoints is an odd number, i.e., 9, in the case shown in FIG. 58, so that it is partially different from that of the first exemplary embodiment. That is, the tilt direction of the liquid crystal of the sub-pixel for displaying the first-viewpoint image in the display unit 210 is −90 degrees (270 degrees), while the tilt direction of the sub-pixel for displaying the first-viewpoint image in the display unit 210' is 90 degrees. That is, when the pixels for displaying the images for the same viewpoint of the neighboring display units are compared, the tilt directions of the liquid crystal are different by 180 degrees. This is because the number of viewpoints is an odd number, so that one direction appears more often than the other direction when there are two directions and the two different directions along which the liquid crystal is tilted are arranged alternately. The direction that appears more often in a given display unit is arranged to appear less frequently in another display unit neighboring thereto in the X-direction. This makes it possible to achieve effective compensation. In this manner, the display unit 210 and the display unit 210' in FIG. 58 compensate with each other. In FIG. 59, reference numerals 211 to 219 show the first to ninth pixels, and reference numerals 221 to 228 show borders between each of the pixels.

Eleventh Exemplary Embodiment

A liquid crystal display device according to an eleventh exemplary embodiment is the same as the liquid crystal display device according to the first exemplary embodiment in respect to the points that a liquid crystal exhibiting negative anisotropy is sandwiched between a pair of substrates, and liquid crystal molecules constituting the liquid crystal are initially aligned almost vertically to the pair of substrates. In the eleventh exemplary embodiment, there are not only the two viewpoints of the first and second viewpoints but three or more viewpoints.

Figure 60:
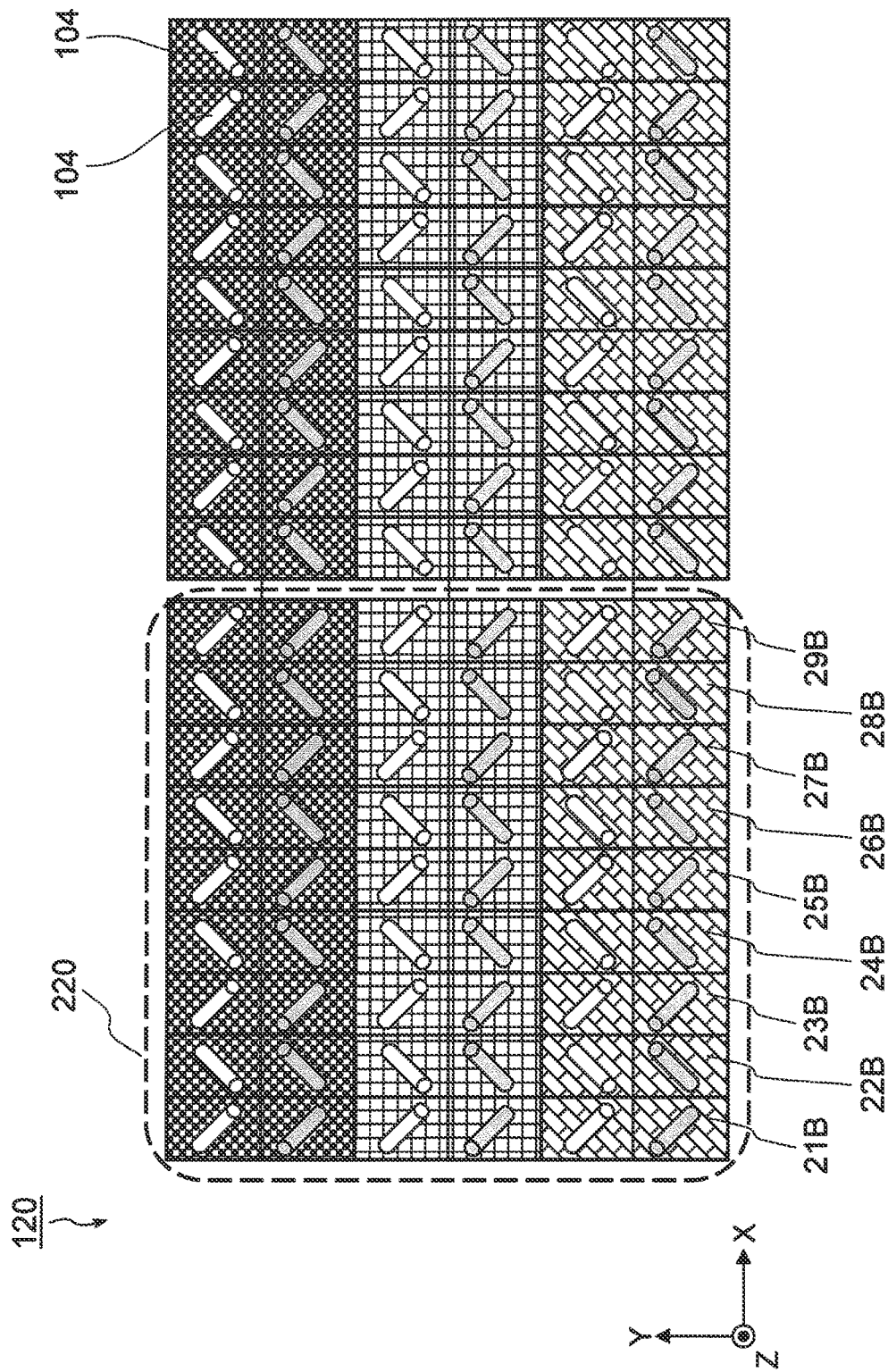
FIG. 60 is a plan view showing a liquid crystal display device according to an eleventh exemplary embodiment.
Figure 61:
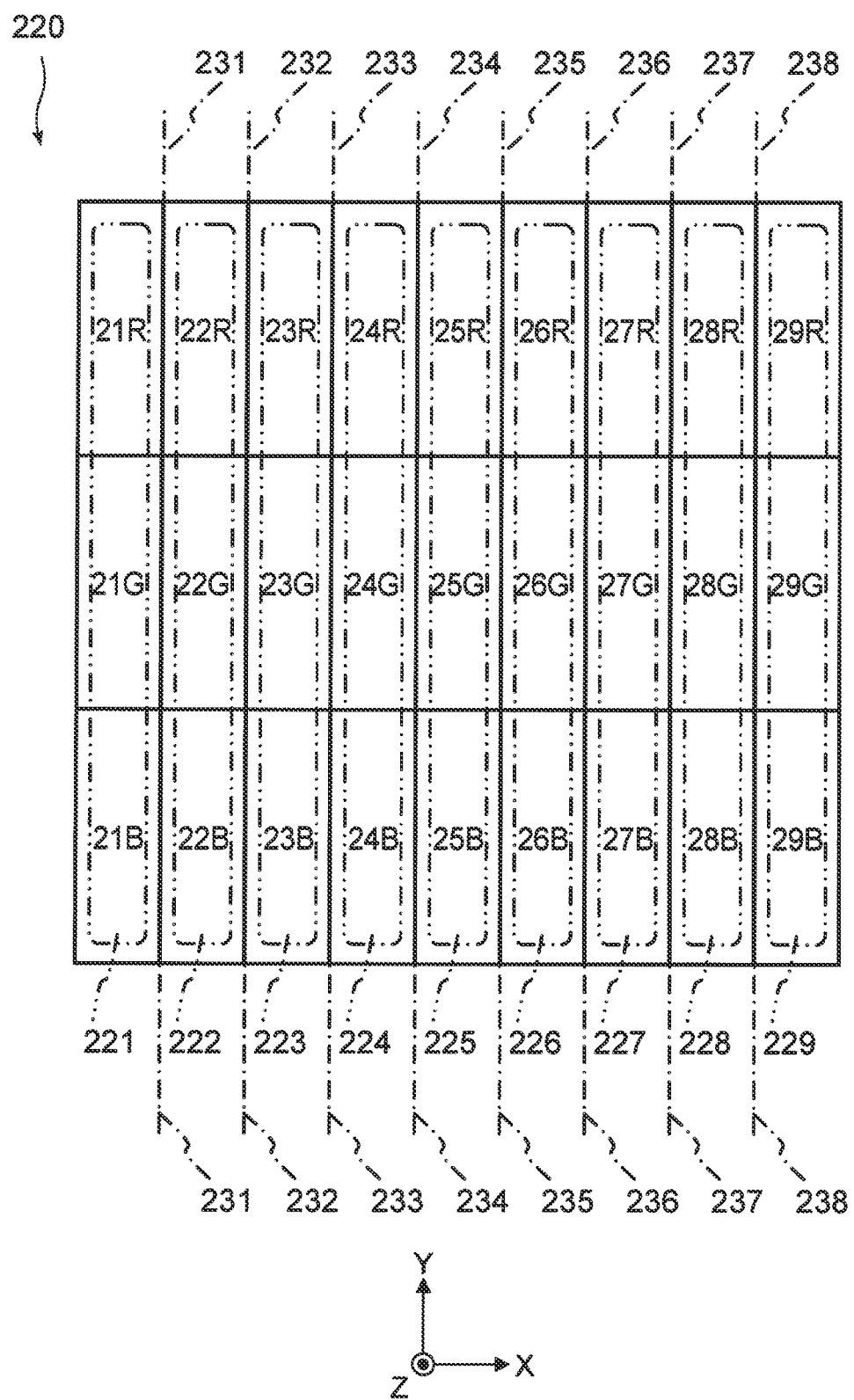
FIG. 61 is a schematic view showing a display unit of FIG. 60.

FIG. 60 is a plan view showing the liquid crystal display device according to the eleventh exemplary embodiment, and FIG. 61 is a schematic view showing an example of a display unit of FIG. 60. In the eleventh exemplary embodiment, shown is a 9-parallax (i.e., nine viewpoints) liquid crystal display device to which the liquid crystal display device of the second exemplary embodiment is applied. In FIG. 61, same reference numerals as those of the structural elements of FIGS. 6A and 6B are used for the structural elements that correspond to those of FIGS. 6A and 6B. However, the number of parallaxes is as many as nine (i.e., there are nine viewpoints) in the eleventh exemplary embodiment, so that there are more sub-pixels from the sub-pixels 23B, 23G, 23R for displaying an image for a third viewpoint to the sub-pixels 29B, 29G, 29R for displaying an image for a ninth viewpoint in addition to the sub-pixels 21B, 21G, 21R for displaying an image for the first viewpoint and the sub-pixels 22B, 22G, 22R for displaying an image for the second viewpoint.

For example, those sub-pixels from 21B, 21G, 21R to 29B, 29G, 29R are included in a display unit 220. A pixel 221 which displays an image for the first viewpoint includes the sub-pixels 21B, 21G, and 21R. While only the display unit 20 exists as the display unit in the second exemplary embodiment shown in FIGS. 6A and 6B, there are two kinds of display units such as 220 and 220' as the display units of the eleventh exemplary embodiment.

As in the case of the second exemplary embodiment, regarding the sub-pixels for displaying image of neighboring two viewpoints, there are two regions at 45 degrees and 215 degrees as the tilt directions of the liquid crystal molecules of the sub-pixel which displays the image of one of the viewpoints when measured from the X-axis direction, and there are two regions at 135 degrees and −45 degrees (315 degrees) as the tilt directions of the liquid crystal molecules of the sub-pixel which displays the image of the other viewpoint. These are different from each other by 90 degrees. In FIG. 60, among the sub-pixels constituting the display unit 220, for example, there are two regions at 45 degrees and 215 degrees as the tilt directions of the liquid crystal of the sub-pixel 23B which displays the image of the third viewpoint, and there are two regions at 135 degrees and −45 degrees (315 degrees) as the tilt directions of the sub-pixel 24B for displaying the image of the fourth viewpoint and the sub-pixel 22B for displaying the image of the second viewpoint neighboring to the sub-pixel 23B. As a result, it can be found that the same effects as those of the second exemplary embodiment can be achieved with the eleventh exemplary embodiment.

Figure 65:
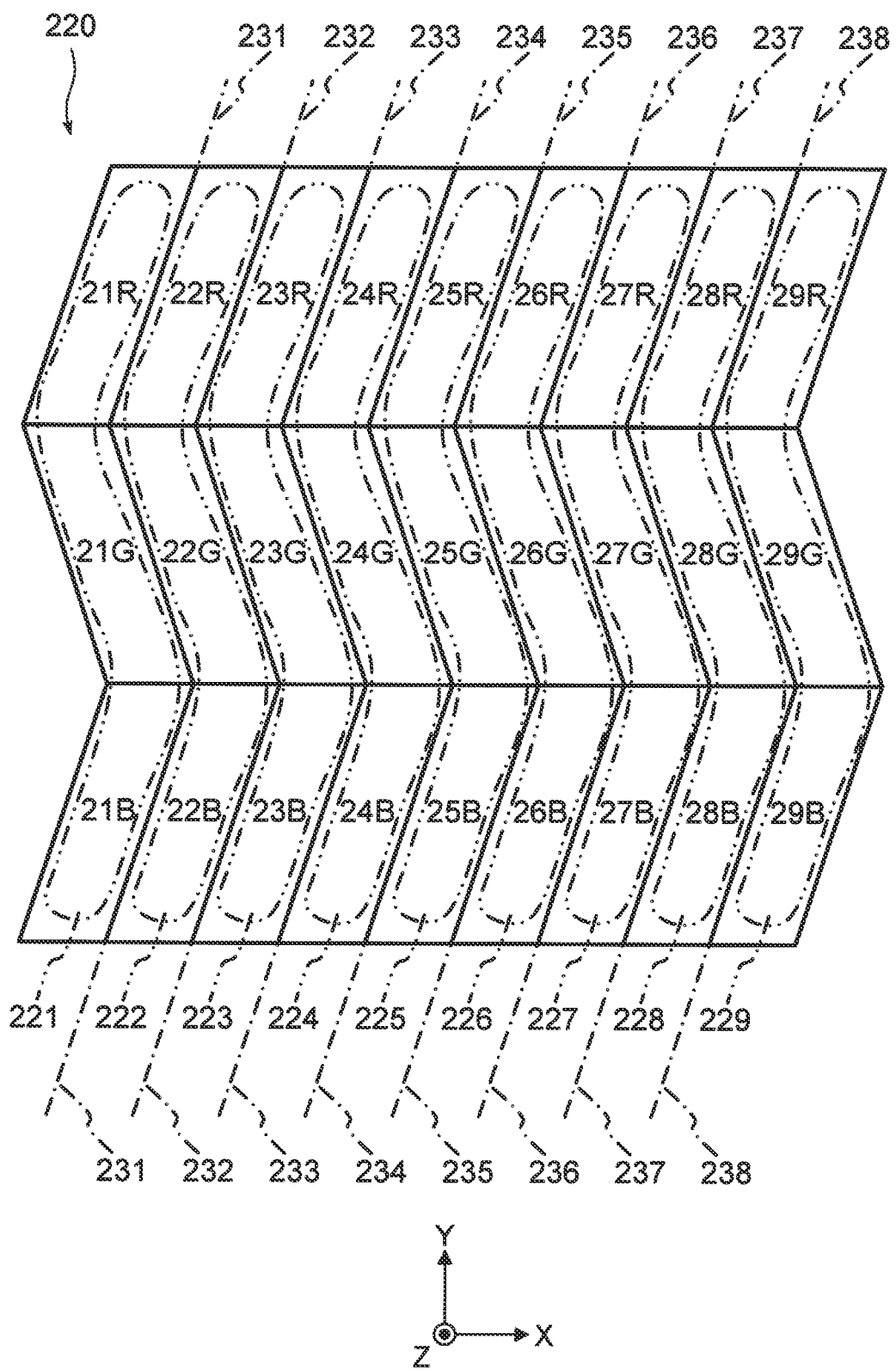
FIG. 65 is a schematic view showing a display unit of FIG. 64.

However, the number of viewpoints is an odd number, i.e., 9, in the case shown in FIG. 60, so that it is partially different from that of the second exemplary embodiment. That is, there are the two regions at 45 degrees and 215 degrees as the tilt directions of the liquid crystal of the sub-pixel for displaying the first-viewpoint image in the display unit 220, while there are the two regions at 135 degrees and −45 degrees (315 degrees) as the tilt directions of the sub-pixel for displaying the first-viewpoint image in the display unit 220'. That is, when the pixels for displaying the images for the same viewpoint of the neighboring display units are compared, the tilt directions of the liquid crystal are different by 90 degrees. This is because the number of viewpoints is an odd number, so that one direction appears more often than the other direction when there are the two different directions along which the liquid crystal is tilted and those are arranged alternately. The direction that appears more often in a given display unit is arranged to appear less frequently in another display unit neighboring thereto in the X-direction. This makes it possible to achieve effective compensation. In this manner, the display unit 220 and the display unit 220' in FIG. 60 compensate with each other. In FIG. 61 and FIG. 65, reference numerals 221 to 229 show the first to ninth pixels, and reference numerals 231 to 238 show borders between each of the pixels.

Example 1

Figure 22:
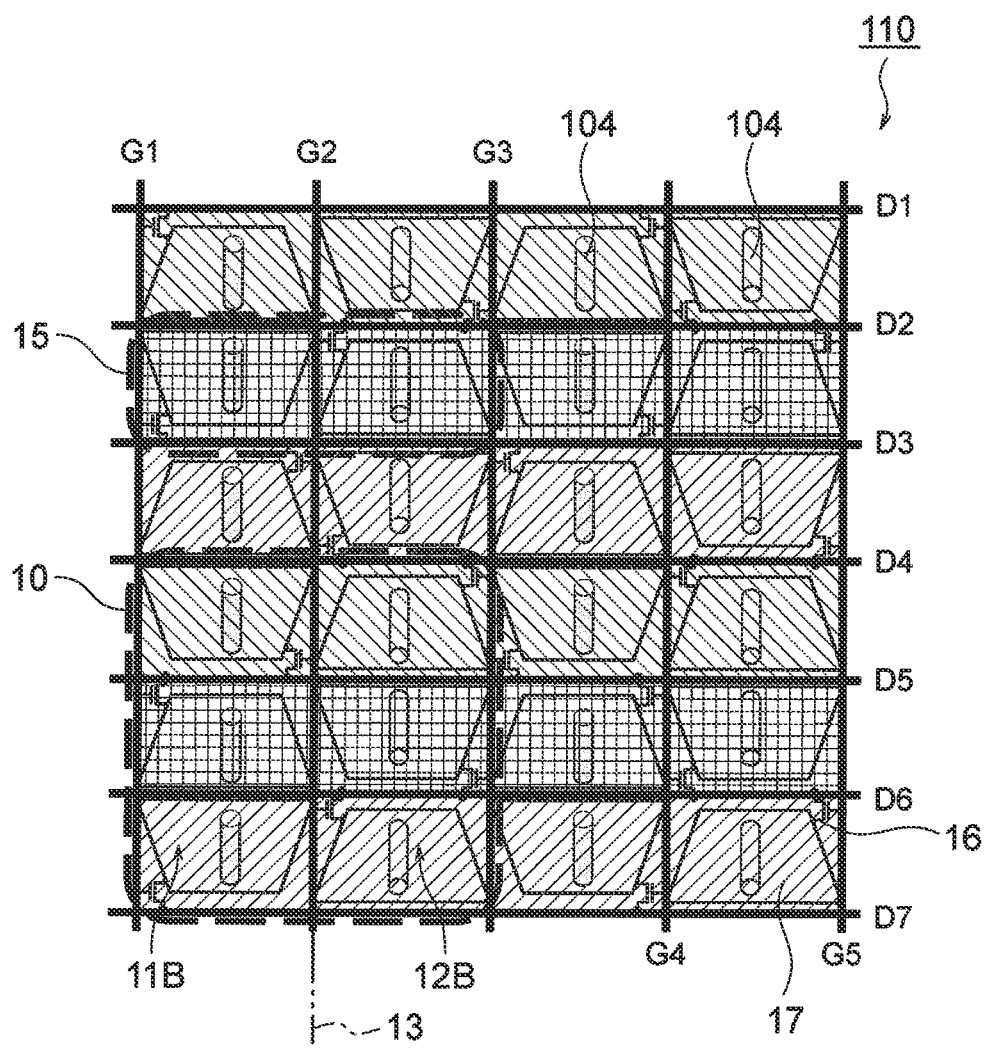
FIG. 22 is a plan view showing a liquid crystal display device according to Example 1.

FIG. 22 is a plan view showing a liquid crystal display device according to Example 1 that is a more concretive example of the liquid crystal display device according to the first exemplary embodiment. In FIG. 22, same reference numerals as those of the structural elements of FIGS. 1A and 1B are used for the structural elements corresponding to those of FIGS. 1A and 1B. Sub-pixels 11B, —display an image for the first viewpoint and sub-pixels 12B display an image for the second viewpoint. A plural-viewpoints unit 15 is constituted with the sub-pixels 11B, —and the sub-pixels 12B, —corresponding to the two viewpoints. Through gathering the plural-viewpoints unit 15 corresponding to each color, a display unit 10 for displaying information of pixels for one video including color information and viewpoint information is constituted. In Example 1, it is defined that colors are the three colors of red, green, and blue, and a single display unit 10 is constituted with the three plural-viewpoints units 15. For example, a switch 16 constituted with TFT is provided to the sub-pixels 11B, —for displaying the image for each viewpoint. A video signal is written to a pixel electrode 17 by writing a signal as appropriate to gate lines G1, G2, —and data lines D1, D2, —. The tilt directions of the liquid crystal molecules 104 are different by 180 degrees between the first-viewpoint sub-pixel 11B and the second-viewpoint sub-pixel 12B neighboring to each other. Further, the tilt directions are within a plane that is in parallel to a border 13 between the first-viewpoint sub-pixel 11B and the second-viewpoint sub-pixel 12B.

Figure 23:
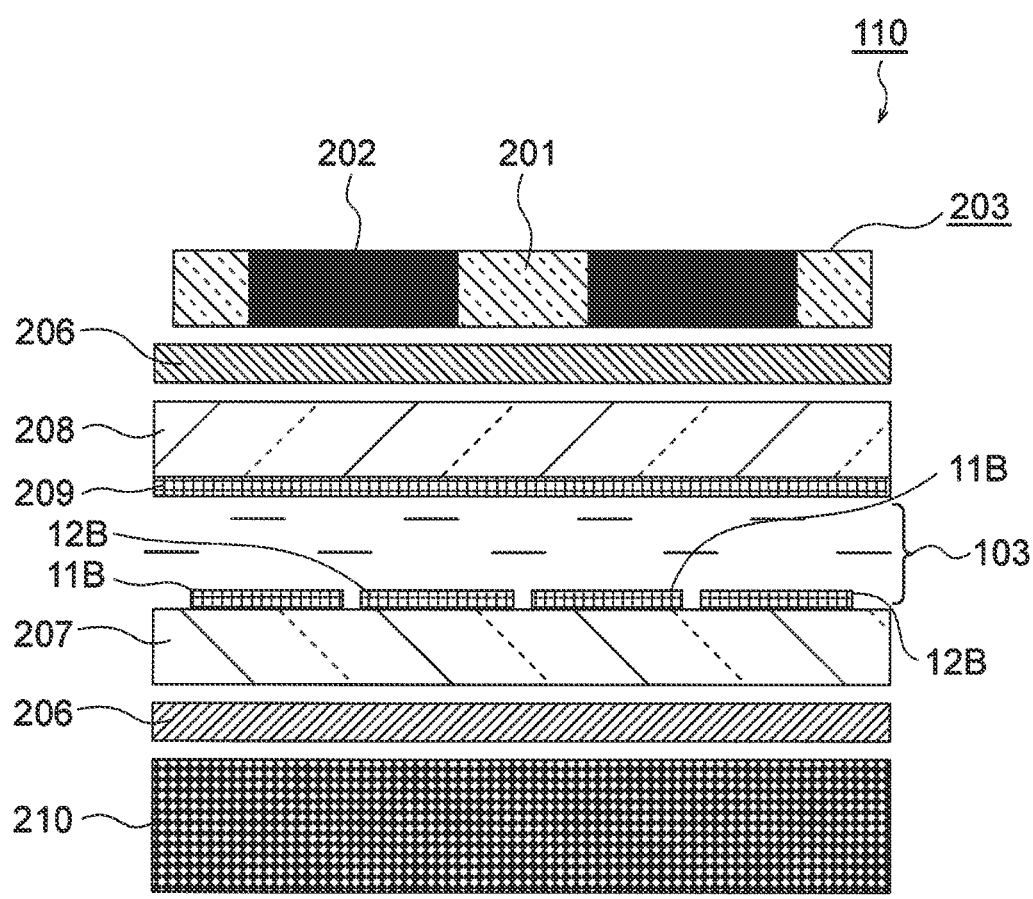
FIG. 23 is a sectional view showing a liquid crystal display device according to Example 1.

FIG. 23 is a sectional view of the liquid crystal display device of Example 1. There is a liquid crystal 103 between a TFT substrate 207 and a counter substrate 208, and the liquid crystal display device 110 operates by an electric field between a counter electrode 209 and a pixel electrode 17 (FIG. 22) on the TFT substrate 207. There are a plurality of first-viewpoint sub-pixels 11B, —and second-viewpoint sub-pixels 12B, —on the TFT substrate 207. Two polarization plates 206 are provided outside the TFT substrate 207 and the counter substrate 208, respectively. In the drawing, a backlight 210 is provided on the TFT substrate 207 side, and a barrier layer 203 is provided on the counter substrate 208 side.

Figure 24A:
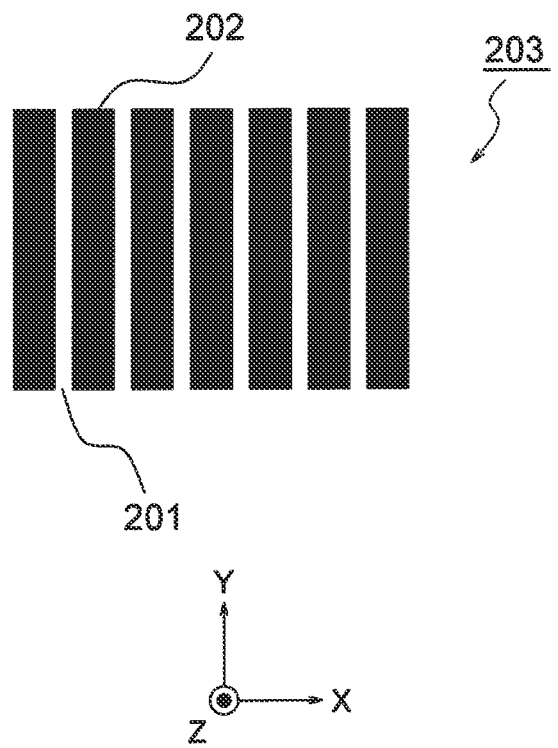
FIG. 24A is a plan view showing a barrier layer according to Example 1.
Figure 24B:
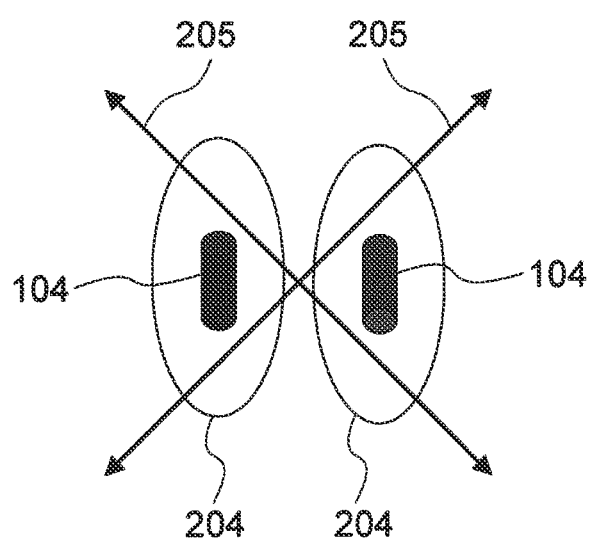
FIG. 24B is a plan view showing a relationship between a liquid crystal alignment region and a polarization plate of Example 1.

FIG. 24A shows the structure of the barrier layer, and FIG. 24B shows a relationship between the polarization plate and the liquid crystal alignment region. The barrier layer 203 has the structure in which a transmission region 201 and a non-transmission region 202 are arranged alternately, and the arranged direction is the X-axis direction. Further, a transmission-axis directions 205 of the polarization plate 206 are the directions tilted by 45 degrees from the X-axis direction and the Y-axis direction as shown in the drawing. Specific liquid crystal alignment regions 204 are disposed in such a manner that the tilt directions of the liquid crystal molecules 104 are located in the directions tilted by 45 degrees with respect to the transmission-axis directions 205 of the polarization plate 206.

The characteristic acquired by Example 1 is as shown in FIG. 4 and FIG. 5, which can be found as a sufficiently wide viewing angle characteristic in the X-axis direction.

Comparative Example 1-1

Figure 25:
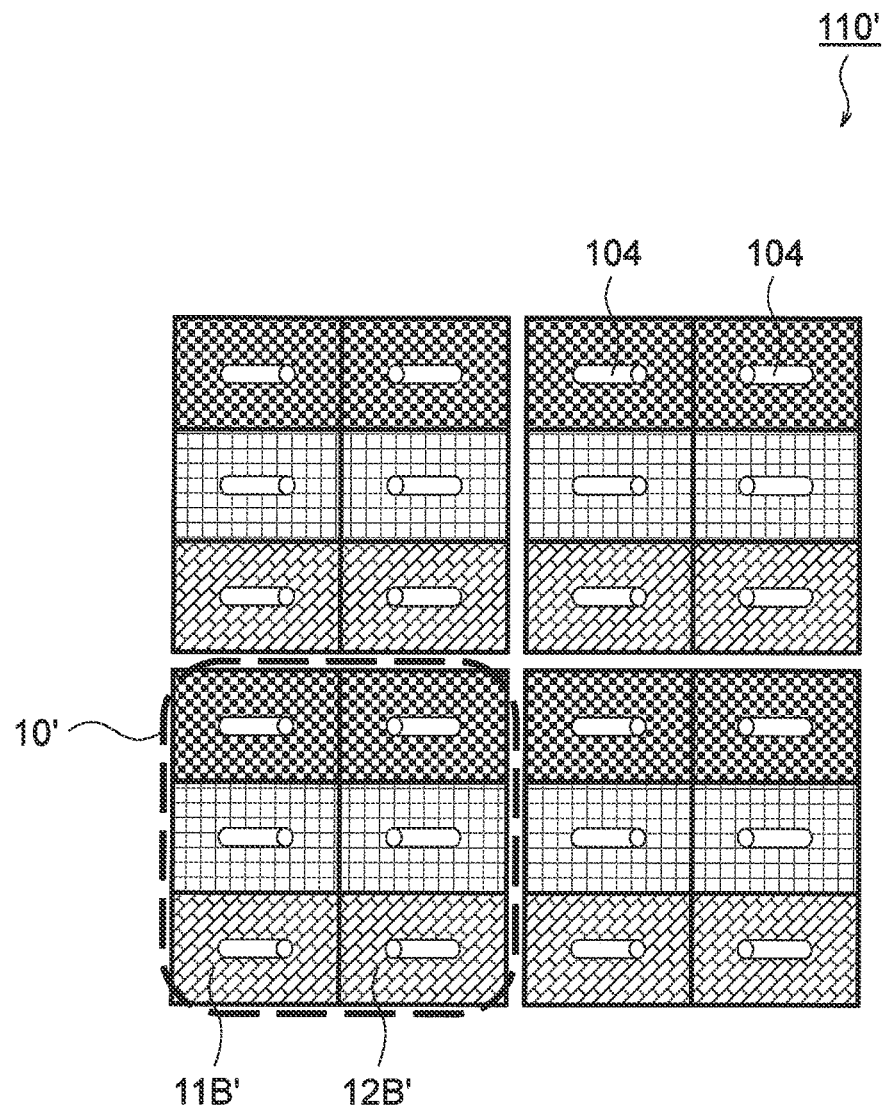
FIG. 25 is a plan view showing Comparative Example 1-1 of the first exemplary embodiment.
Figure 26A:
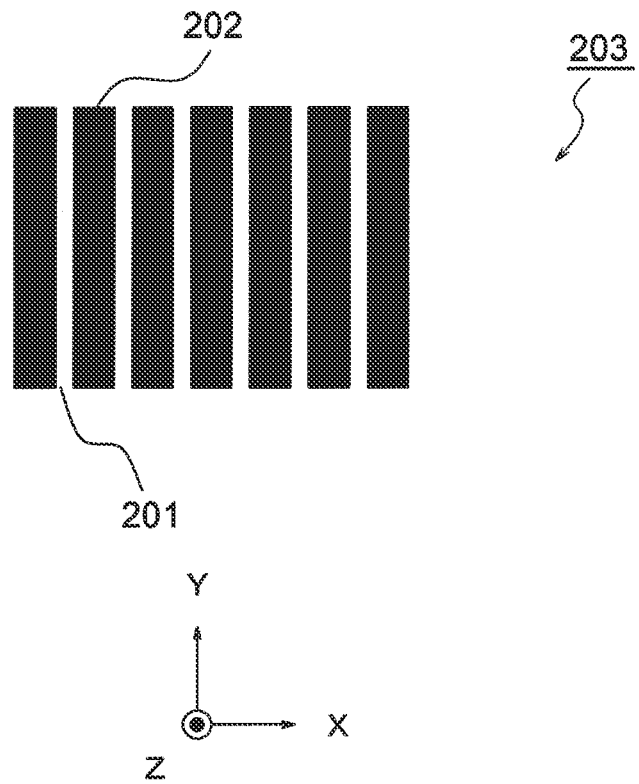
FIG. 26A is a plan view showing a barrier layer according to Comparative Example 1-1.
Figure 26B:
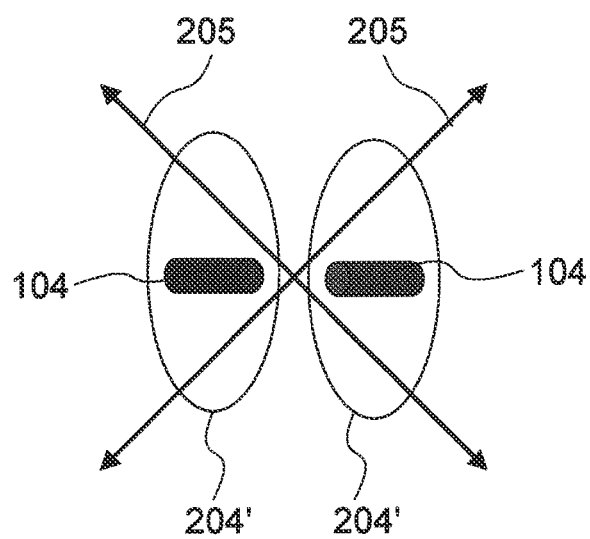
FIG. 26B is a plan view showing a relationship between a liquid crystal alignment region and a polarization plate of Comparative Example 1-1.
Figure 27:
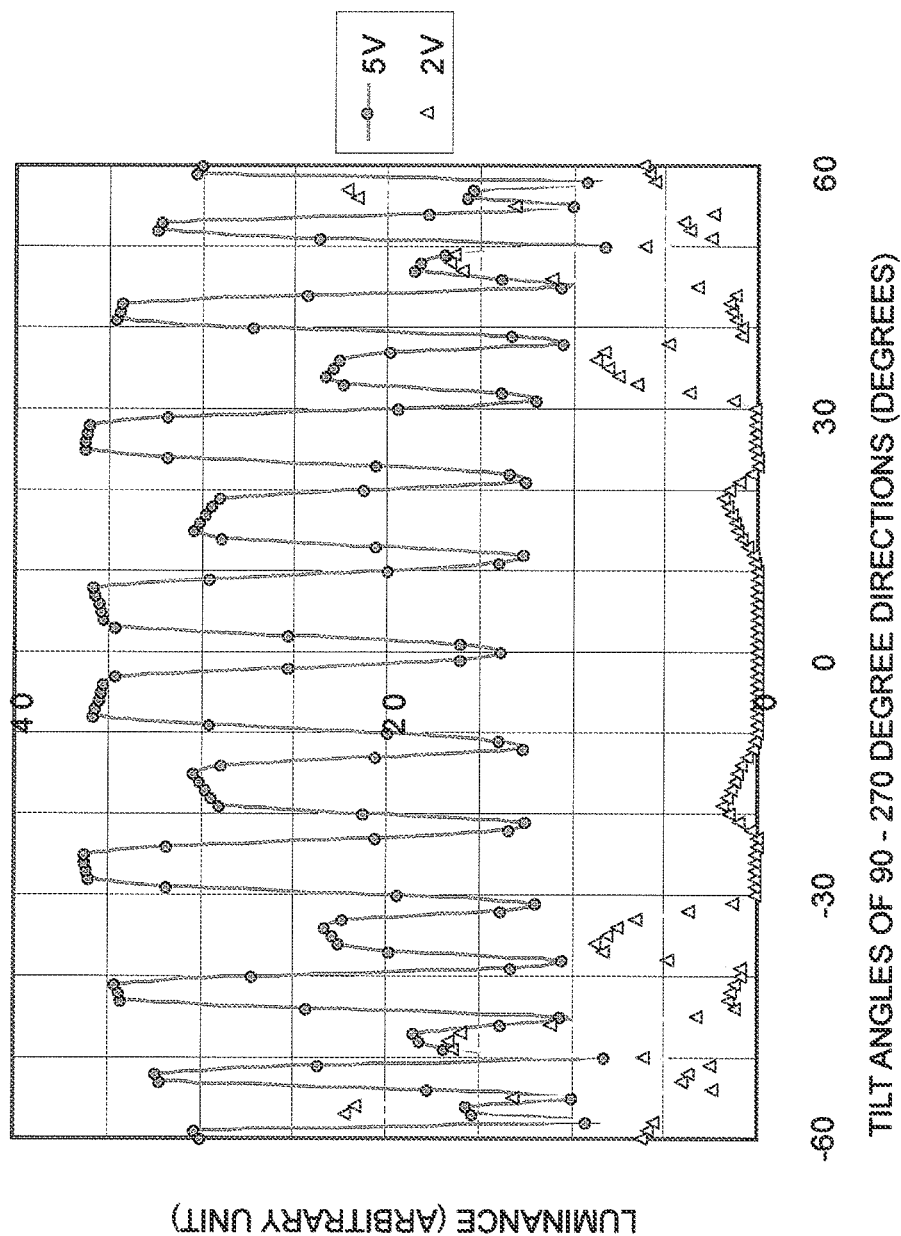
FIG. 27 is a graph showing a viewing angle characteristic of Comparative Example 1-1, when a same voltage is applied to a first-viewpoint sub-pixel and a second-viewpoint sub-pixel.

Comparative Example 1-1 to be compared with Example 1 is presented. FIG. 25 is a plan view showing a liquid crystal display device 110' of Comparative Example 1-1. The liquid crystal display device 110' includes a display unit 10', sub-pixels 11B', 12B', and the like, and the structure thereof is the same as the case of Example 1 except that the tilt directions of the liquid crystal molecules 104 are different. That is, the tilt direction of the liquid crystal molecules 104 of Comparative Example 1-1 is different by 90 degrees from that of Example 1 (FIGS. 1A and 1B). At this time, as shown in FIGS. 26A and 26B, the transmission-axis directions 205 of the polarization plates and the layout of the barrier layer 203 are the same as those shown in FIGS. 24A and 24B, and specific liquid crystal alignment regions 204' are different from those shown in FIGS. 24A and 24B. The characteristic of Comparative Example 1-1 is as shown in FIG. 27, with which the difference of the luminance at the first viewpoint and the second viewpoint is large, thereby causing large 3D moire.

Comparative Example 1-2

Figure 28:
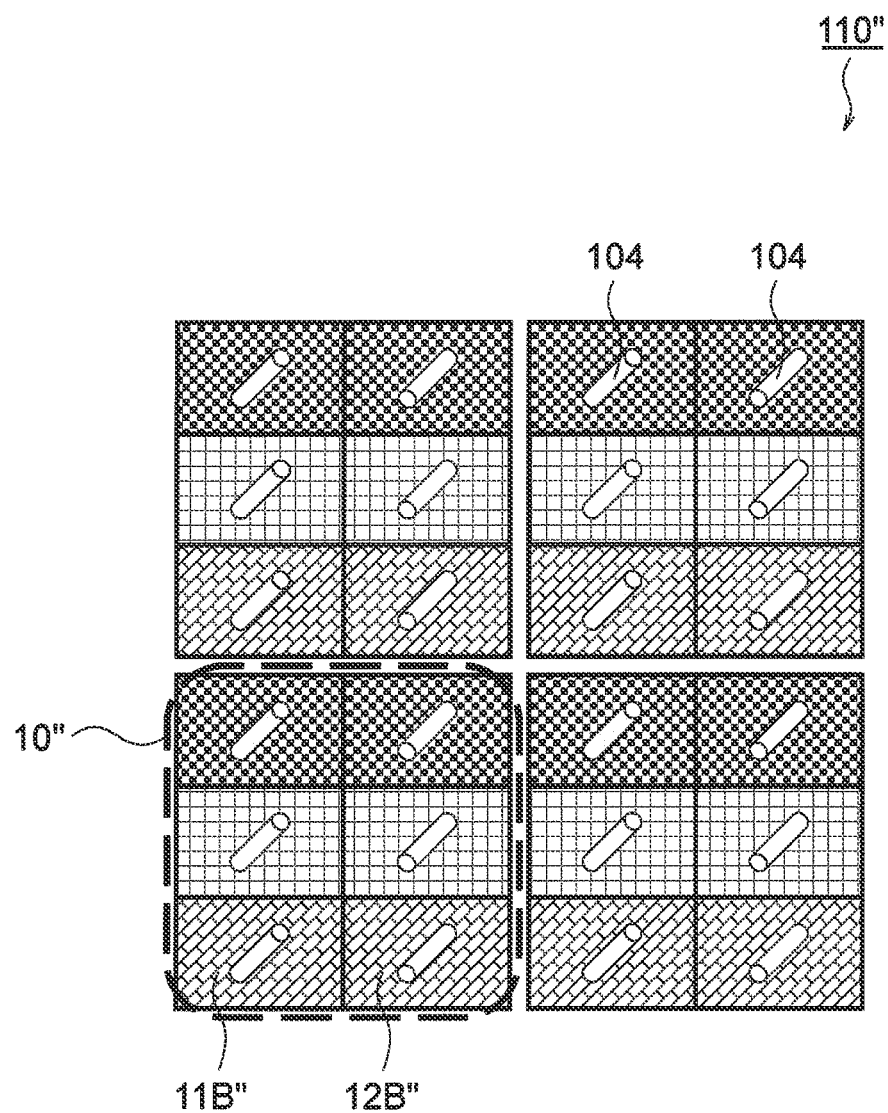
FIG. 28 is a plan view showing Comparative Example 1-2 of the first exemplary embodiment.
Figure 29A:
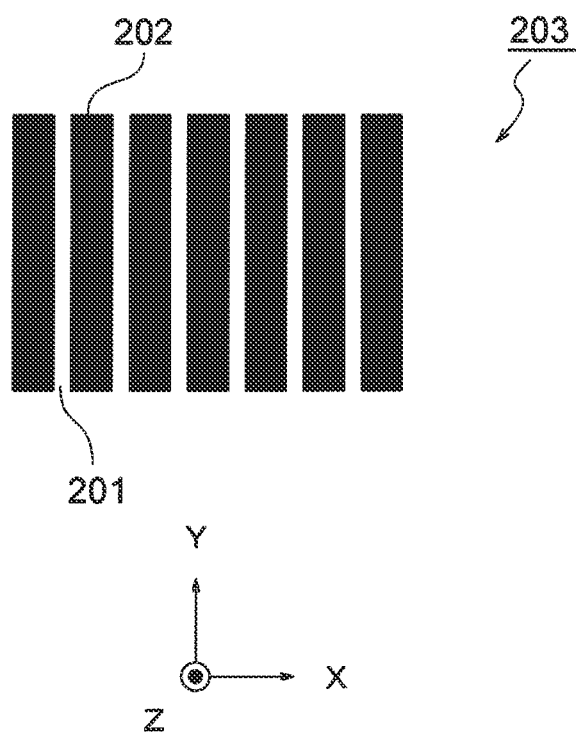
FIG. 29A is a plan view showing a barrier layer according to Comparative Example 1-2.
Figure 29B:
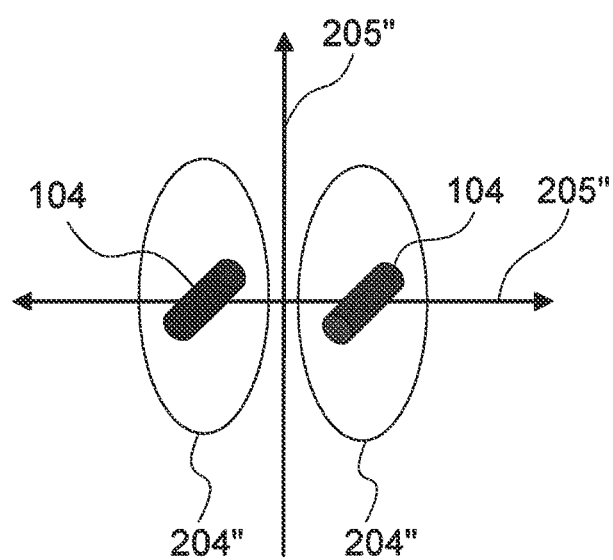
FIG. 29B is a plan view showing a relationship between a liquid crystal alignment region and a polarization plate of Comparative Example 1-2.
Figure 30:
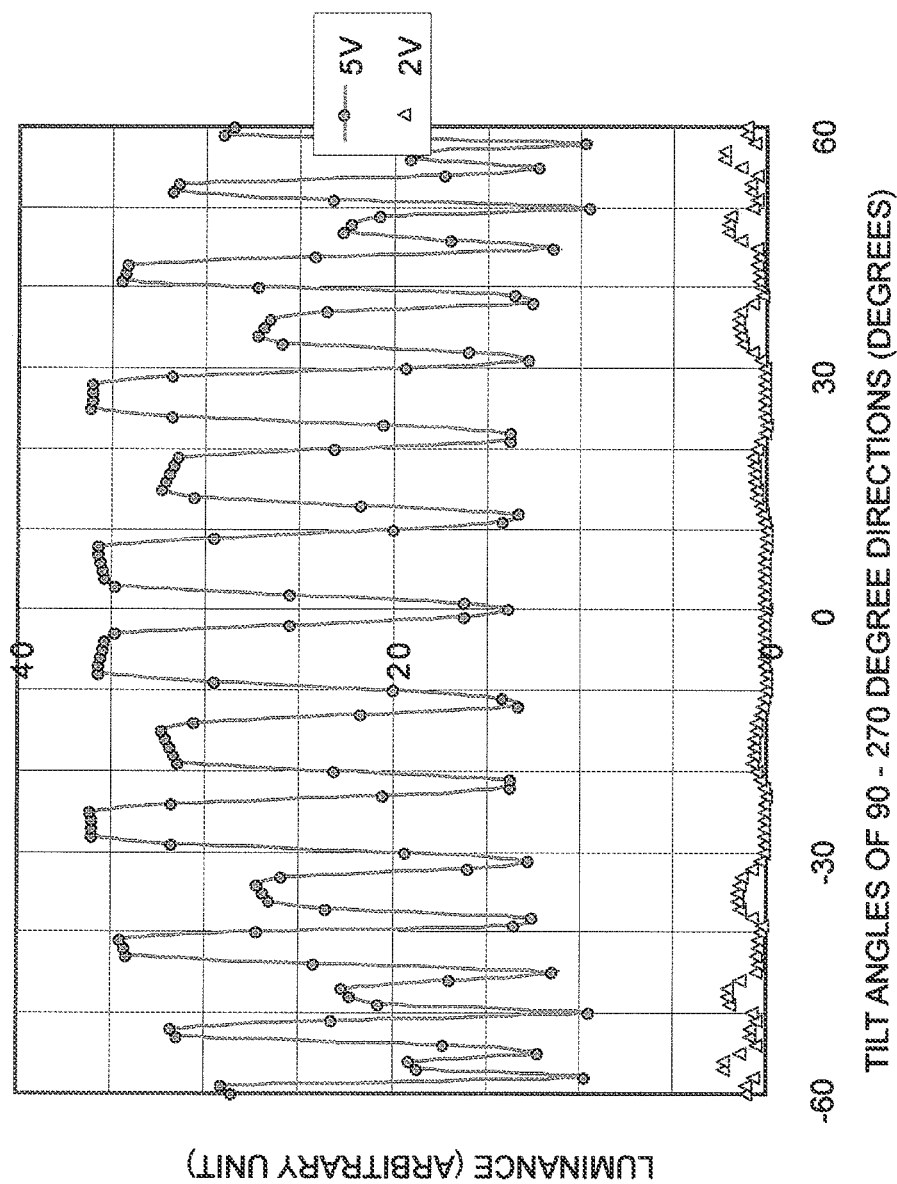
FIG. 30 is a graph showing a viewing angle characteristic of Comparative Example 1-2, when a same voltage is applied to a first-viewpoint sub-pixel and a second-viewpoint sub-pixel.

Comparative Example 1-2 to be compared with Example 1 is presented. FIG. 28 is a plan view showing a liquid crystal display device 110" of Comparative Example 1-1. The liquid crystal display device 110" includes a display unit 10', sub-pixels 11B", 12B", and the like, and the structure thereof is the same as the case of Example 1 except that the tilt directions of the liquid crystal molecules 104 are different. That is, the tilt direction of the liquid crystal molecules 104 of Comparative Example 1-1 is different by 90 degrees from that of Example 1 (FIGS. 1A and 1B). At this time, as shown in FIGS. 29A and 29B, the layout of the barrier layer 203 is the same as that shown in FIGS. 24A and 24B, and the transmission-axis directions 205" of the polarization plates and specific liquid crystal alignment regions 204" are different from those shown in FIGS. 24A and 24B. The transmission-axis directions 205" of the polarization plates are different by 45 degrees from those of FIGS. 24A and 24B. The characteristic of Comparative Example 1-2 is as shown in FIG. 30, with which the difference of the luminance at the first viewpoint and the second viewpoint is large, thereby causing large 3D moire.

Example 2

Figure 31:
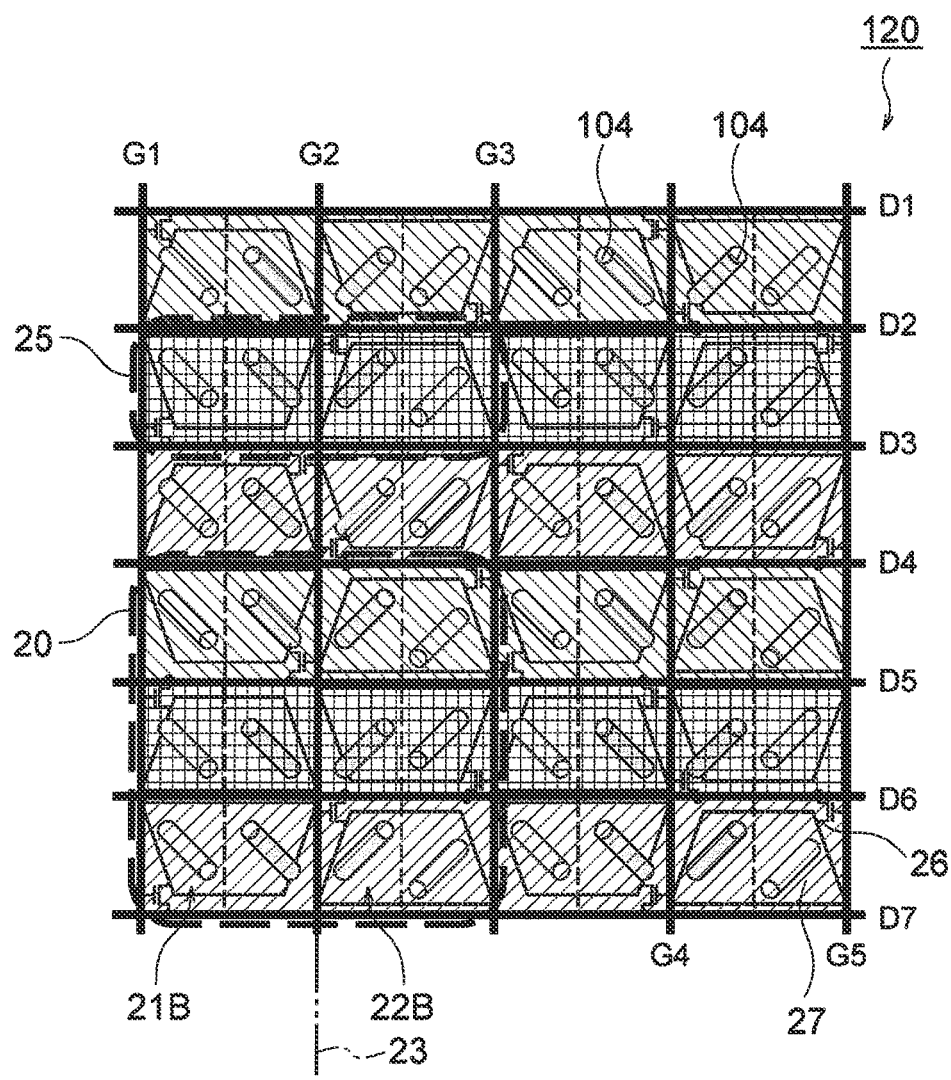
FIG. 31 is a plan view showing a liquid crystal display device according to Example 2.

FIG. 31 is a plan view showing a liquid crystal display device according to Example 2 that is a more concretive example of the liquid crystal display device according to the second exemplary embodiment. In FIG. 31, same reference numerals as those of the structural elements of FIGS. 6A and 6B are used for the structural elements corresponding to those of FIGS. 6A and 6B. Sub-pixels 21B, —display an image for the first viewpoint and sub-pixels 22B display an image for the second viewpoint. A plural-viewpoints unit 25 is constituted with the sub-pixels 21B, —and the sub-pixels 22B, —corresponding to the two viewpoints. Through gathering the plural-viewpoints unit 25 corresponding to each color, a display unit 20 for displaying information of pixels for one video including color information and viewpoint information is constituted. In Example 2, it is defined that colors are the three colors of red, green, and blue, and a single display unit 20 is constituted with the three plural-viewpoints units 25. For example, a switch 26 constituted with TFT is provided to the sub-pixels 21B, —for displaying the image for each viewpoint. A video signal is written to a pixel electrode 27 by writing a signal as appropriate to gate lines G1, G2, —and data lines D1, D2, —. As shown in the second exemplary embodiment, there are two domains where the tilt directions of the liquid crystal molecules are different within each of the first-viewpoint sub-pixels 21B, —and the second-viewpoint sub-pixels 22B, —. The tilt directions of the liquid crystal molecules 104 are different by 180 degrees between the two domains. The tilt directions are within a plane that is at an angle of 45 degrees with respect to a border 23 between the first-viewpoint sub-pixels 21B, —and the second-viewpoint sub-pixels 22B.

The sectional structure of the liquid crystal display device 120 of Example 2 is the same as that of Example 1 (FIG. 23). The structure of the barrier layer and the transmission axis of the polarization plate are the same as those of Comparative Example 1-2 (FIGS. 29A and 29B). Referring to FIGS. 29A and 29B, a transmission region 201 and a non-transmission region 203 are arranged alternately in a barrier layer 203. Further, a transmission-axis directions 205" of the polarization plate are the X-axis direction and the Y-axis direction. In specific liquid crystal alignment regions 204", the tilt directions of the liquid crystal molecules 104 are located in the directions tilted by 45 degrees with respect to the transmission-axis directions 205 of the polarization plates.

The characteristic acquired by Example 1 is as shown in FIG. 8 and FIG. 9, which can be found as a sufficiently wide viewing angle characteristic in the X-axis direction.

Comparative Example 2-1

Figure 32:
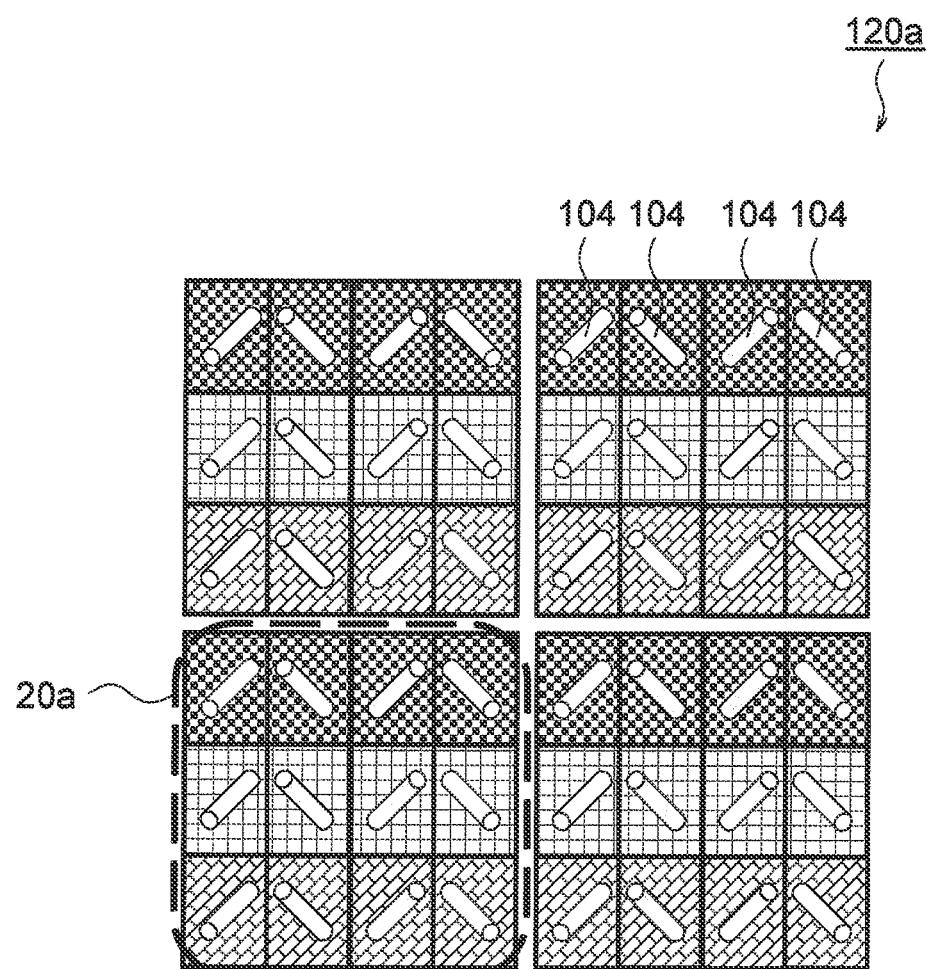
FIG. 32 is a plan view showing Comparative Example 2-1 of the second exemplary embodiment.
Figure 33:
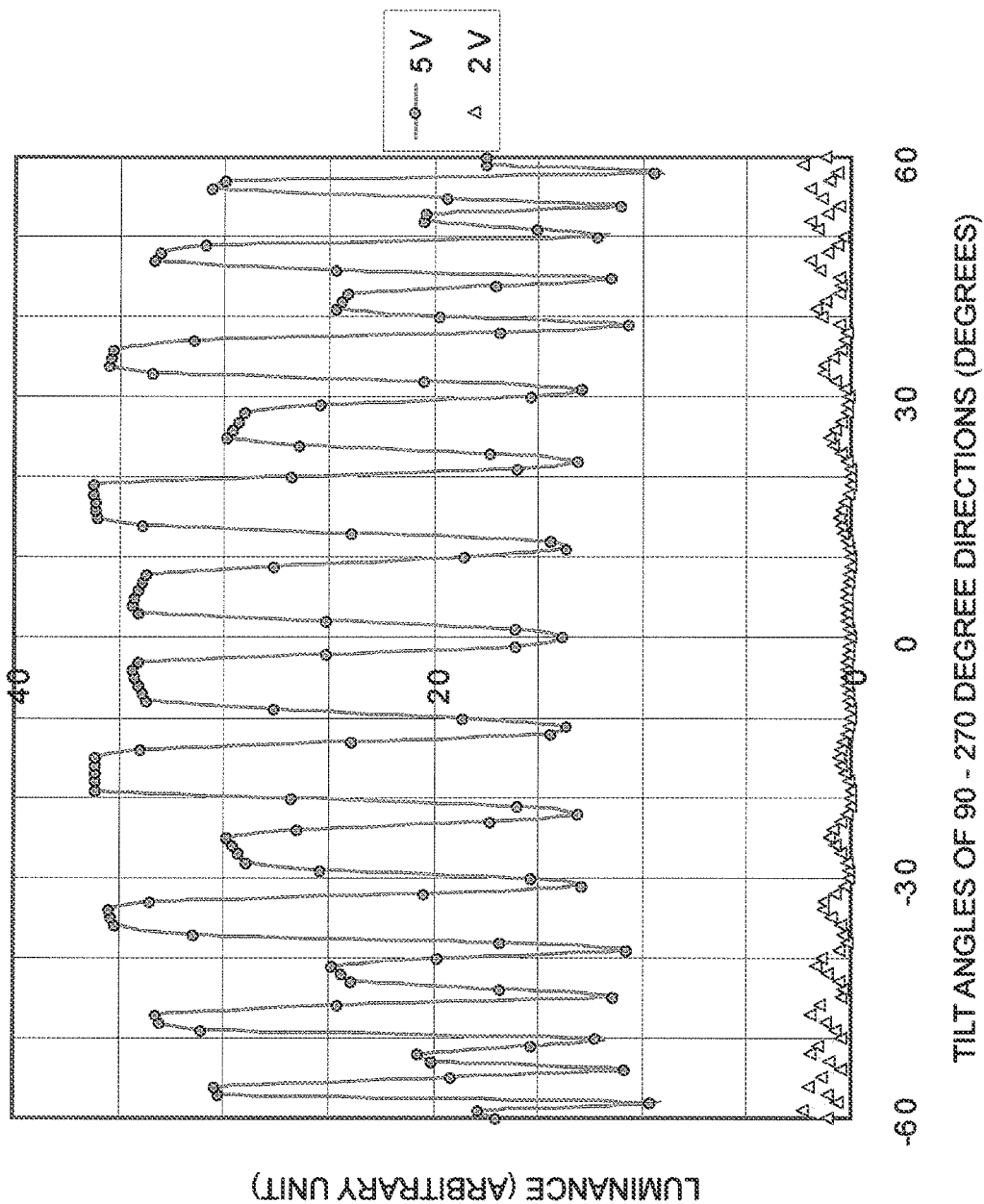
FIG. 33 is a graph showing a viewing angle characteristic of Comparative Example 2-1, when a same voltage is applied to a first-viewpoint sub-pixel and a second-viewpoint sub-pixel.

Comparative Example 2-1 to be compared with Example 2 is presented. FIG. 32 is a plan view showing a liquid crystal display device 120a of Comparative Example 2-1. In the liquid crystal display device 120a, the tilt directions of the liquid crystal molecules 104 within the display unit 20a (within the sub-pixel) are different by 90 degrees from the case of Example 2 (FIGS. 6A and 6B). At this time, the transmission-axis directions 205 of the polarization plates and the barrier layer 203 are disposed as in the case of Comparative Example 1-2 (FIGS. 29A and 29B). The characteristic of Comparative Example 2-1 is as shown in FIG. 33, with which the difference of the luminance at the first viewpoint and the second viewpoint is large, thereby causing large 3D moire.

Comparative Example 2-2

Figure 35:
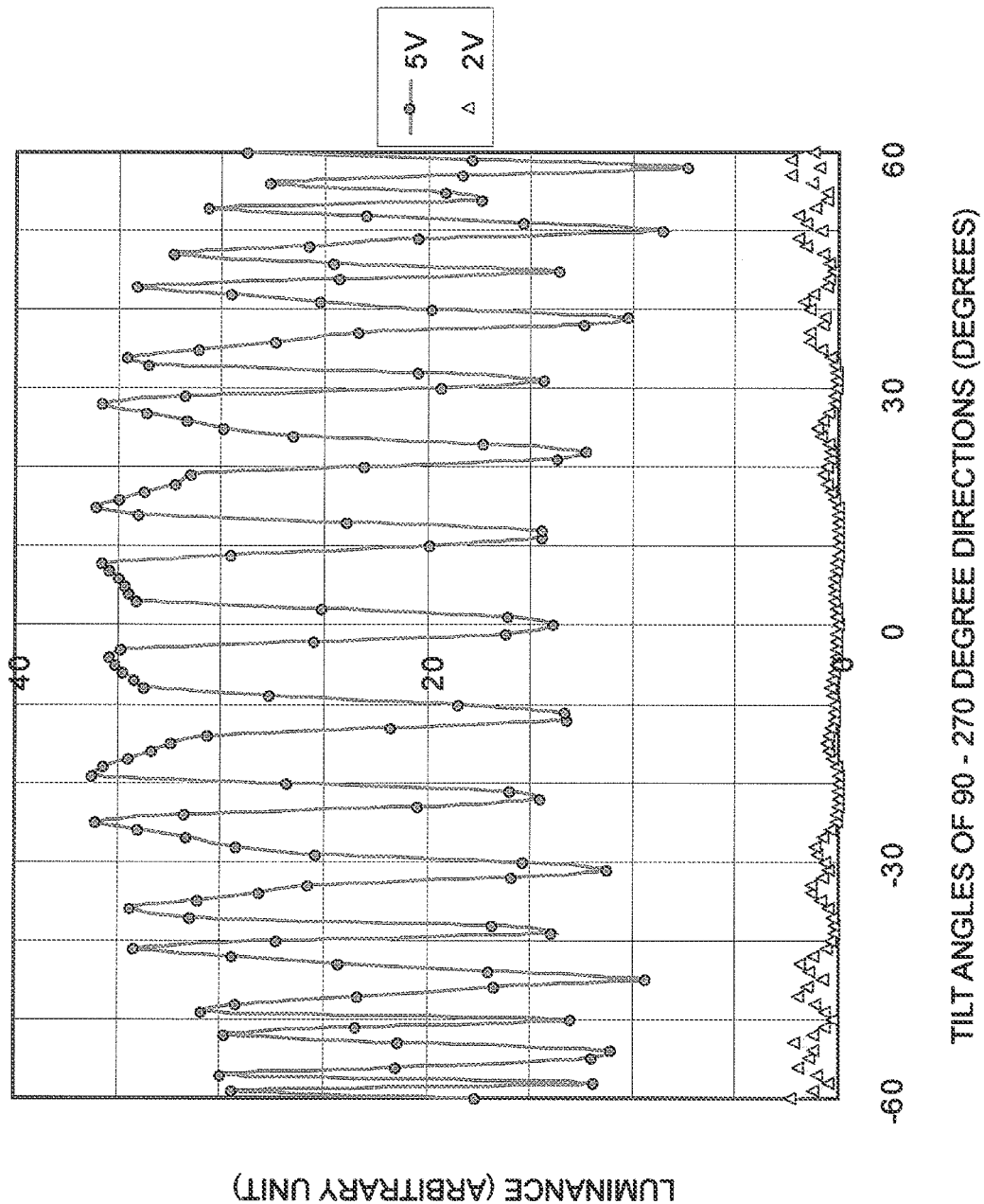
FIG. 35 is a graph showing a viewing angle characteristic of Comparative Example 2-2, when a same voltage is applied to a first-viewpoint sub-pixel and a second-viewpoint sub-pixel.

Comparative Example 2-2 to be compared with Example 2 is presented. FIG. 34 is a plan view showing a liquid crystal display device 120b of Comparative Example 2-2. In the liquid crystal display device 120b, the tilt directions of the liquid crystal molecules 104 within the display unit 20b (within the sub-pixel) are different by 90 degrees from the case of Example 2 (FIGS. 6A and 6B). At this time, the transmission-axis directions 205 of the polarization plates and the barrier layer 203 are disposed as in the case of Comparative Example 1-2 (FIGS. 29A and 29B). The characteristic of Comparative Example 2-2 is as shown in FIG. 35, with which the difference of the luminance at the first viewpoint and the second viewpoint is large, thereby causing large 3D moire.

Comparative Example 2-3

Figure 37:
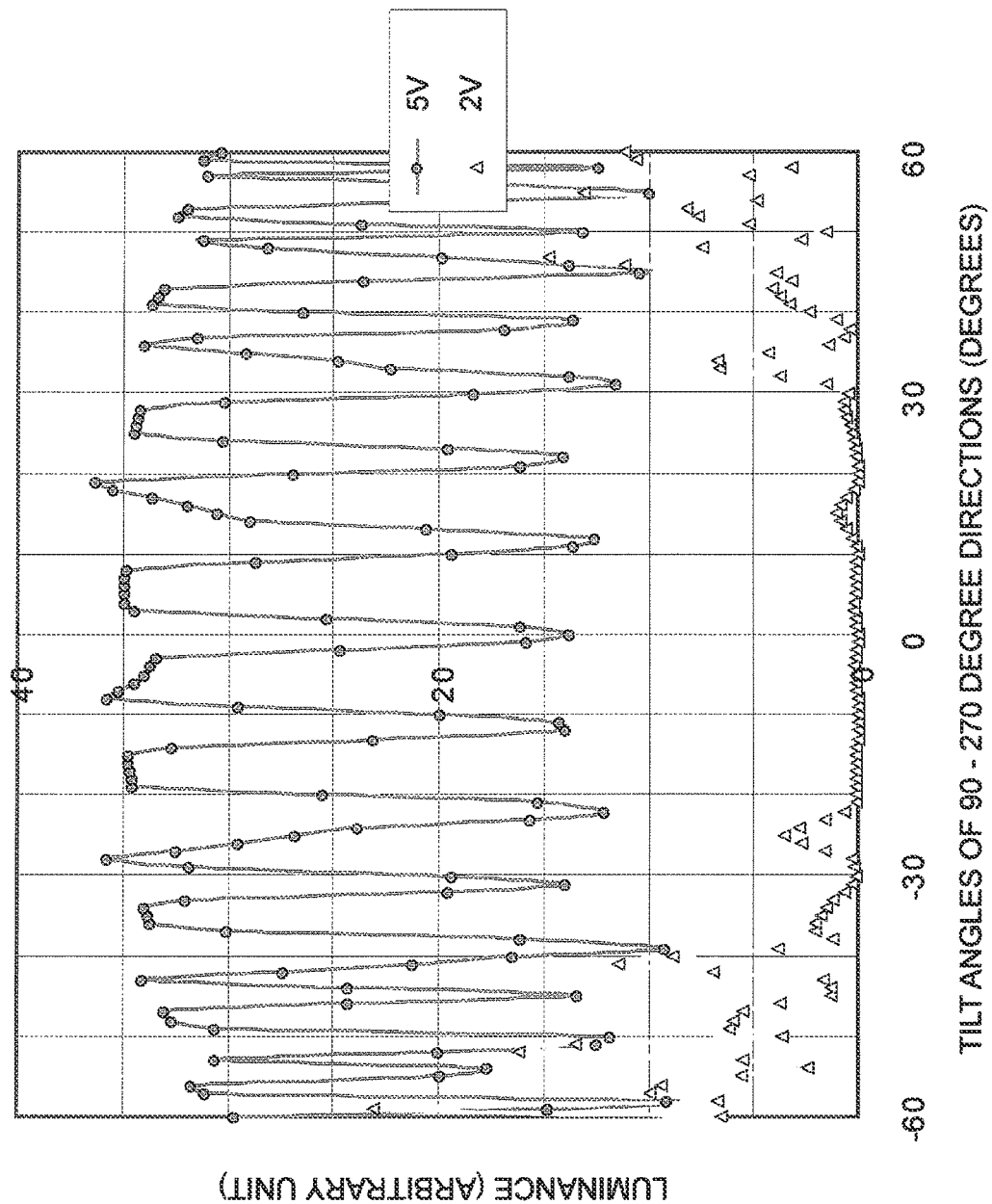
FIG. 37 is a graph showing a viewing angle characteristic of Comparative Example 2-3, when a same voltage is applied to a first-viewpoint sub-pixel and a second-viewpoint sub-pixel.

Comparative Example 2-3 to be compared with Example 2 is presented. FIG. 36 is a plan view showing a liquid crystal display device 120c of Comparative Example 2-3. In the liquid crystal display device 120c, the tilt directions of the liquid crystal molecules 104 within the display unit 20b (within the sub-pixel) are different by 45 degrees from the case of Example 2 (FIGS. 6A and 6B). At this time, the transmission-axis directions 205 of the polarization plates and the barrier layer 203 are disposed as in the case of Comparative Example 1-2 (FIGS. 29A and 29B). The characteristic of Comparative Example 2-3 is as shown in FIG. 37, with which the difference of the luminance at the first viewpoint and the second viewpoint is large, thereby causing large 3D moire.

Example 3

Figure 38:
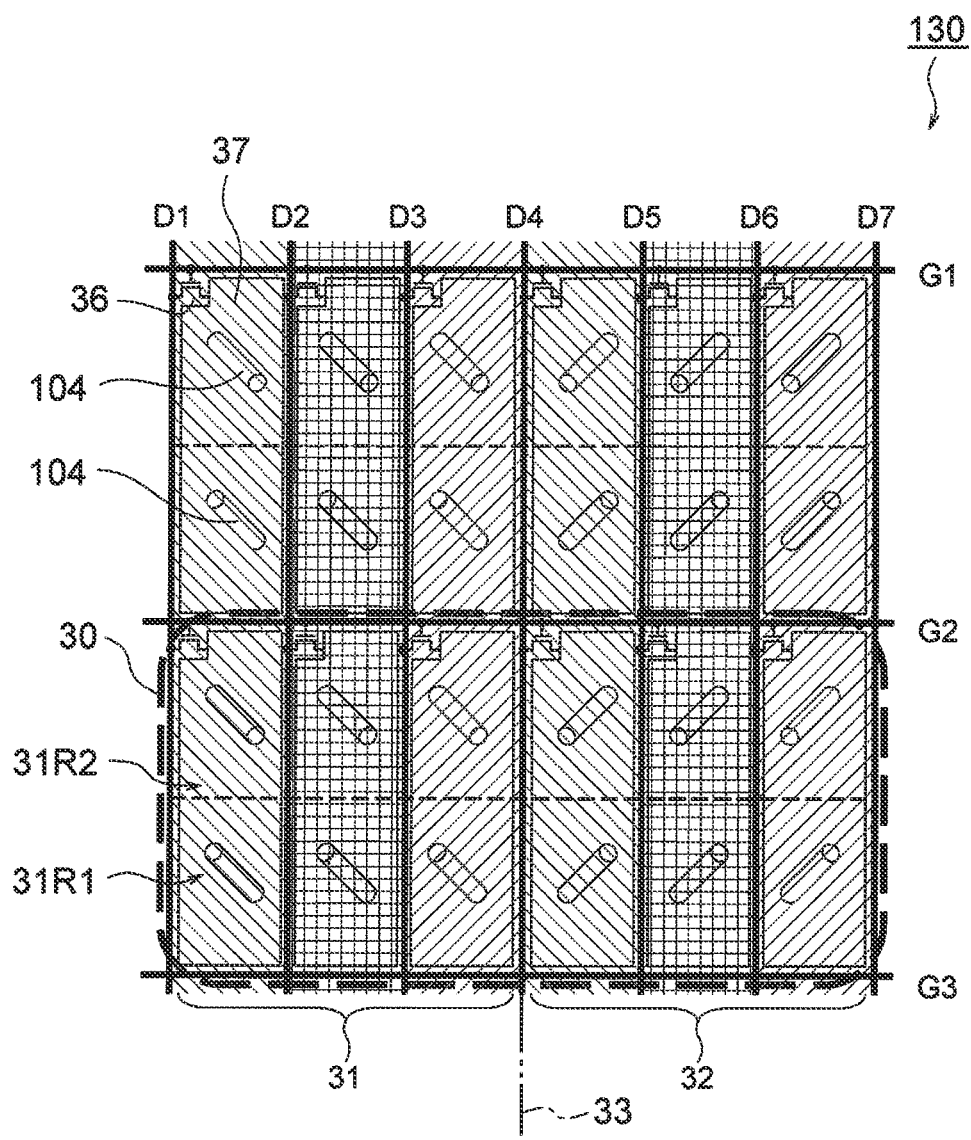
FIG. 38 is a plan view showing a liquid crystal display device according to Example 3.

FIG. 38 is a plan view showing a liquid crystal display device according to Example 3 that is a more concretive example of the liquid crystal display device according to the third exemplary embodiment. In FIG. 38, same reference numerals as those of the structural elements of FIGS. 10A and 10B are used for the structural elements corresponding to those of FIGS. 10A and 10B. A set of sub-pixels corresponding to two viewpoints, i.e., a set of a sub-pixel constituting a first pixel 31 for the first viewpoint and a sub-pixel constituting a second pixel 32 for the second viewpoint, corresponds to each color. A display unit 30 for displaying information of pixels for one video including color information and viewpoint information is constituted with the first pixel 31 and the second pixel 32. In Example 3, the display unit 30 is constituted with three colors of red, green, and blue. For example, a switch 36 constituted with TFT is provided to the first pixel 31 and the second pixel 32 for displaying images for each viewpoint. A video signal is written to a pixel electrode 37 by writing a signal as appropriate to gate lines G1, G2, —and data lines D1, D2, —. As described in the third exemplary embodiment, first domains 31R1, —and second domains 31R2, —where the tilt directions of the liquid crystal molecules 104 are different from each other by 180 degrees exist within the first pixel 31 and the second pixel 32. Further, the tilt directions are within a plane that is at an angle of 45 degrees with respect to a border 33 between the first pixel 31 and the second pixel 32.

The sectional structure of the liquid crystal display device 130 of Example 3 is the same as that of Example 1 (FIG. 23). The structure of the barrier layer and the transmission axis of the polarization plate are the same as those of Comparative Example 1-2 (FIGS. 29A and 29B). The characteristic acquired by Example 3 is as shown in FIG. 12 and FIG. 13, which can be found as a sufficiently wide viewing angle characteristic in the X-axis direction.

Comparative Example 3-1

Figure 39:
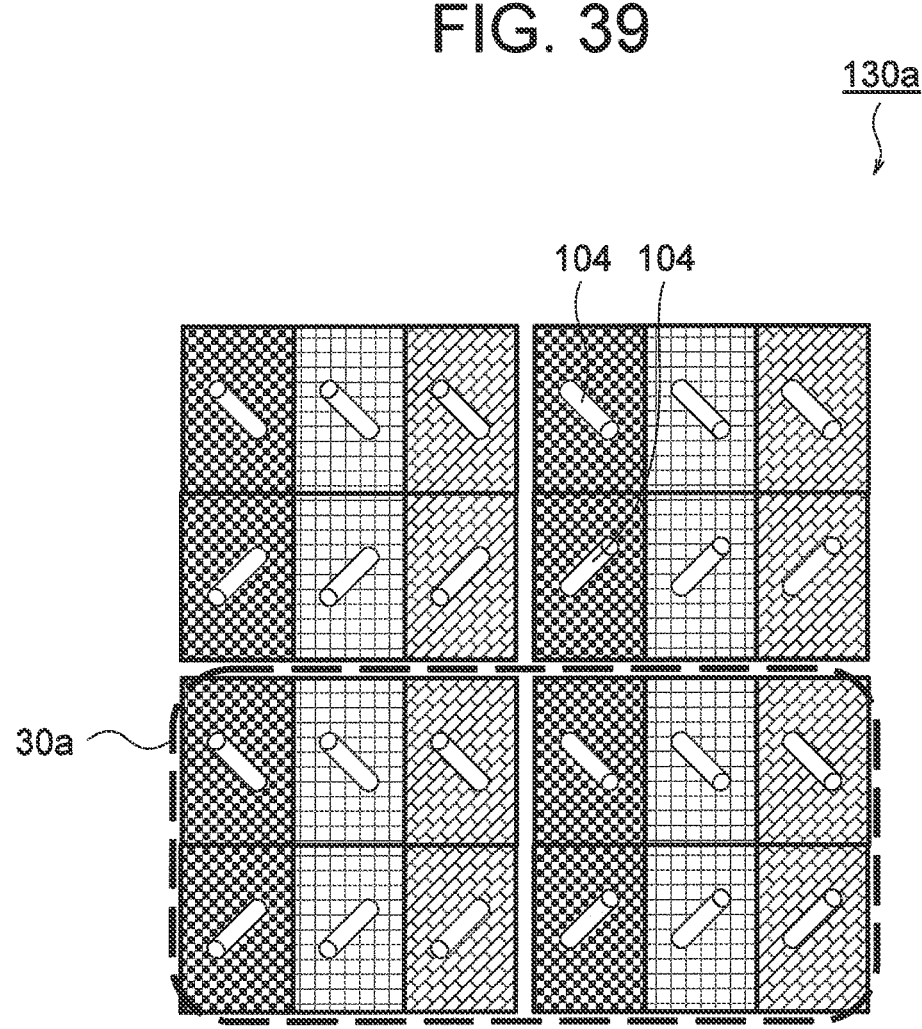
FIG. 39 is a plan view showing Comparative Example 3-1 of the third exemplary embodiment.
Figure 40:
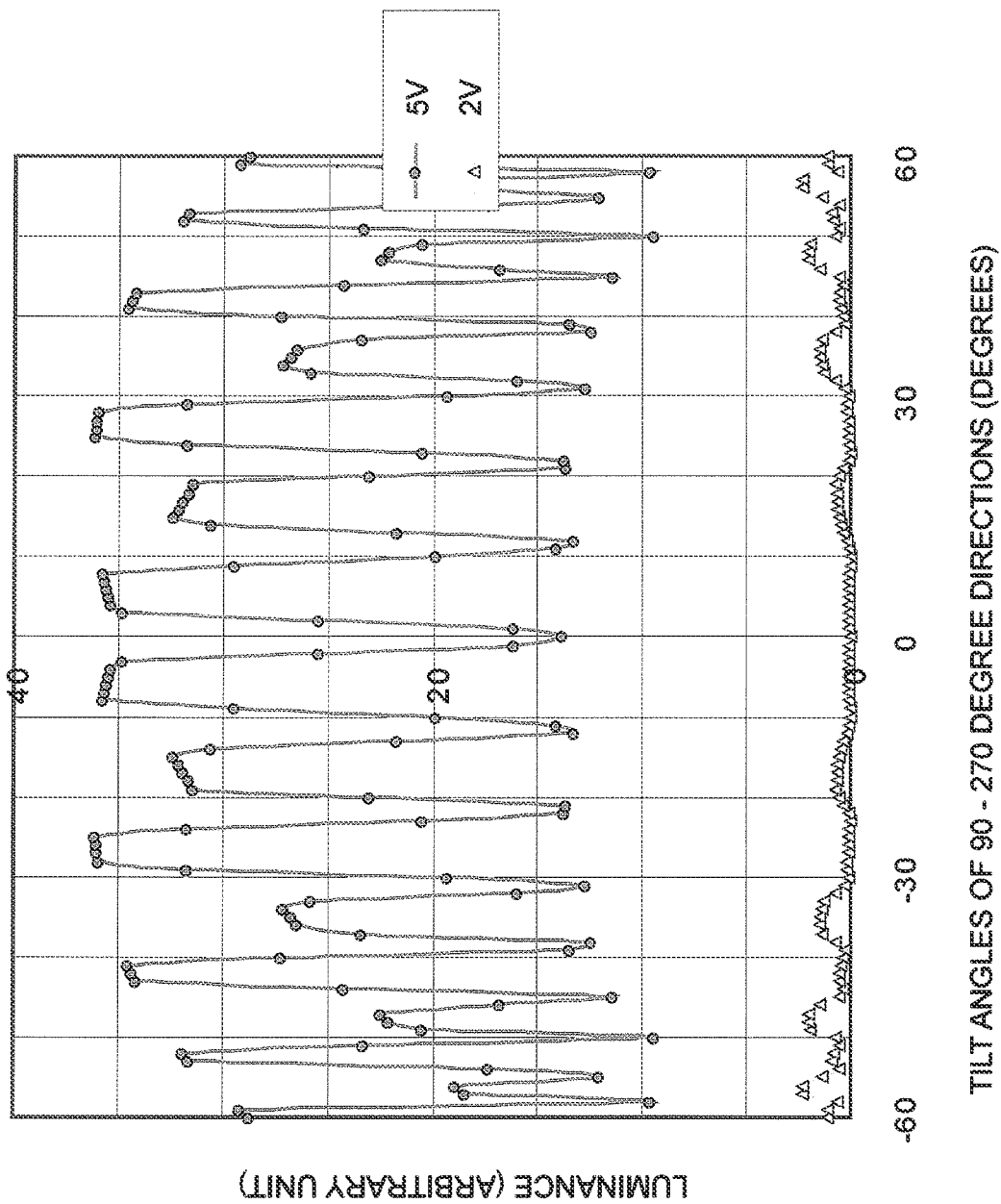
FIG. 40 is a graph showing a viewing angle characteristic of Comparative Example 3-1, when a same voltage is applied to a first-viewpoint sub-pixel and a second-viewpoint sub-pixel.

Comparative Example 3-1 to be compared with Example 3 is presented. FIG. 39 is a plan view showing a liquid crystal display device 130a of Comparative Example 3-1. In the liquid crystal display device 130a, the tilt directions of the liquid crystal molecules 104 within the display unit 30a (within the sub-pixel) are different by 90 degrees from the case of Example 3 (FIGS. 10A and 10B). At this time, the transmission-axis directions 205 of the polarization plates and the barrier layer 203 are disposed as in the case of Comparative Example 1-2 (FIGS. 29A and 29B). The characteristic of Comparative Example 3-1 is as shown in FIG. 40, with which the difference of the luminance at the first viewpoint and the second viewpoint is large, thereby causing large 3D moire.

Comparative Example 3-2

Figure 41:
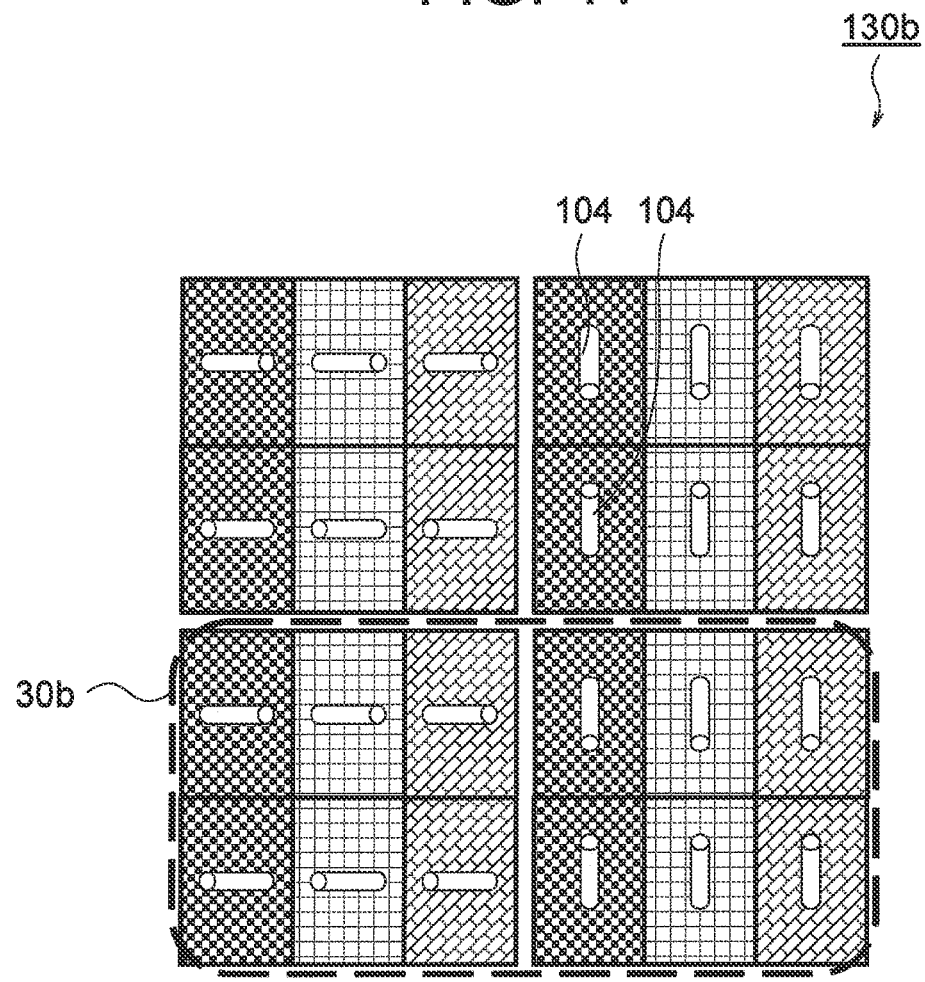
FIG. 41 is a plan view showing Comparative Example 3-2 of the third exemplary embodiment.
Figure 42:
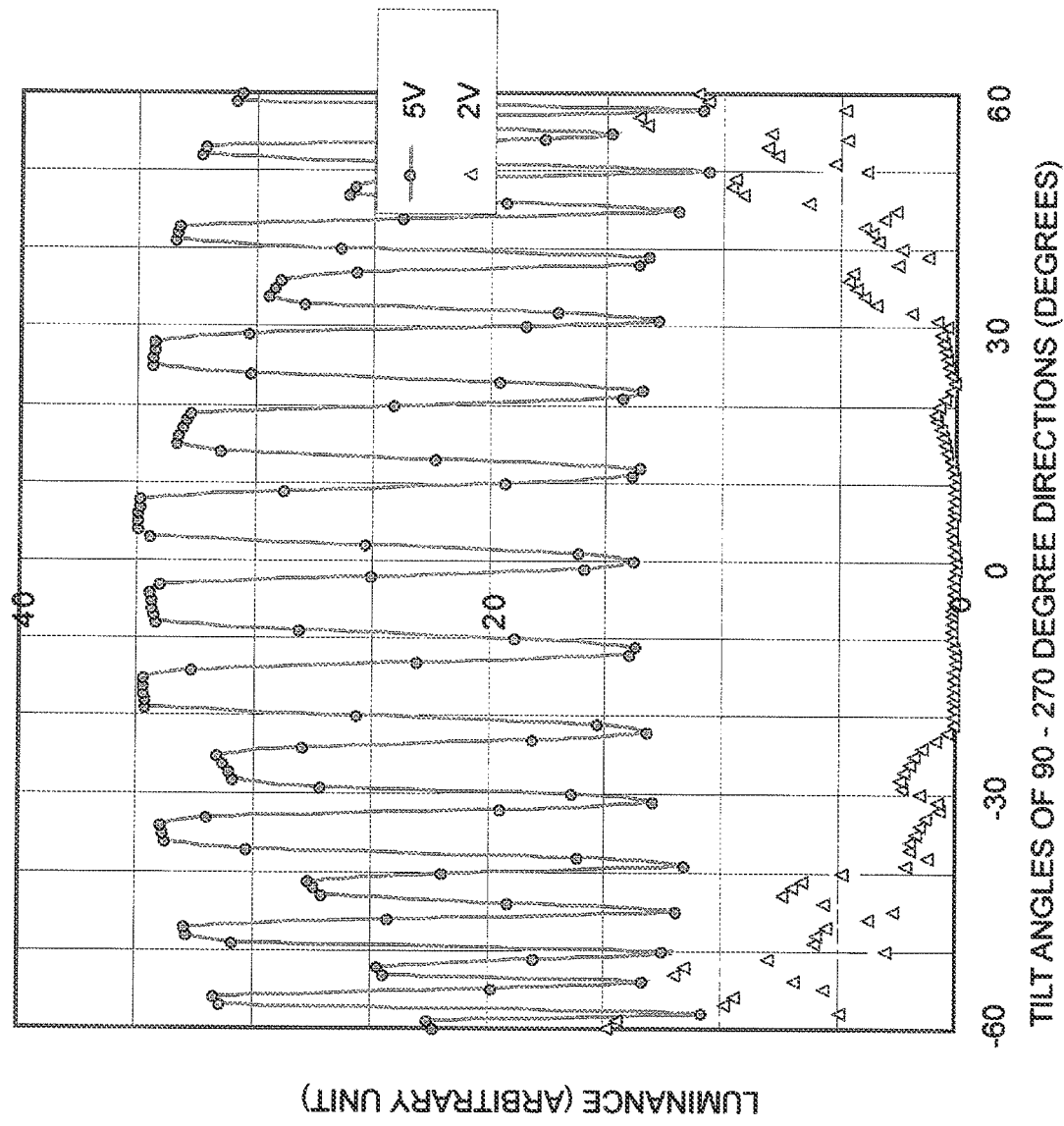
FIG. 42 is a graph showing a viewing angle characteristic of Comparative Example 3-2, when a same voltage is applied to a first-viewpoint sub-pixel and a second-viewpoint sub-pixel.

Comparative Example 3-2 to be compared with Example 3 is presented. FIG. 41 is a plan view showing a liquid crystal display device 130b of Comparative Example 3-2. In the liquid crystal display device 130b, the tilt directions of the liquid crystal molecules 104 within the display unit 30b (within the sub-pixel) are different by 45 degrees from the case of Example 3 (FIGS. 10A and 10B). At this time, the transmission-axis directions 205 of the polarization plates and the barrier layer 203 are disposed as in the case of Comparative Example 1-2 (FIGS. 29A and 29B). The characteristic of Comparative Example 3-2 is as shown in FIG. 42, with which the difference of the luminance at the first viewpoint and the second viewpoint is large, thereby causing large 3D moire.

Example 4

Figure 43:
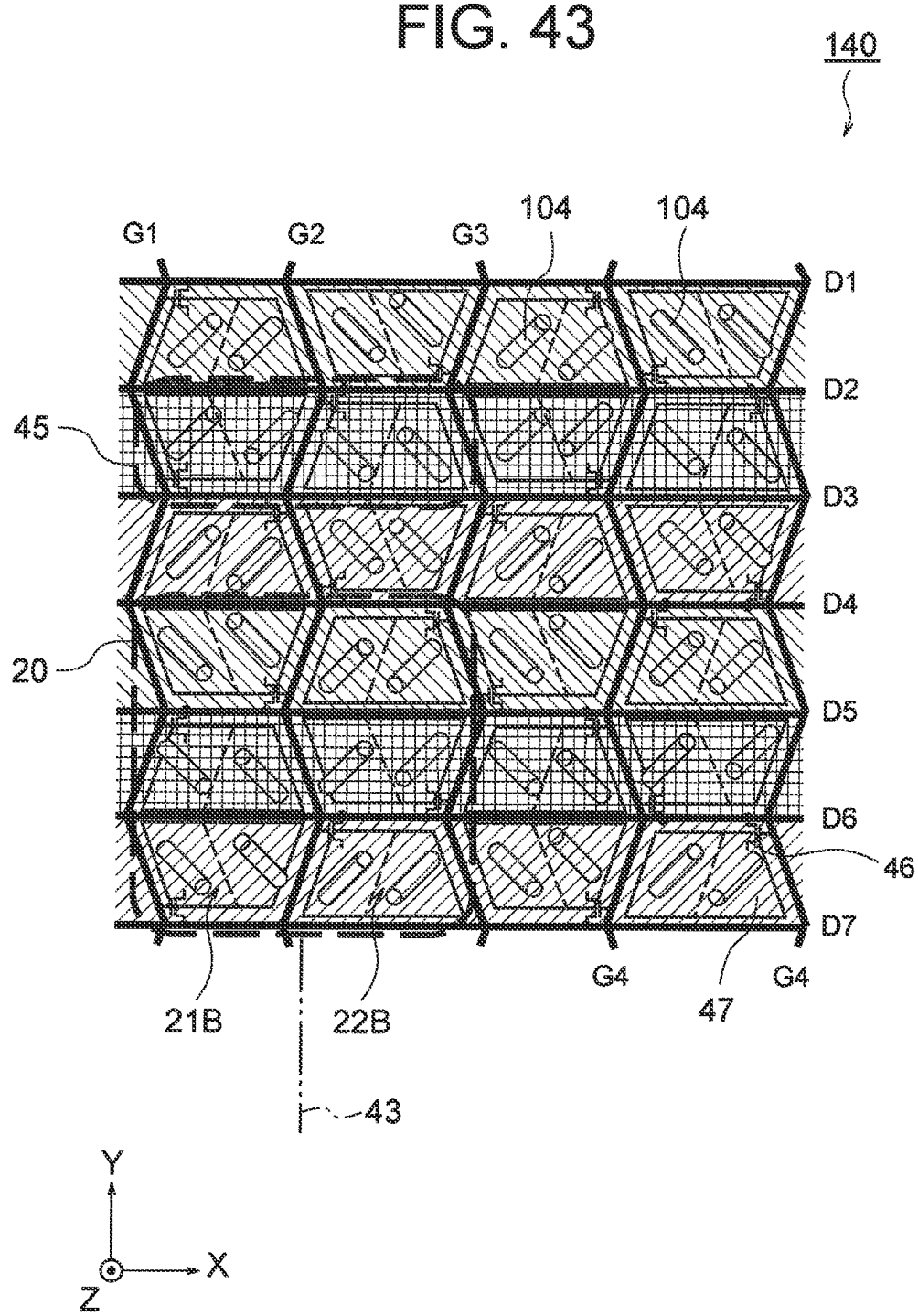
FIG. 43 is a plan view showing a liquid crystal display device according to Example 4.

FIG. 43 is a plan view showing a liquid crystal display device according to Example 4 that is a more concretive example of the liquid crystal display device according to the fourth exemplary embodiment (FIG. 14). In FIG. 43, same reference numerals as those of the structural elements of FIG. 14 are used for the structural elements corresponding to those of FIG. 14. A set of sub-pixels corresponding to two viewpoints, i.e., a set of a sub-pixel 21B for displaying an image for the first viewpoint and a sub-pixel 22B for displaying an image for the second viewpoint, corresponds to each color. A display unit 20 for displaying information of pixels for one video including color information and viewpoint information is constituted with three sub-pixels 21B, —and three sub-pixels 22B. In Example 4, the display unit 20 is constituted with three colors of red, green, and blue. For example, a switch 46 constituted with TFT is provided to the sub-pixels 21B, —for displaying the image for each viewpoint. A video signal is written to a pixel electrode 47 by writing a signal as appropriate to gate lines G1, G2, —and data lines D1, D2, —. As described in the fourth and second exemplary embodiments, a pair of domains where the tilt directions of the liquid crystal molecules 104 are different from each other by 180 degrees exists within the sub-pixels 21B, —and the sub-pixels 22B, —. Further, the tilt directions are within a plane that is at an angle of 45 degrees with respect to border 45 between the first-viewpoint pixels (the sub-pixels 21B, —) and the second-viewpoint pixels (the sub-pixels 22B, —). In Example 4, the liquid crystal alignment of the display units 20, —arranged on the top and bottom sides of the drawing is different by 90 degrees. As a result, there are four kinds of domains also in the top-and-bottom direction, so that an MVA characteristic can be acquired.

In this drawing, the gate lines G1, G2, and the like are extended along the top-and-bottom direction and are in a zigzag form to correspond to the shape of the pixel electrodes 47. Further, the border between the pair of domains where the tilt directions of the liquid crystal molecules 104 are different is oblique with respect to the top-and-bottom direction of the drawing. Considering the sub-pixels connected along the longitudinal direction, the sub-pixels are arranged in a zigzag form like the gate lines. That is, since the gate lines and the domain borders are arranged obliquely in Example 4, the fall of luminance when the visual field is shifted in the left-and-right direction is dispersed compared to the case where those are arranged linearly on the top-and-bottom direction of the drawing. As a result, 3D moire is eased with Example 4. The sectional structure of Example 4 is the same as that of FIG. 23, and the barrier layer, the polarization plate, and the relationship between the alignment regions are the same as those of FIGS. 29A and 29B.

As described, in Example 4, the border between the pair of domains where the tilt directions of the liquid crystal molecules 104 are different is oblique with respect to the top-and-bottom direction. However, the tilt directions of the domain border with respect to the top-and-bottom direction are reversed between the pixels neighboring to each other in the top-and-bottom direction. As a result, the domain borders are in parallel to the top-and-bottom directions macroscopically, even though the individual domain borders are oblique.

It can be found that the characteristic acquired by Example 4 is a sufficiently wide viewing angle characteristic in the X-axis direction due to the operation effect acquired with Example 4. Further, as described above, as a result of arranging the regions to become dark in the oblique direction, 3D moire can be eased further.

Example 5

Figure 44:
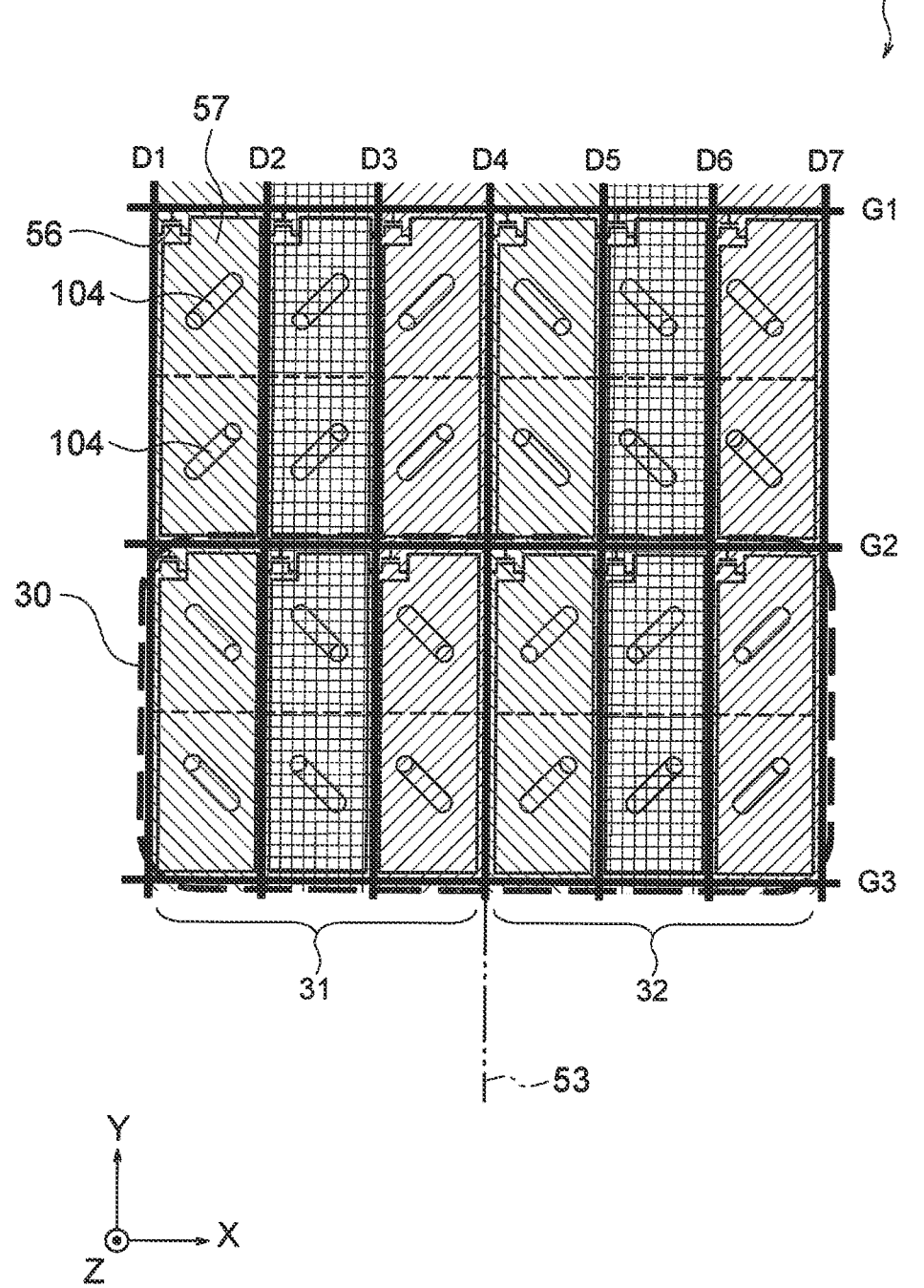
FIG. 44 is a plan view showing a liquid crystal display device according to Example 5.

FIG. 44 is a plan view showing a liquid crystal display device according to Example 5 that is a more concretive example of the liquid crystal display device according to the fifth exemplary embodiment (FIG. 16). In FIG. 44, same reference numerals as those of the structural elements of FIG. 16 are used for the structural elements corresponding to those of FIG. 16. A set of sub-pixels corresponding to two viewpoints, i.e., a set of a sub-pixel constituting a first pixel 31 for the first viewpoint and a sub-pixel constituting a second pixel 32 for the second viewpoint, corresponds to each color. A display unit 30 for displaying information of pixels for one video including color information and viewpoint information is constituted with the first pixel 31 and the second pixel 32. In Example 5, the display unit 30 is constituted with three colors of red, green, and blue. For example, a switch 56 constituted with TFT is provided to the first pixels 31, —and the second pixels 32, —for displaying the image for each viewpoint. A video signal is written to a pixel electrode 57 by writing a signal as appropriate to gate lines G1, G2, —and data lines D1, D2, —. As described in the fifth exemplary embodiment, a pair of domains where the tilt directions of the liquid crystal molecules 104 are different from each other by 180 degrees exist within the first pixel 31 and the second pixel 32. Further, the tilt directions are within a plane that is at an angle of 45 degrees with respect to a border 53 between the first pixel 31 and the second pixel 32. Further, the tilt directions of the liquid crystal molecules 104 are different by 90 degrees between the first pixel 31 and the second pixel 32. Furthermore, the tilt directions of the liquid crystal molecules 104 are different by 90 degrees between the first pixels 31 and between the second pixels 32 connected along the top-and-bottom direction of the drawing. The sectional structure of Example 5 is the same as that of FIG. 23, and the barrier layer, the polarization plate, and the relationship between the alignment regions are the same as those of FIGS. 29A and 29B.

The characteristic of Example 5 is that the first pixel 31 for the first viewpoint and the second pixel 32 for the second viewpoint compensate with each other, and the first pixels 31 as well as the second pixels 32 compensate with each other due to the operation effects described in the fifth exemplary embodiment. Thus, it can be found that the characteristic is a sufficiently wide viewing angle characteristic not only in the X-axis direction but also in the Y-axis direction. That is, with Example 5, the MVA characteristic is achieved because the pixels connected on the top and bottom compensate the characteristics of each other and the four different liquid crystal alignment regions exist inside the two pixels arranged on the top and bottom.

Example 6

Figure 45:
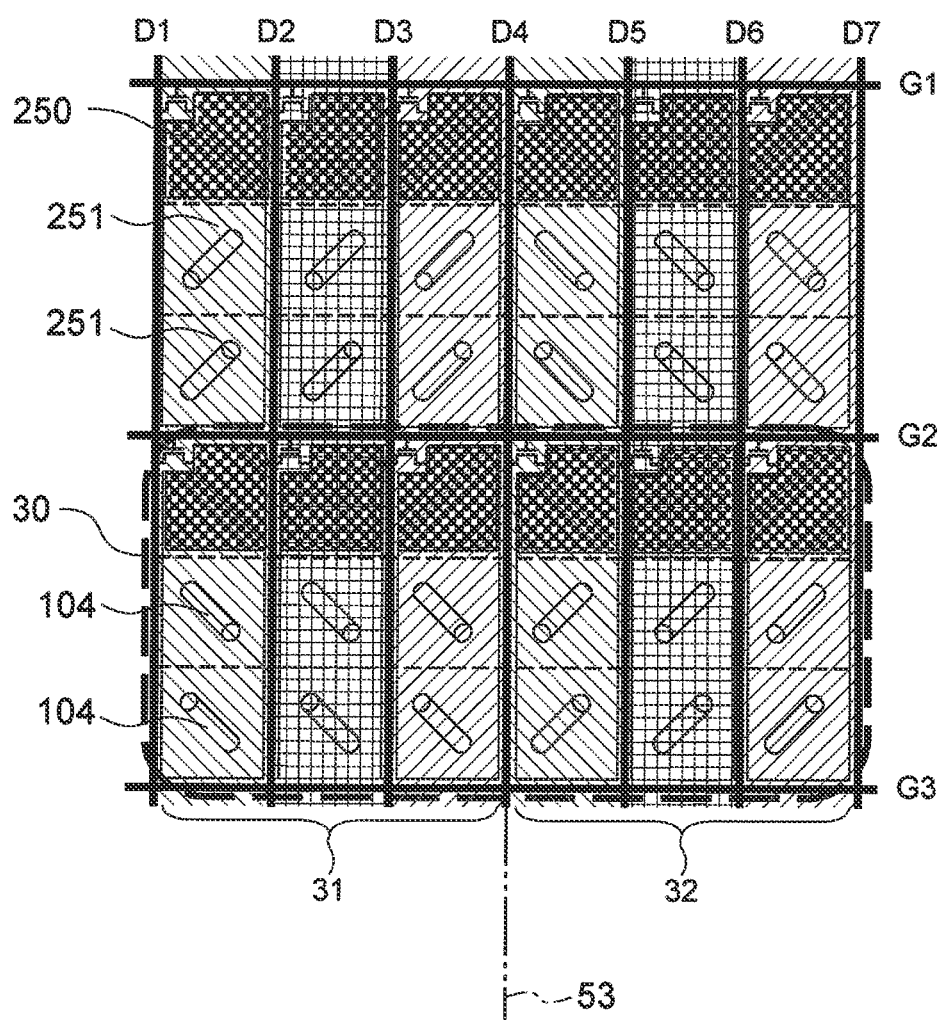
FIG. 45 is a plan view showing a liquid crystal display device according to Example 6.

FIG. 45 is a plan view showing a liquid crystal display device of Example 6 that is a first modification example of Example 5. In Example 6, the structure of Example 5 is slightly changed to form a transflective liquid crystal display device 150a. In the structure of Example 6, a reflection region 250 and a transmission region 251 are provided within a pixel. In Example 6, the area ratio of those is 1:2. Within the reflection region 250, two domains where the rise directions of the liquid crystal alignment are different are formed as a pair within a single pixel as in the case of Example 5 (FIG. 44). Further, the liquid crystal alignment is different by 90 degrees between the first pixel 31 and the second pixel 32. Furthermore, the tilt directions of the liquid crystal molecules 104 are different by 90 degrees between the two first pixels 31 and between the two second pixels 32 connected along the top-and-bottom direction of the drawing, respectively. As a result, there are four different liquid crystal alignment regions in the two pixels placed on the top and bottom in the reflection region 250, so that the MVA characteristic can be acquired. In the meantime, in the reflection region 250, normally a reflection electrode formed by unevenness is provided on the substrate in order to provide the reflection characteristic. Through the uneven structure, there are various rise directions in the liquid crystal alignment. Thus, the reflection region can almost achieve the MVA characteristic only by a single pixel. Further, when a same signal is inputted to the first pixel 31 for the first viewpoint and the second pixel 32 for the second viewpoint, the first pixel 31 and the second pixel 32 compensate with each other. At this time, there are four kinds of different liquid crystal alignment regions in the pixels (the first pixel 31 and the second pixel 32) for the two viewpoints connected in the lateral direction. As a result, it is possible with Example 6 to achieve the MVA characteristic without increasing the number of divisions of the alignment regions.

In the meantime, the transflective liquid crystal display device having the MVA characteristic is normally in a structure where a pixel is divided into three regions in a size of about ⅓ of the pixel, so that there are a single reflection region and two transmission regions. Those regions are electrically connected, for example, and a signal can be written to the whole regions by a single switch. In such structure, the shapes of each of the reflection regions and the transmission regions are almost close to a square shape and are highly symmetric. Thus, it is easy to control the tilt directions of the liquid crystal. Compared to the structure of Example 6 (FIG. 45), this normal structure is required to process the pixel electrode into a complicated shape, and the size of each liquid crystal alignment region where the liquid crystal alignment is divided is small. Therefore, for achieving high-definition MVA, the limit in patterning the pixel electrode, crush and the like of the liquid crystal alignment regions become obstacles. Thus, it is not possible to achieve a fine characteristic.

Example 7

Figure 46:
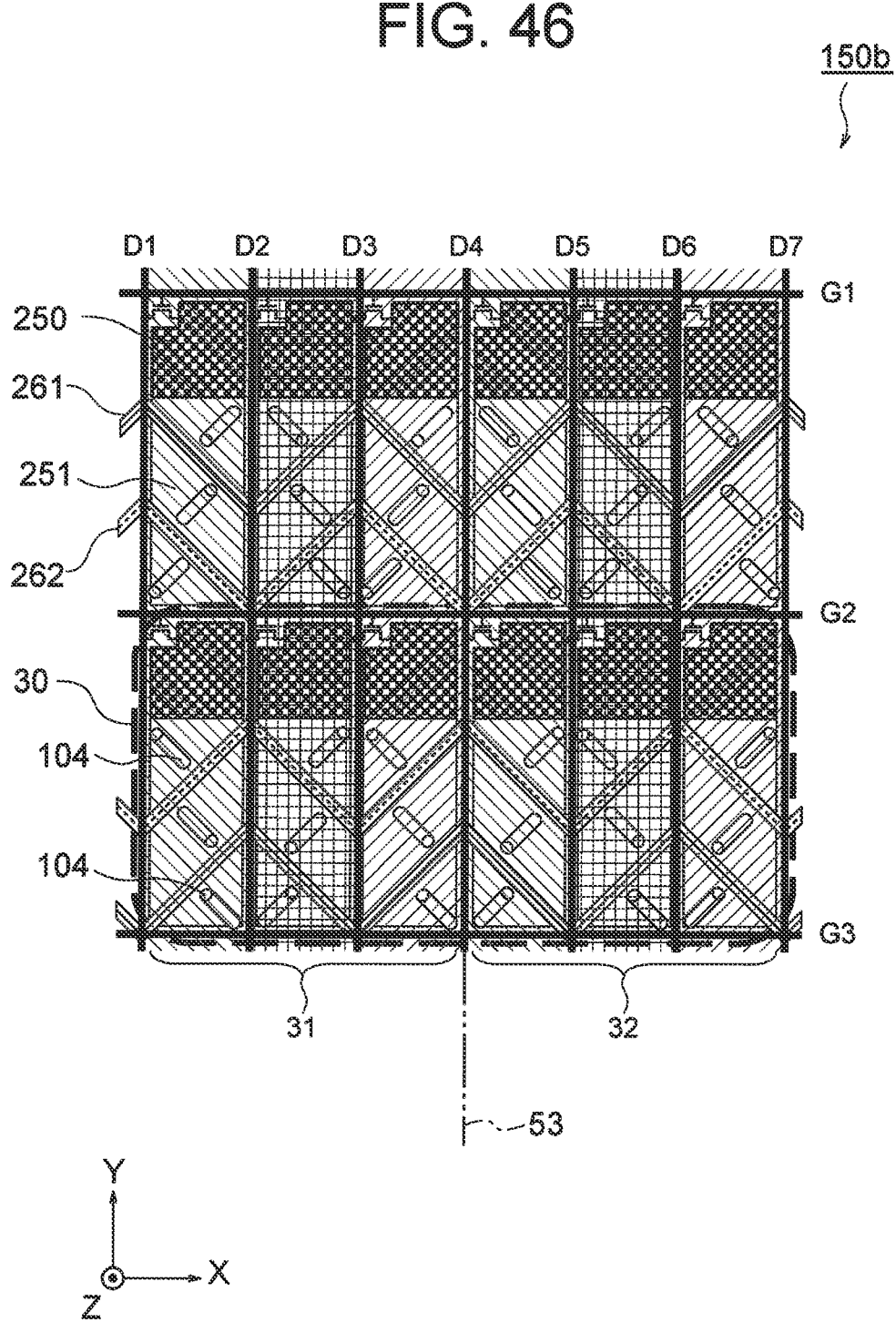
FIG. 46 is a plan view showing a liquid crystal display device according to Example 7.

FIG. 46 is a plan view showing a liquid crystal display device of Example 7 that is a second modification example of Example 5. In Example 7, the structure of Example 5 is slightly changed to form a transflective liquid crystal display device 150b. In Example 6 (FIG. 45), light alignment, rubbing of plural times, and the like can be employed as a method for dividing the liquid crystal alignment. In Example 7, it is achieved by protrusions (protruded portions) provided on the substrate. As shown in FIG. 46, in the liquid crystal display device 150b, a protrusion 261 on the TFT substrate and a protrusion 262 on the counter substrate are provided. With this structure, a single sub-pixel in the transmission region 251 is divided into three domains. Among those three domains, the tilt directions of the liquid crystal alignment in the two domains other than the center domain are the same. Thus, the three domains on the transmission region are practically constituted with the two domains where the tilt directions of the liquid crystal alignment are different. Considering a first pixel 31 for displaying an image for the first viewpoint, three sub-pixels are arranged in the lateral direction of the drawing. The tilt direction of the liquid crystal of the sub-pixel in the center out of the three sub-pixels is different by 90 degrees from the liquid crystal alignment direction of the sub-pixels on the left and right sides thereof in the drawing. As a result, unlike the case of Example 5 (FIG. 44), there are four kinds of liquid crystal alignment regions existing within a pixel for a given viewpoint in Example 7, and those regions compensate with each other. The liquid crystal alignment within the pixel for a given viewpoint varies between the two sub-pixels and one sub-pixel among the three sub-pixels. Thus, compensation within the pixel for a given viewpoint is insufficient. However, the liquid crystal alignment is different by 90 degrees between the first pixel 31 for the first viewpoint and the second pixel 32 for the second viewpoint neighboring to each other, so that those pixels compensate with each other. The liquid crystal alignment of the pixels connected on the top and bottom of the drawing is different from each other by 90 degrees, so that there are four kinds of domains where the tilt directions of the liquid crystal are different. Thereby, the MVA characteristic can be achieved.

Regarding the reflection region 250, the MVA characteristic is achieved within a single pixel as described above.

Figure 47:
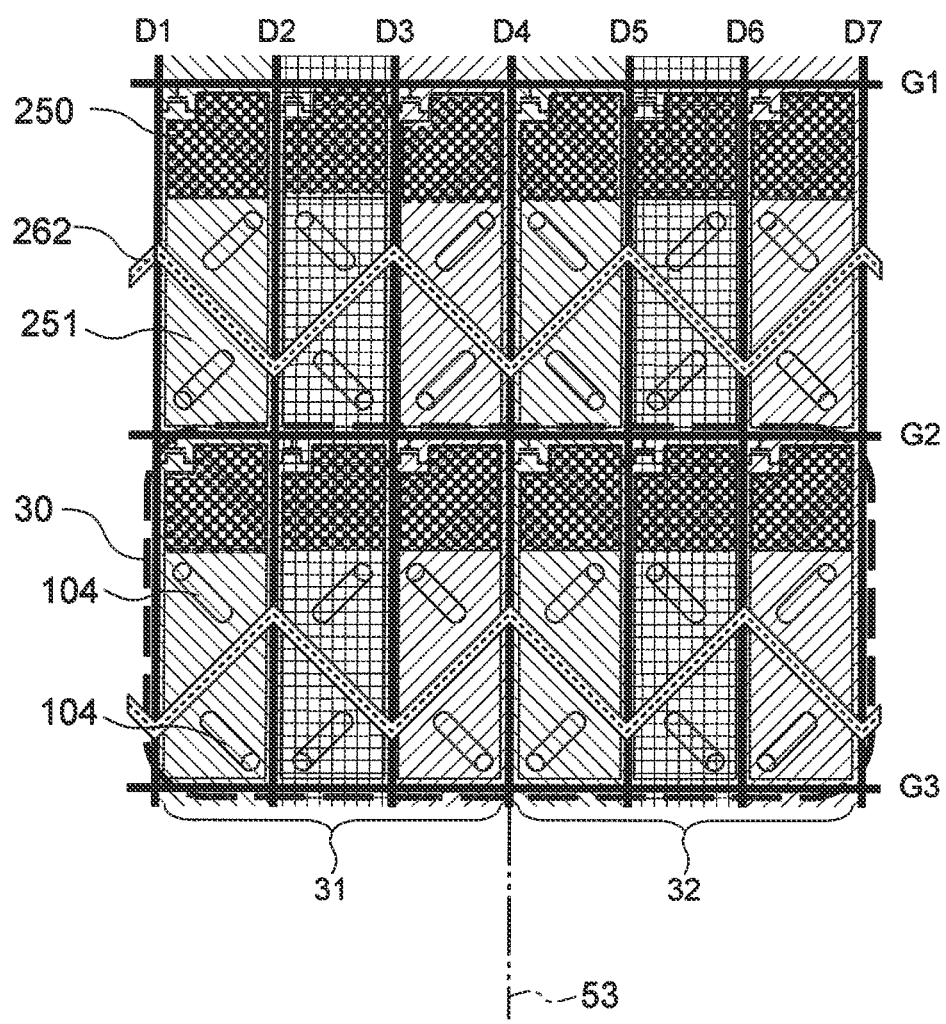
FIG. 47 is a plan view showing a liquid crystal display device according to Example 8.

FIG. 47 is a plan view showing a liquid crystal display device of Example 8 that is a third modification example of Example 5. In FIG. 47, same reference numerals as those of the structural elements of FIG. 46 are used for the structural elements corresponding to those of FIG. 46. In Example 8, the structure of Example 5 is slightly changed to form a transflective liquid crystal display device 150c. As in the case of Example 7 (FIG. 46), Example 8 also provides a transflective liquid crystal display device having the MVA characteristic by using the protrusion provided on the substrate. The difference of Example 8 with respect to Example 7 is that it uses only the protrusion 262 provided on the counter substrate. As a result, Example 8 can achieve the same characteristic even though the structure thereof is simpler compared to that of Example 7. While the protrusion 262 provided on the counter substrate is used in Example 8, it is also possible to achieve the same characteristic by using only the protrusion 261 (FIG. 46) provided on the TFT substrate instead.

Example 9

Figure 48:
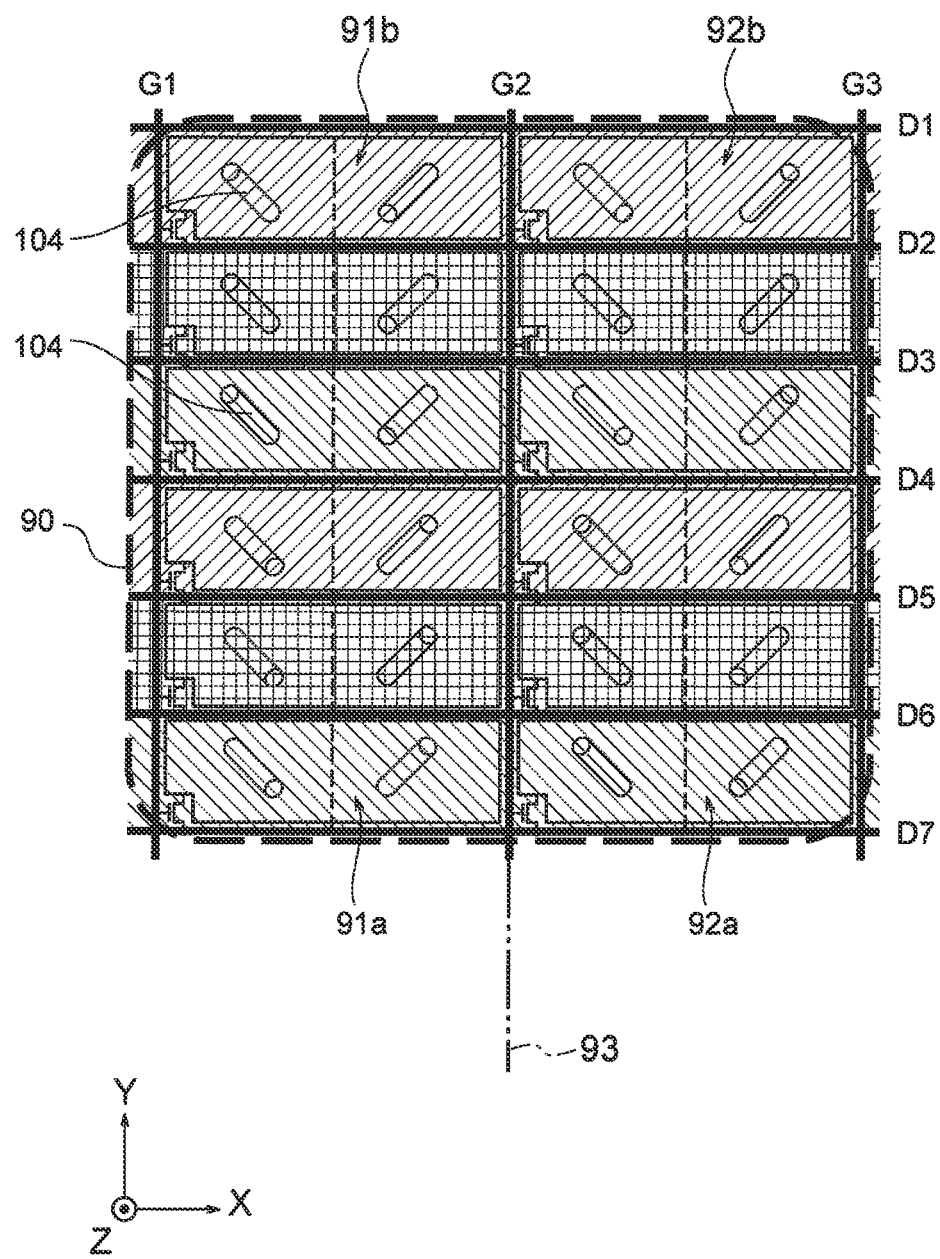
FIG. 48 is a plan view showing a liquid crystal display device according to Example 9.

FIG. 48 is a plan view showing a liquid crystal display device according to Example 9 that is a more concretive example of the liquid crystal display device according to the ninth exemplary embodiment. In FIG. 48, same reference numerals as those of the structural elements of FIG. 46 are used for the structural elements corresponding to those of FIG. 46. In the liquid crystal display device 190 of Example 9, a display unit 90 is constituted with four pixels, i.e., first pixels 91a, 91b and second pixels 92a, 92b. The first pixels 91a, 91b display an image for the first viewpoint, and the second pixels 92a, 92b display an image for the second viewpoint. Three sub-pixels exist in each pixel, and each sub-pixel includes a pair of domains where the tilt directions of the liquid crystal alignment are different from each other by 90 degrees. The tilt directions of the liquid crystal are different by 180 degrees between the first-viewpoint pixel and the second-viewpoint pixel neighboring to each other. Further, the tilt directions of the liquid crystal are different by 180 degrees also between the pixels connected on the top and bottom sides of the drawing. Such structure makes it possible to acquire wide viewing angles both in the top-and-bottom direction and in the left-and-right direction.

Figure 56A:
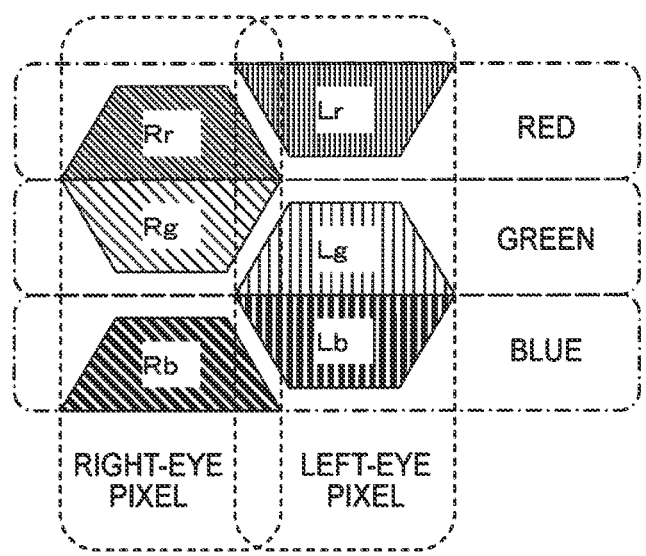
FIG. 56A is a plan view showing an example of a display unit of a color stereoscopic image display device assumed from the pixel structure of Patent Document 1.
Figure 56B:
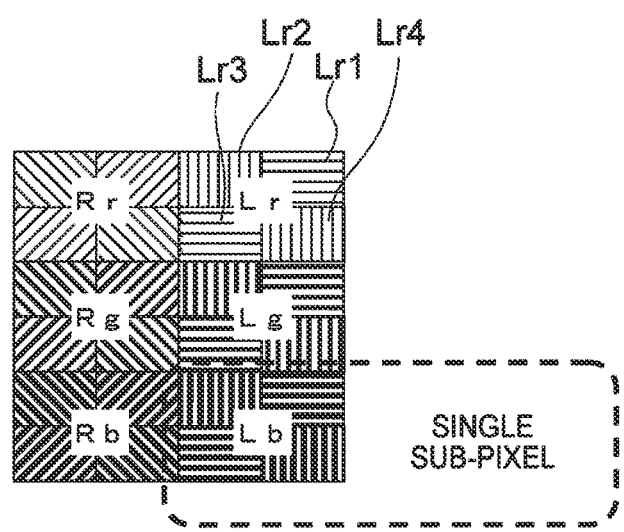
FIG. 56B is a schematic view showing layout of the regions where the alignment is different when the MVA method is employed in the structure of a display unit shown in FIG. 56A.

In particular, with the structure of Example 9, when the image for the first viewpoint and the image for the second viewpoint are different, a same image can be inputted to the pixels arranged on the top and bottom within the display unit. That is, data inputted to the data lines D1 and D4 both correspond to a same image. Similarly, data inputted to the data lines D2 and D5 both correspond to a same image, and data inputted to the data lines D3 and D6 both correspond to a same image. Note that the signs of the signals may be inverted due to polarity reversal or the like. However, the signals correspond to a same image as image data. Through inputting image signals, it is possible to achieve a structure close to FIG. 56A with the four pixels. That is, within almost a square region, image data in three colors and corresponding to two viewpoints can be displayed.

In the meantime, when an image is not displayed by being divided for the first viewpoint and the second viewpoint, two kinds of 2D image display methods can be employed. That is, there are a method which displays a same image at the pixel for the first viewpoint and the pixel for the second viewpoint and displays a same image also at the pixels arranged on the top and bottom within the display unit, and a method which displays a same image at the pixel for the first viewpoint and the pixel for the second viewpoint and displays different images at the pixels arranged on the top and bottom within the display unit. With the former method, there is no change in the resolution depending on whether or not the first viewpoint and the second viewpoint are used. In the meantime, with the latter method, the resolution in the top-and-bottom direction becomes doubled when the first viewpoint and the second viewpoint are not used.

Example 10

Figure 62:
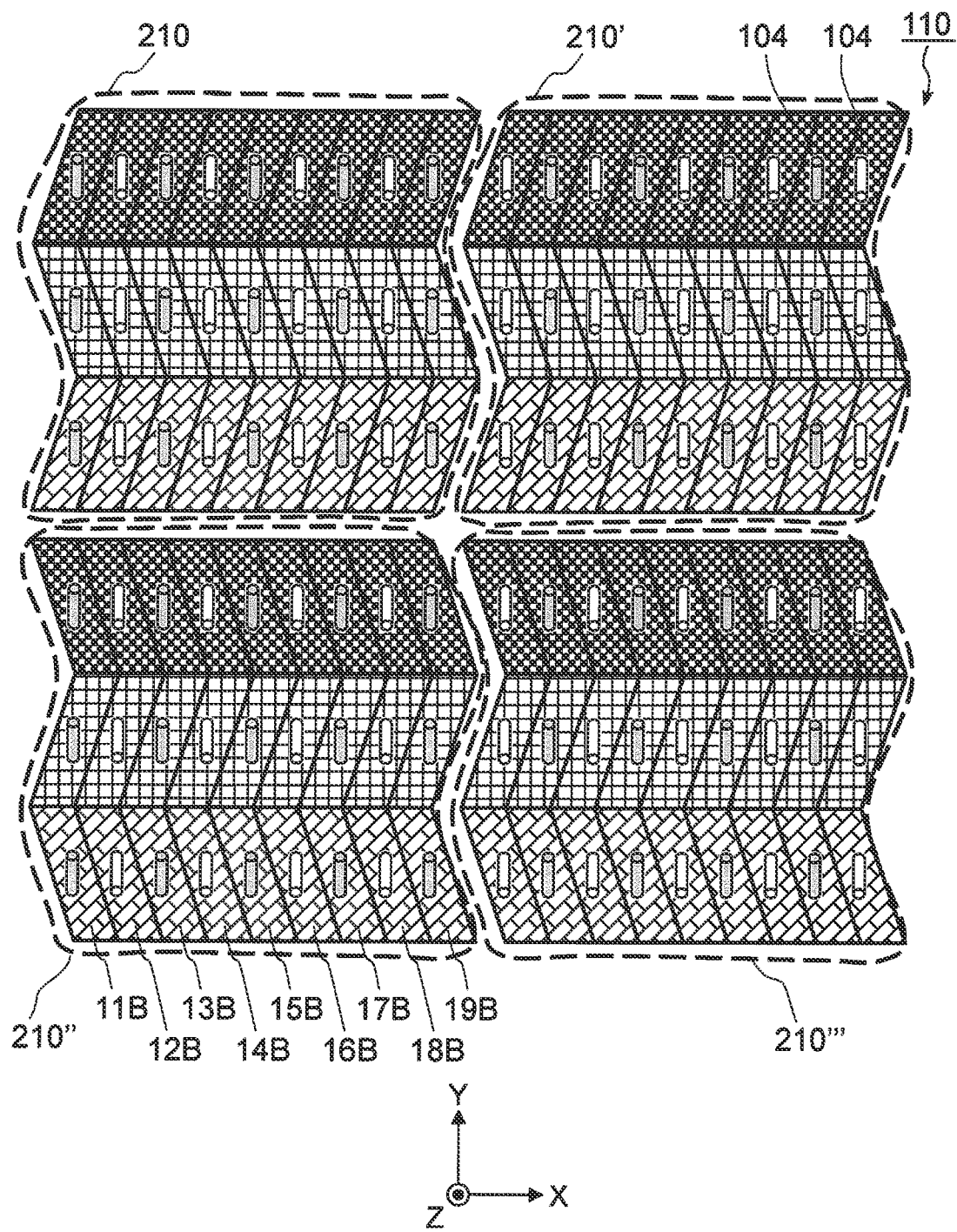
FIG. 62 is a plan view showing a liquid crystal display device according to Example 10.
Figure 63:
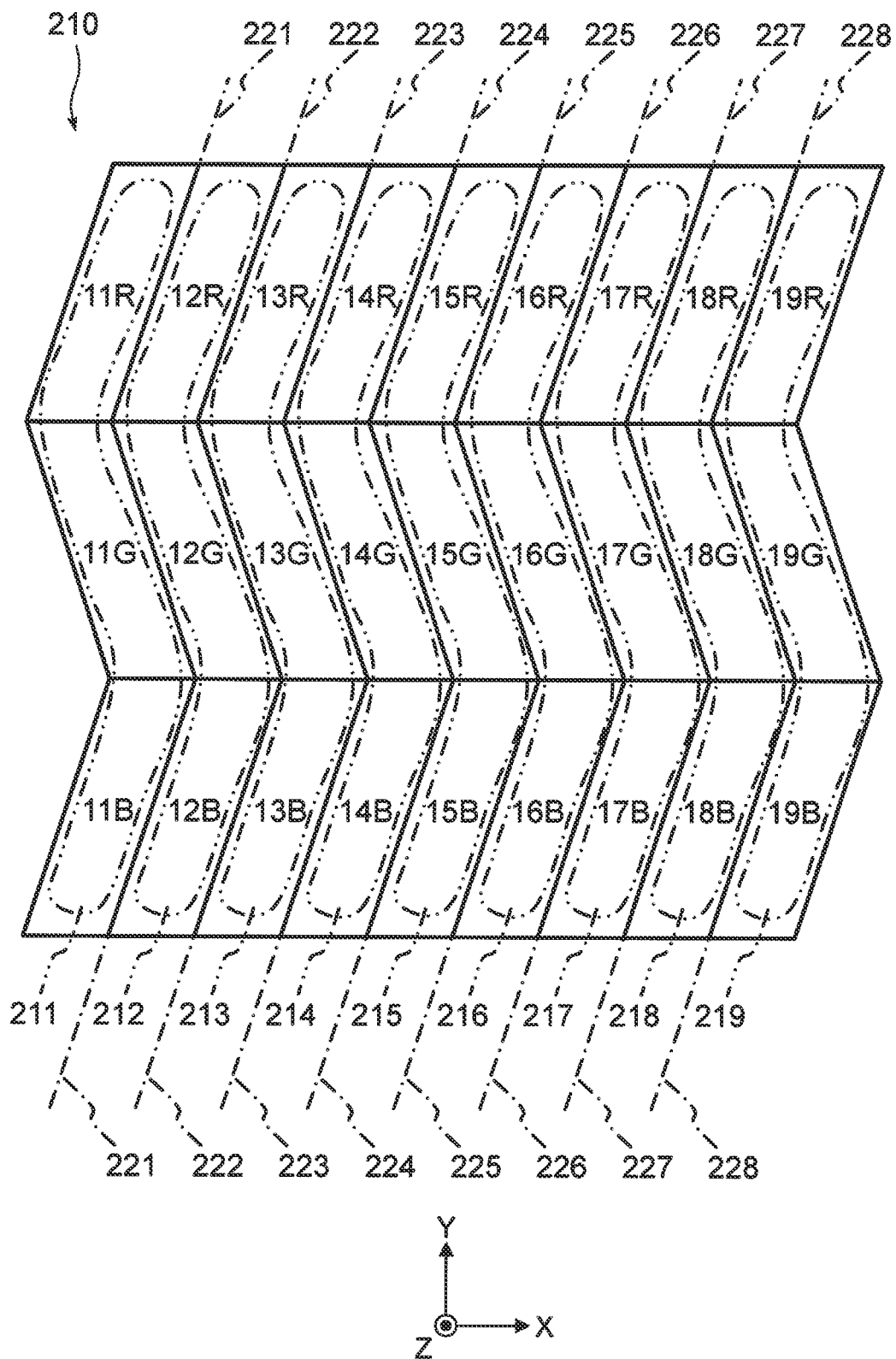
FIG. 63 is a schematic view showing a display unit of FIG. 62.

FIG. 62 is a plan view showing a liquid crystal display device according to Example 10. FIG. 63 is a schematic view showing a display unit of FIG. 62. Example 10 presents a 9-parallax liquid crystal display device that is a more concretive example of the liquid crystal display device according to the tenth exemplary embodiment. In FIG. 62 and FIG. 63, same reference numerals as those of the structural elements of FIG. 58 and FIG. 59 are used for the structural elements corresponding to those of FIG. 58 and FIG. 59.

In Example 10, each sub-pixel is in a substantially parallelogram shape. Further, the tilt of the parallelogram of the sub-pixels 11R, 12R, —, 19R is reversed from that of the parallelogram of the sub-pixels 11G, 12G, —, 19G. Thus, the tilt directions of the display unit 210 and the display unit 210' are the same. However, the tilt directions of the display unit 210" and the display unit 210''' where the columns of the Y direction are different are different from the tilt direction of the display unit 210 and the display unit 210'. In the meantime, the tilt directions of the liquid crystal in the sub-pixel for displaying a first-viewpoint image in the display unit 210 and the sub-pixel for displaying a first-viewpoint image in the display unit 210' are different by 180 degrees. As a result, in a combination of the tilt of the parallelogram pixels and the tilt directions of the liquid crystal, there are four kinds of display units from 210 to 210'''. In Example 10, the four kinds of display units as a set are arranged in matrix.

In Example 10, the neighboring sub-pixels for displaying images for different viewpoints compensate the characteristics of each other. Further, the display units neighboring to each other in the X-axis direction compensate the characteristics of each other. As a result, the characteristics shown in the tenth exemplary embodiment and the first exemplary embodiment can be achieved.

Example 11

Figure 64:
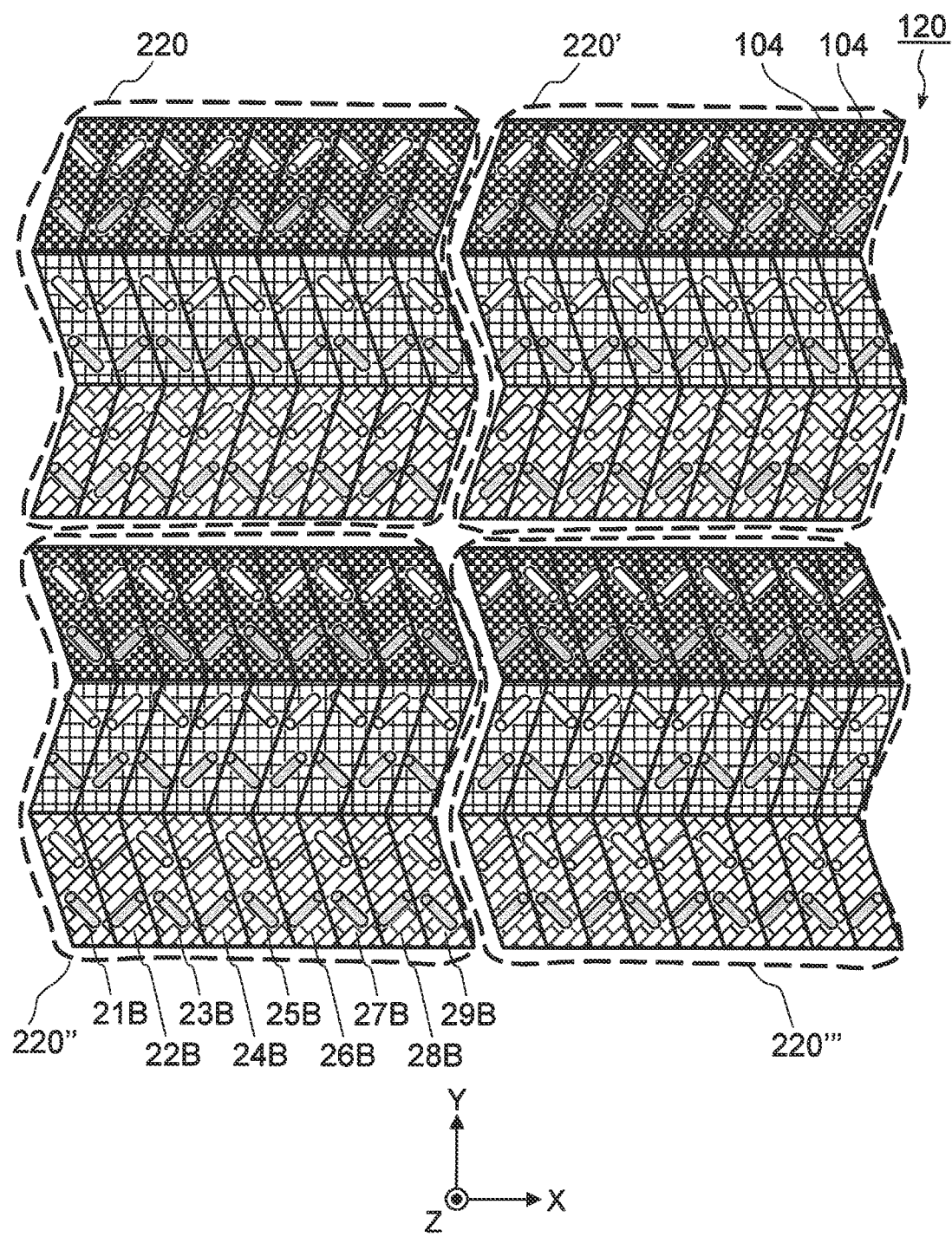
FIG. 64 is a plan view showing a liquid crystal display device according to Example 11.

FIG. 64 is a plan view showing a liquid crystal display device according to Example 11. FIG. 65 is a schematic view showing a display unit of FIG. 64. Example 11 presents a 9-parallax liquid crystal display device that is a more concretive example of the liquid crystal display device according to the eleventh exemplary embodiment. In FIG. 64 and FIG. 65, same reference numerals as those of the structural elements of FIG. 60 and FIG. 61 are used for the structural elements corresponding to those of FIG. 60 and FIG. 61.

In Example 11, each sub-pixel is in a substantially parallelogram shape. Further, the tilt of the parallelogram of the sub-pixels 21R, 22R, —, 29R is reversed from that of the parallelogram of the sub-pixels 21G, 22G, —, 29G. Thus, the tilt directions of the display unit 220 and the display unit 220' are the same. However, the tilt directions of the display unit 220" and the display unit 220'" where the columns of the Y direction are different are different from the tilt direction of the display unit 220 and the display unit 220'. In the meantime, the tilt directions of the liquid crystal in the sub-pixel for displaying a first-viewpoint image in the display unit 220 and the sub-pixel for displaying a first-viewpoint image in the display unit 220' are different by 180 degrees. As a result, in a combination of the tilt of the parallelogram pixels and the tilt directions of the liquid crystal, there are four kinds of display units from 220 to 220'". In Example 11, the four kinds of display units as a set are arranged in matrix.

In Example 11, the neighboring sub-pixels for displaying images for different viewpoints compensate the characteristics of each other. Further, the display units neighboring to each other in the X-axis direction compensate the characteristics of each other. As a result, the characteristics shown in the eleventh exemplary embodiment and the second exemplary embodiment can be achieved.

Example 12

Figure 66:
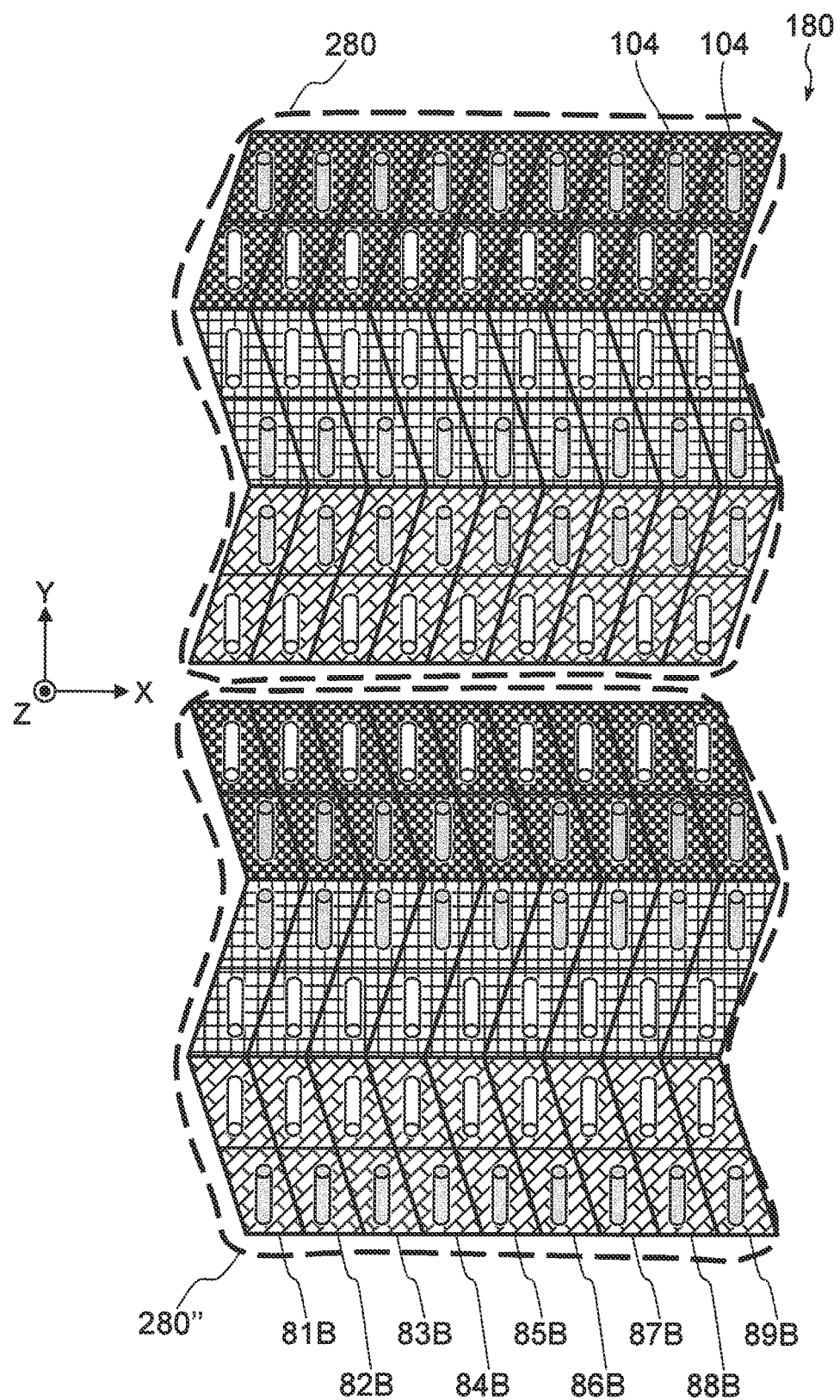
FIG. 66 is a plan view showing a liquid crystal display device according to Example 12.
Figure 67:
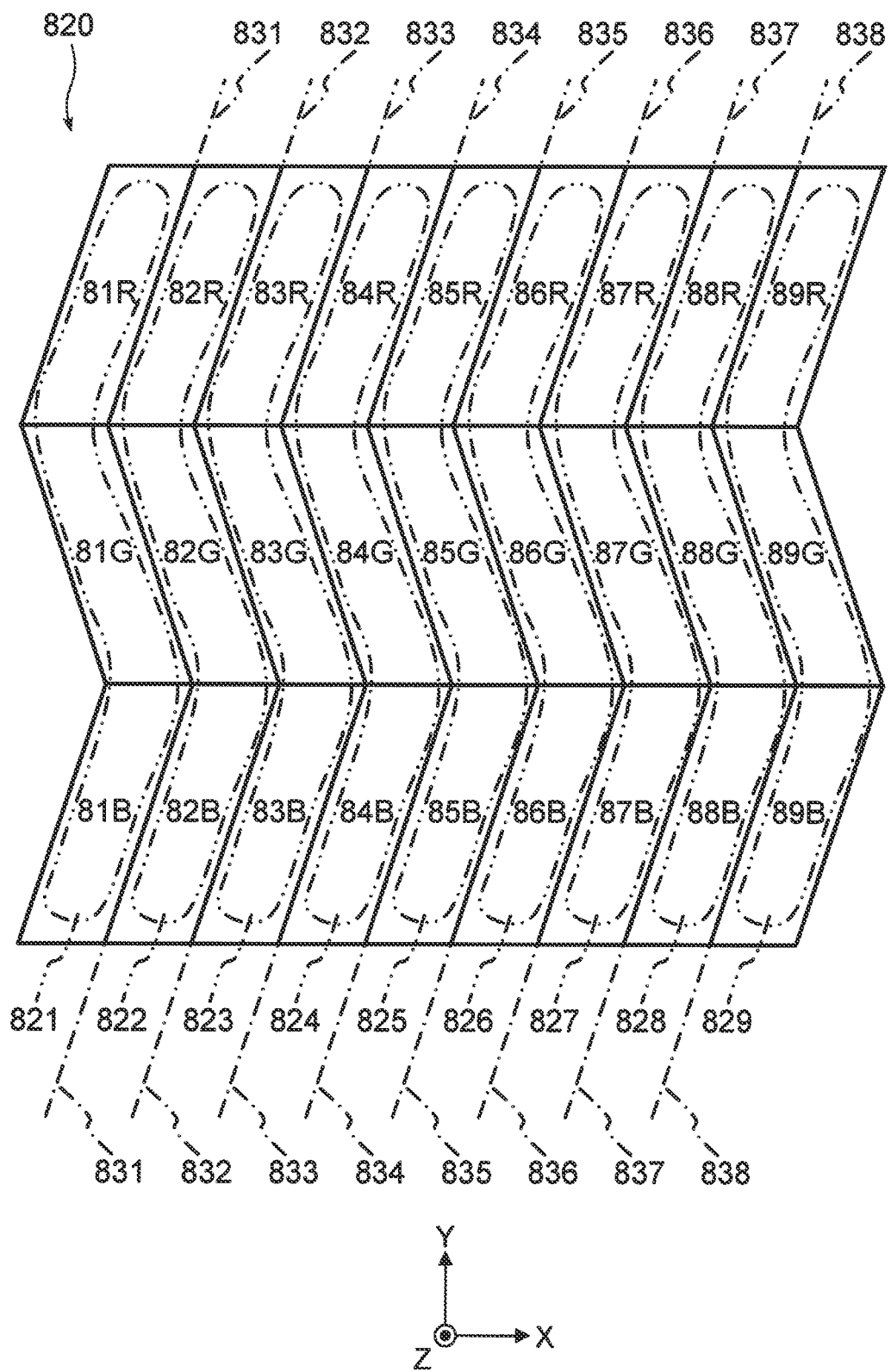
FIG. 67 is a schematic view showing a display unit of FIG. 66.

FIG. 66 is a plan view showing a liquid crystal display device according to Example 12. FIG. 67 is a schematic view showing a display unit of FIG. 66. Example 12 presents a 9-parallax liquid crystal display device that is a more concretive example of the liquid crystal display device according to the sixth exemplary embodiment. In FIG. 66, same reference numerals as those of the structural elements of FIG. 20 are used for the structural elements corresponding to those of FIG. 20.

In Example 12, each sub-pixel is in a substantially parallelogram shape. Further, the tilt of the parallelogram of the sub-pixels 81R, 82R, —, 89R is reversed from that of the parallelogram of the sub-pixels 81G, 82G, —, 89G. Thus, the tilt direction of the display unit 280 and that of the display unit 280' where the columns of the Y direction are different are different. In Example 12, the two kinds of display units as a set are arranged in matrix.

In Example 12, a sub-pixel for displaying an image for a given viewpoint is divided on the top and bottom sides (in the Y direction), and there are two regions where the tilt directions of the liquid crystal are different. In Example 12, the two regions where the tilt directions of the liquid crystal are different within the sub-pixel for displaying an image for a given viewpoint compensate the characteristics of each other. Further, the display units neighboring to each other in the Y direction compensate the characteristics of each other. As a result, the characteristic shown in the sixth exemplary embodiment can be achieved. In FIG. 67, reference numeral 820 shows the display unit 280 of FIG. 66, reference numerals 821 to 829 show the first to ninth pixels, and reference numerals 831 to 838 show the borders between each of the pixels.

Example 13

Figure 68:
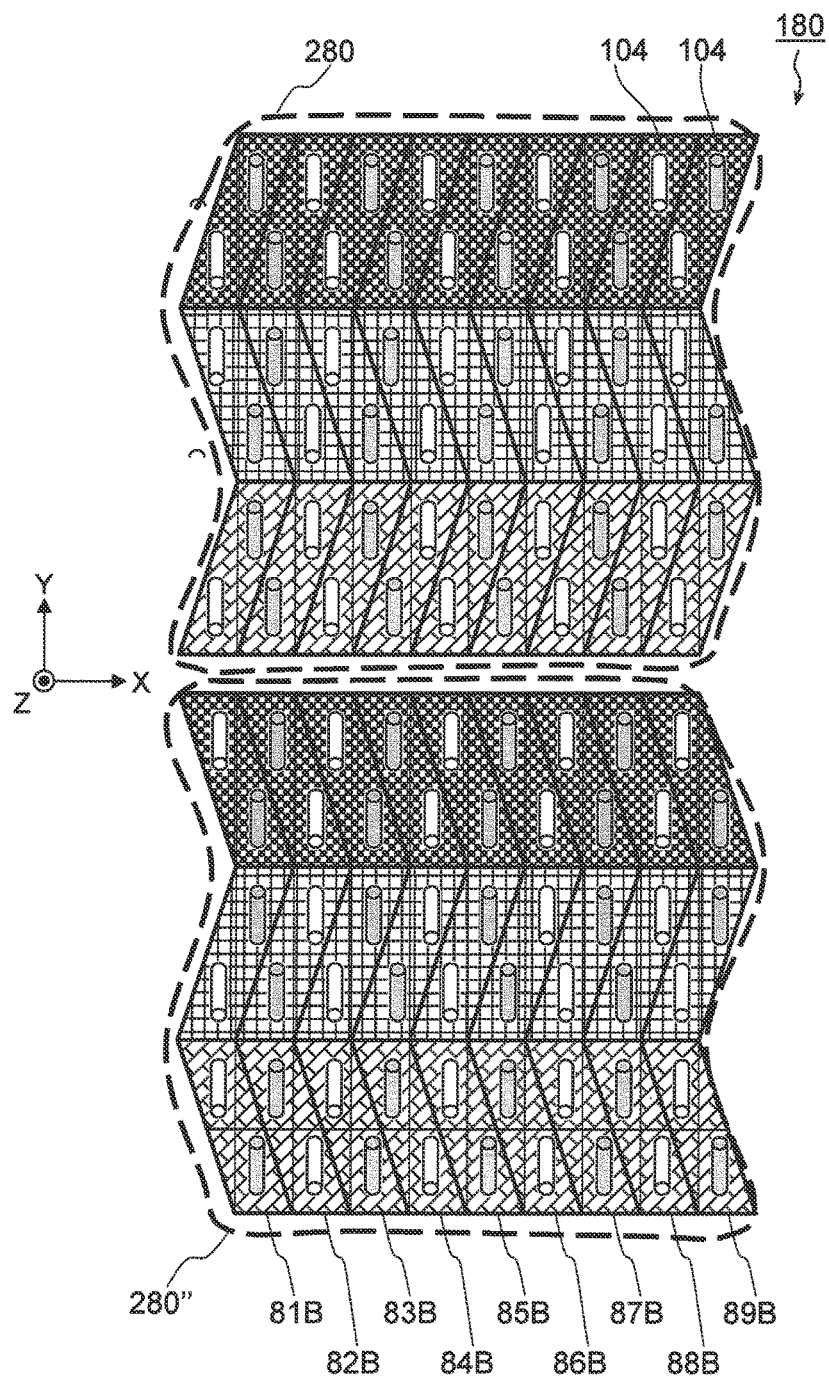
FIG. 68 is a plan view showing a liquid crystal display device according to Example 13.

FIG. 68 is a plan view showing a liquid crystal display device according to Example 13. A schematic view showing a display unit in FIG. 68 is the same as that of FIG. 67. Example 13 presents a 9-parallax liquid crystal display device that is a more concretive example of the liquid crystal display device according to the sixth exemplary embodiment. In FIG. 68, same reference numerals as those of the structural elements of FIG. 20 or FIG. 66 are used for the structural elements corresponding to those of FIG. 20 or FIG. 66.

In Example 13, each sub-pixel is in a substantially parallelogram shape. Further, the tilt of the parallelogram of the sub-pixels 81R, 82R, —, 89R is reversed from that of the parallelogram of the sub-pixels 81G, 82G, —, 89G. Thus, the tilt direction of the display unit 280 and that of the display unit 280' where the columns of the Y direction are different are different. In Example 13, the two kinds of display units as a set are arranged in matrix.

In Example 13, a sub-pixel for displaying an image for a given viewpoint is divided on the left and right sides (in the X direction), and there are two regions where the tilt directions of the liquid crystal are different. Further, the layout of the regions where the tilt directions of the liquid crystal are different is different between the neighboring sub-pixels. As a result, the regions where the tilt directions of the liquid crystal are different are formed in a vertically stripe form by goring over the unit of sub-pixel.

In Example 13, the two regions with different liquid crystal tilt directions within a sub-pixel for displaying an image for a given viewpoint compensate the characteristics of each other. Further, the display units neighboring to each other in the Y direction compensate the characteristics of each other. Furthermore, in Example 13, the regions with different liquid crystal alignment are arranged in a stripe form. Thus, depending on the method for making the regions with different liquid crystal alignment, it is easier to be manufactured than the case of Example 12.

In Example 13, the liquid crystal alignment region group arranged in the longitudinal direction is constituted with the liquid crystal alignment regions all facing in the same direction. As a result, it is possible to use a method which can simultaneously form the entire liquid crystal alignment regions arranged in the longitudinal direction when making the liquid crystal alignment regions, e.g., optical alignment which adjusts the alignment by radiating light to a specific region by using a mask extended in the longitudinal direction, mask rubbing which applies rubbing only on a specific region by using the same mask. Thus, it is a structure capable of acquiring a sufficient performance, even though the liquid crystal alignment regions can be easily made. Regarding the exemplary embodiments and Examples described above, there are gaps provided between the four display units 10 in FIG. 1. These are gaps provided for making it easy to comprehend the explanations, and the gap between the display units is considered the same as the gap between the sub-pixels. This applies not only in FIGS. 1A and 1B but also in FIGS. 6A and 6B, FIGS. 10A and 10B, FIG. 14 to FIG. 21, FIG. 25, FIG. 28, FIG. 32, FIG. 34, FIG. 36, FIG. 39, FIG. 41, and the like in common.

The sub-pixel 11 and the like shown in the exemplary embodiments and Examples can be combined with color filters. For example, 11R can be combined with a color filter of red (R), 11G can be combined with a color filter of green (G), and 11B can be combined with a color filter of blue (B). This makes it possible to provide a color display. The combinations of the sub-pixels and the color filters can be changed as necessary. Further, it is also possible to achieve a color display by using methods of coloring or developing colors other than using the color filters.

In the exemplary embodiments and Examples described above, the structures where the same-color regions are arranged in a longitudinal or lateral stripe form are illustrated regarding classification of color filters and the like. As classification of colors, those regions are not arranged only in the stripe form but may be arranged in other forms as well. However, in the case of employing the stripe form, it is easy to fabricate the color classification structure in terms of processing steps. Further, regarding the pattern shift and the like, it simply needs to consider only the shift in the direction (e.g., X direction) where the stripe of different color is arranged and the shift in another direction (e.g., Y direction) gives almost no influence on the characteristic.

Application Example

Figure 49A:
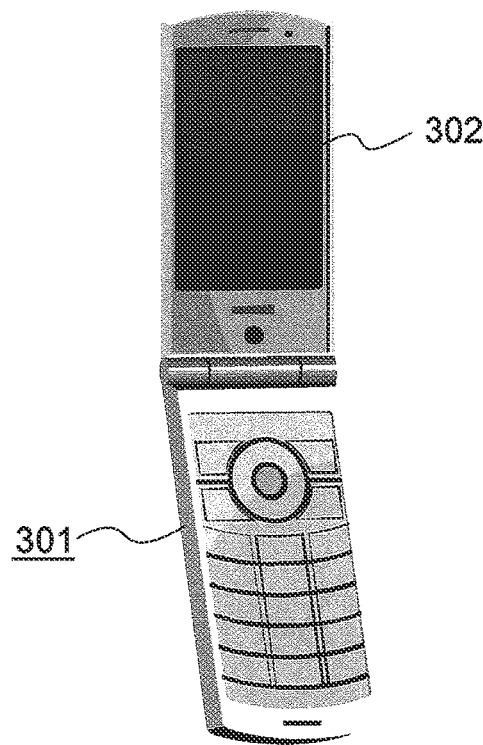
FIG. 49A is an external view showing a mobile phone using the liquid crystal display device of each exemplary embodiment.
Figure 49B:
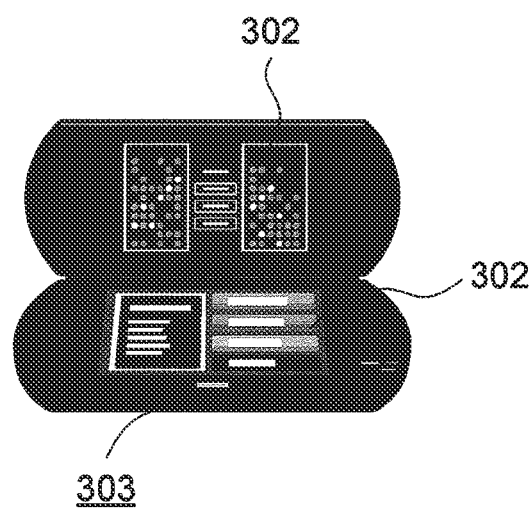
FIG. 49B is an external view showing a mobile game machine using the liquid crystal display device of each exemplary embodiment.
Figure 50:
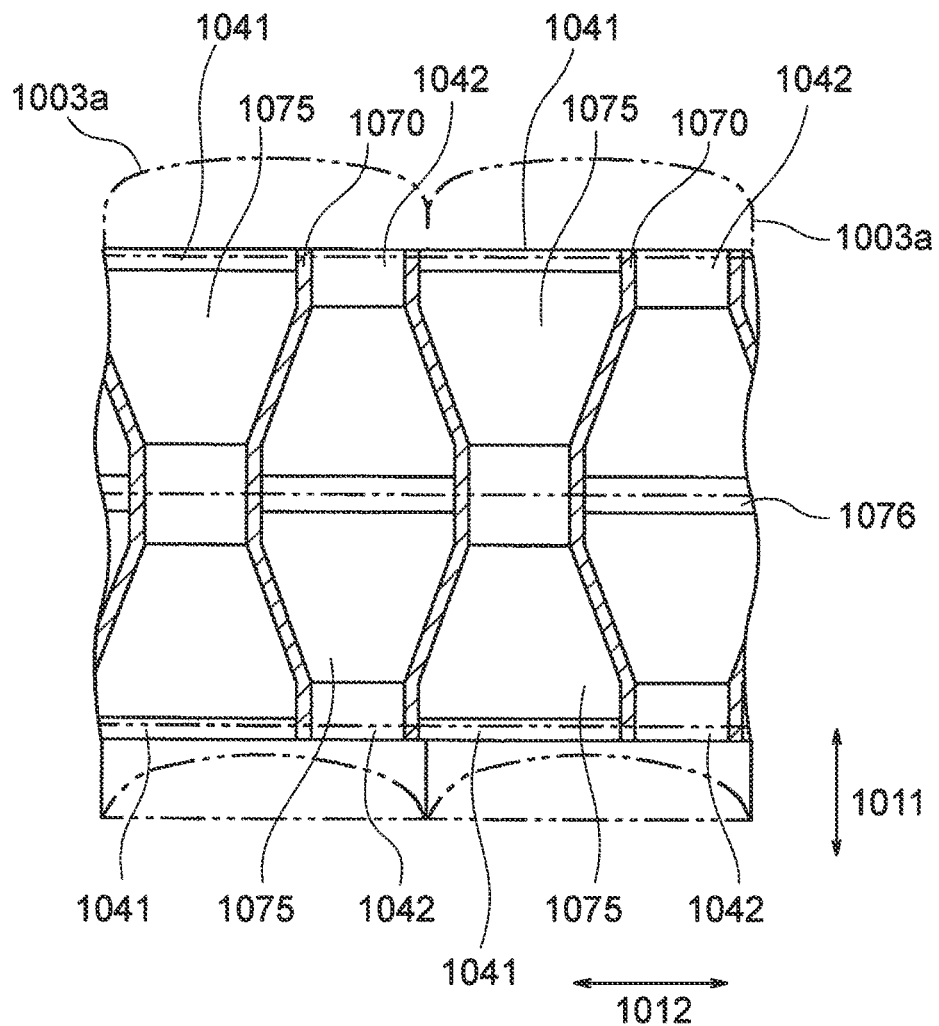
FIG. 50 is a plan view showing pixels of a stereoscopic image display device of Patent Document 1.
Figure 51:
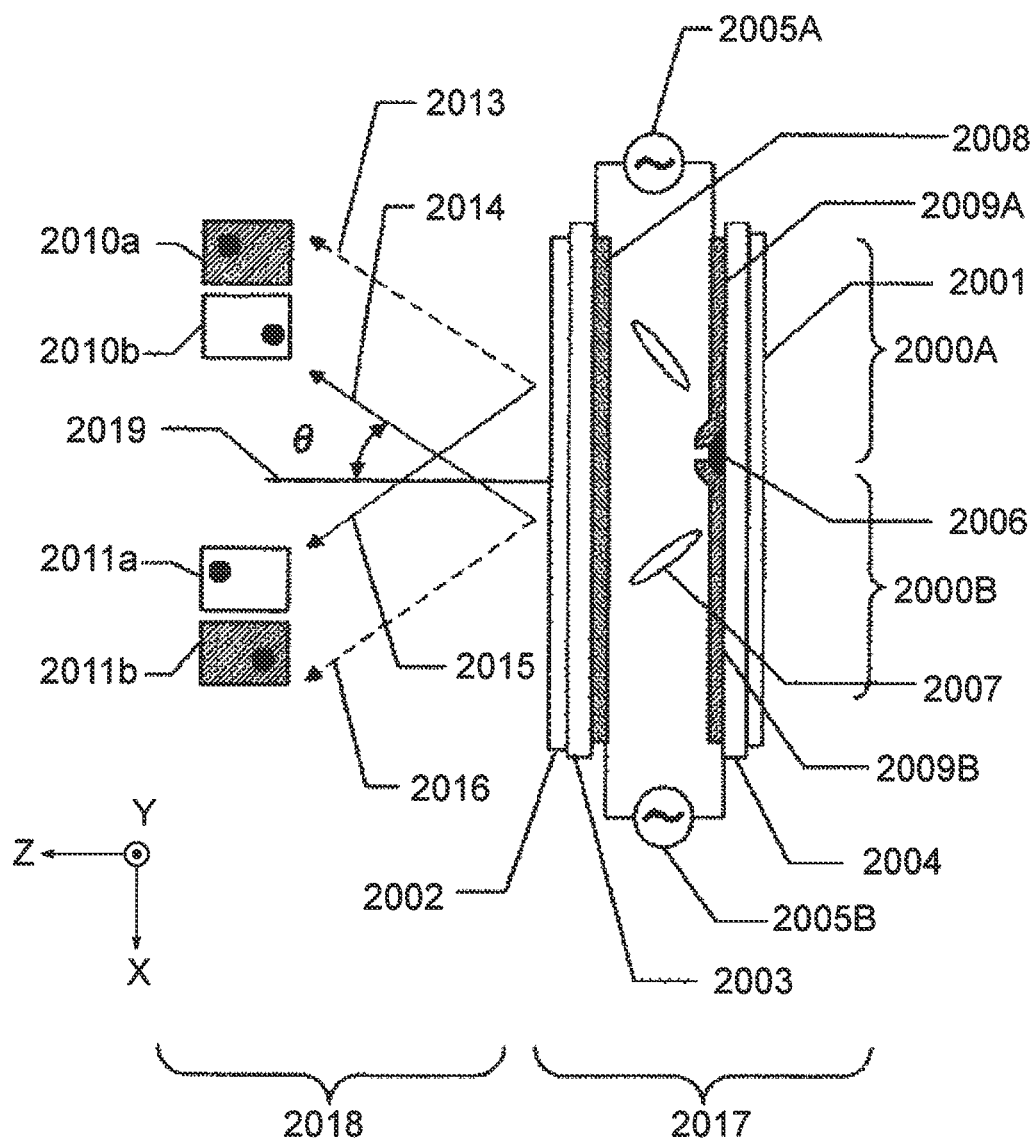
FIG. 51 is a lateral sectional view showing a stereoscopic image display device of Patent Document 2.
Figure 52:
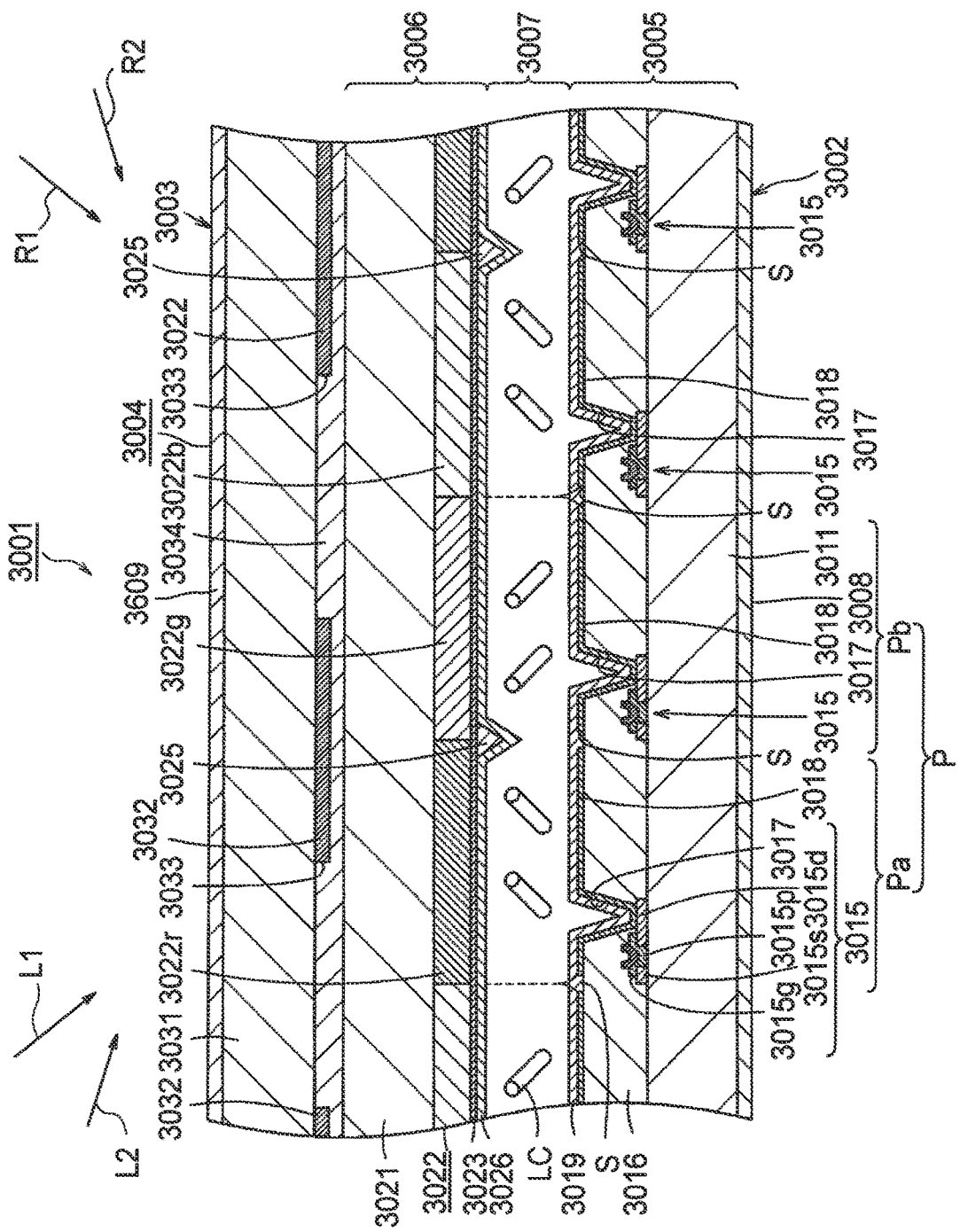
FIG. 52 is a longitudinal sectional view showing a part of a multiple view display of Patent Document 3.
Figure 53A:
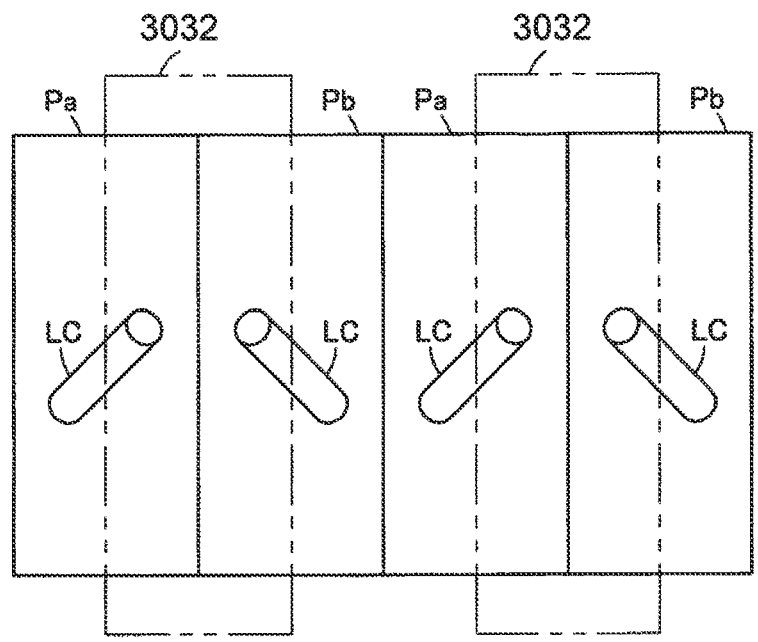
FIG. 53A is a plan view showing a part of the multiple view display FIG. 52.
Figure 53B:
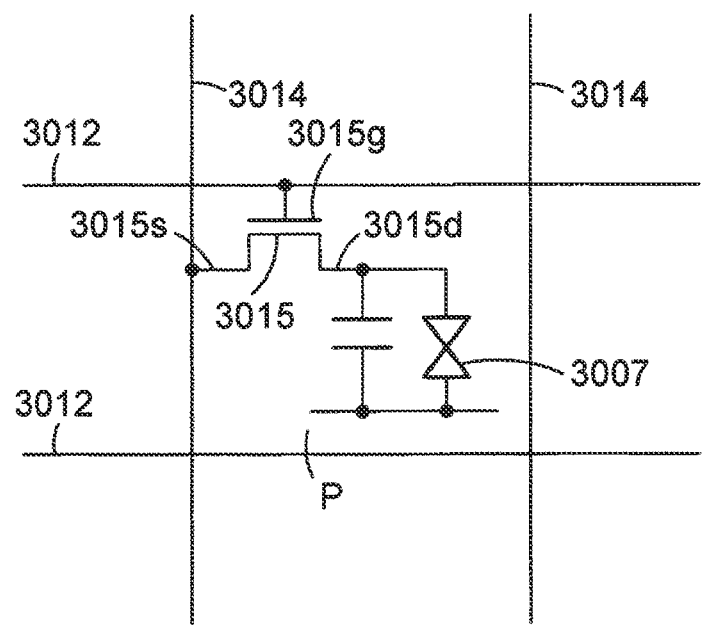
FIG. 53B is an equivalent circuit diagram showing a part of the multiple view display of FIG. 52.

The liquid crystal display devices according to each of the exemplary embodiments can be preferably utilized for usages which require high definition, such as mobile phones and mobile game machines. In a mobile phone 301 shown in FIG. 49A, a liquid crystal display device 302 according to each exemplary embodiment is provided on one of the inner side of a foldable casing, for example. Further, the left-and-right direction and the like mentioned in this Specification are set in accordance with the observing direction of the user. That is, when the observer uses the top-and-bottom direction of FIG. 49A as the top-and-bottom direction, the top-and-bottom direction of FIG. 49A is set to match the top-and-bottom direction of this Specification. In the meantime, when the observer sues the left-and-right direction of FIG. 49A as the top-and-bottom direction, the top-and-bottom direction of FIG. 49A is set to match the left-and-right direction of this Specification. By doing such direction setting, the observer can always observe a fine display. Meanwhile, in a mobile game machine 303 shown in FIG. 49B, the liquid crystal display device 302 of each exemplary embodiment may be placed on both of the two display devices or may be placed only on one of those.

Supplementary Explanations

In the explanations provided heretofore, a method for forming regions where the tilt directions of the liquid crystal are different is not specifically depicted. However, various kinds of methods can be used for that. That is, such regions can be formed by providing a protrusion part projected inside the liquid crystal layer form the substrate face or by forming a recessed part that partially widens the space between the substrates by a structure on the substrate. Further, the direction of electric field is controlled by providing a cut, a slit, or a protrusion part when viewed two dimensionally in the pixel electrode, counter electrode, gate line, data line, the storage capacitance line, and the like. Furthermore, it is also possible to use processing with which the directions of the initial alignment on the substrate surface become different, e.g., a mask rubbing method which applies rubbing by using a mask in different directions for a plurality of times, a method for making a plurality of initial alignment directions by using the alignment direction control using light, an alignment control by using a nano-structure for controlling the alignment direction by making a minute structure of smaller than microns, and the like. Such various kinds of methods can be used alone or in combinations.

In the explanations provided heretofore, the barrier layer is employed as the element for distributing light. However, the element is not limited only to that. For example, it is also possible to use a lenticular lens where a plurality of cylindrical lenses each having an arc-shape protrusion section are arranged one dimensionally. Further, it is also possible to use a fly-eye lens.

The cylindrical lens does not exhibit the lens effect in its extending direction but exhibits the lens effect only in the direction orthogonal to the extending direction. When the cylindrical lens is used for the present invention, the direction exhibiting the lens effect is combined with the left-and-right direction of the present invention. Further, as necessary, the direction exhibiting the lens effect may be directed to the direction that is tilted by a prescribed angle from the left-and-right direction of the present invention.

Further, regarding the lenticular lens used for the present invention, there may be a case where the processing accuracy of the lens hollow sections is lower than that of the lens convex sections. That is, it is difficult to process the hollow sections where the cylindrical lenses are disposed continuously, so that the accuracy thereof becomes poor. As a result, the light separating performance in the lens hollow sections is deteriorated compared to the light separating performance in the lens convex sections. Thus, the light passed through the lens hollow sections is largely defocused. In the meantime, the light separating performance is high on the lens main axis in the lens convex sections, so that it is possible to provide a stereoscopic display where both 3D moire and 3D crosstalk can be suppressed.

The structure of the present invention can also be expressed as follows. The present invention is a display device in which the liquid crystal is initially aligned almost vertically to the substrate, and display unit each including the sub-pixel for displaying the first-viewpoint image and the sub-pixel for displaying the second viewpoint image are arranged in matrix. Further, the tilt directions of the liquid crystal when a voltage is applied are different by 180 degrees between the sub-pixel for displaying the first-viewpoint image and the sub-pixel for displaying the second-viewpoint image. Furthermore, the tilt directions of the liquid crystal are within a plane that is in parallel to the border between the sub-pixel for displaying the first-viewpoint image and the sub-pixel for displaying the second-viewpoint image within the display unit.

The effects of the present invention can also be expressed as follows. The alignment directions of the liquid crystal are different between the sub-pixels, and the alignment directions of the liquid crystal within the sub-pixels are varied in such a manner that the viewing angle characteristics of the transmittance are well-balanced in the direction along which the sub-pixels are arranged. Thus, it is possible to achieve the vertical alignment liquid crystal display device of a wide viewing angle and high-definition image, while suppressing the influences of 3D crosstalk and 3D moire to minimum. It is possible to achieve the image display of a wide viewing angle and high-definition not only in the light distributing direction but also in the directions different from the light distributing direction.

While the present invention has been described above by referring to each of the exemplary embodiments, the present invention is not limited only to each of those exemplary embodiments. Various changes and modifications occurred to those skilled in the art can be applied to the structures and details of the present invention. Further, the present invention includes combinations of a part of or a whole part of the structures of each of the above-described embodiments. A part of or a whole part of the exemplary embodiments disclosed above can be expressed by the contents depicted in following Supplementary Notes. However, it is to be noted that the present invention is not limited to those structures described below.

(Supplementary Note 1) First Exemplary Embodiment (FIGS. 1A and 1B)

A liquid crystal display device which includes a liquid crystal exhibiting negative dielectric anisotropy sandwiched between a pair of substrates, wherein liquid crystal molecules constituting the liquid crystal are initially aligned almost vertically to the pair of substrates, and display units each including at least a first pixel for displaying a first-viewpoint image and a second pixel for displaying a second-viewpoint image are arranged in matrix, wherein tilt directions of the liquid crystal molecules when a voltage is applied are within a plane that is in parallel to a border between the first pixel and the second pixel, and are different from each other by 180 degrees between the first pixel and the second pixel.

(Supplementary Note 2) Higher-Order Concept of Second and Third Exemplary Embodiment A liquid crystal display device which includes a liquid crystal exhibiting negative dielectric anisotropy sandwiched between a pair of substrates, wherein liquid crystal molecules constituting the liquid crystal are initially aligned almost vertically to the pair of substrates, and display units each including at least a first pixel for displaying a first-viewpoint image and a second pixel for displaying a second-viewpoint image are arranged in matrix, wherein: the first pixel and the second pixel are constituted with a plurality of sub-pixels, respectively; the sub-pixel is constituted with a first domain and a second domain; and tilt directions of the liquid crystal molecules when a voltage is applied are within a plane that is at an angle of 45 degrees to a border between the first pixel and the second pixel, are different from each other by 90 degrees between the first pixel and the second pixel, and are different from each other by 180 degrees between the first domain and the second domain.

(Supplementary Note 3) Second Exemplary Embodiment (FIGS. 6A and 6B)

The liquid crystal display device as depicted in Supplementary Note 2, wherein: the sub-pixels constituting the first pixel and the sub-pixels constituting the second pixel are arranged in a direction in parallel to the border, respectively; and the first domain and the second domain constituting the sub-pixel are arranged in a direction vertical to the border.

(Supplementary Note 4) Third Exemplary Embodiment (FIGS. 10A and 10B)

The liquid crystal display device as depicted in Supplementary Note 2, wherein: the sub-pixels constituting the first pixel and the sub-pixels constituting the second pixel are arranged in a direction vertical to the border, respectively; and the first domain and the second domain constituting the sub-pixel are arranged in a direction in parallel to the border.

(Supplementary Note 5) Fourth Exemplary Embodiment (FIG. 14)

The liquid crystal display device as depicted in Supplementary Note 3, wherein the tilt directions of the liquid crystal molecules when a voltage is applied are different from each other by 90 degrees between the display units neighboring to each other in the direction in parallel to the border.

(Supplementary Note 6) Fifth Exemplary Embodiment (FIG. 16)

The liquid crystal display device as depicted in Supplementary Note 4, wherein the tilt directions of the liquid crystal molecules when a voltage is applied are different from each other by 90 degrees between the display units neighboring to each other in the direction in parallel to the border.

(Supplementary Note 7) Sixth Exemplary Embodiment (FIG. 17)

The liquid crystal display device as depicted in Supplementary Note 5, wherein the tilt directions of the liquid crystal molecules when a voltage is applied are different from each other by 180 degrees between the display units neighboring to each other in the direction vertical to the border.

(Supplementary Note 8) Seventh Exemplary Embodiment (FIG. 19)

The liquid crystal display device as depicted in Supplementary Note 6, wherein the tilt directions of the liquid crystal molecules when a voltage is applied are different from each other by 180 degrees between the display units neighboring to each other in the direction vertical to the border.

(Supplementary Note 9) Eighth Exemplary Embodiment (FIG. 20)

The liquid crystal display device as depicted in Supplementary Note 1, wherein the tilt directions of the liquid crystal molecules when a voltage is applied are different from each other by 180 degrees between the first pixels and the second pixels neighboring to each other in the direction in parallel to the border.

(Supplementary Note 10) Ninth Exemplary Embodiment (FIG. 21)

A liquid crystal display device which includes a liquid crystal exhibiting negative dielectric anisotropy sandwiched between a pair of substrates, wherein liquid crystal molecules constituting the liquid crystal are initially aligned almost vertically to the pair of substrates, and display units each including at least a first pixel for displaying a first-viewpoint image and a second pixel for displaying a second-viewpoint image are arranged in matrix, wherein: tilt directions of the liquid crystal molecules when a voltage is applied are within a plane that is at an angle of 45 degrees to a border between the first pixel and the second pixel, are different from each other by 180 degrees between the first pixel and the second pixel, and are different from each other by 180 degrees between the first pixels and between the second pixels neighboring to each other in a direction in parallel to the border, respectively.

Supplementary Note 11

The liquid crystal display device as depicted in any one of Supplementary Notes 1 to 4, wherein an external shape of the display unit is a square.

Supplementary Note 12

The liquid crystal display device as depicted in any one of Supplementary Notes 1 to 10, which further includes an optical element for distributing light from the first pixel and light from the second pixel to different directions.

Supplementary Note 13

The liquid crystal display device as depicted in any one of Supplementary Notes 1 to 12, wherein the neighboring display units compensate transmittance viewing angle characteristics of each other.

Supplementary Note 14

The liquid crystal display device as depicted in any one of Supplementary Notes 1 to 13, wherein the first-viewpoint image and the second-viewpoint image are set to be a same image for enabling a 2D image display.

Supplementary Note 15

A liquid crystal display device which includes an optical element for distributing light from each sub-pixel of a display unit constituted with a plurality of sub-pixels in different directions within a plane that includes a direction along which the sub-pixels are arranged, wherein: liquid crystal alignment directions are different between each of the sub-pixels; and the liquid crystal alignment directions within the sub-pixels are set to be different in such a manner that transmittance viewing angle characteristics in a direction along which the sub-pixels are arranged become symmetric.

Supplementary Note 16

A liquid crystal display device which includes an optical element for distributing light from each sub-pixel of a display unit constituted with a plurality of sub-pixels in different directions within a plane that includes a direction along which the sub-pixels are arranged, wherein: liquid crystal alignment directions are different between each of the arranged sub-pixels; and at least a pair of sub-pixels among the arranged sub-pixels compensate transmittance viewing angle characteristics of each other.

(Supplementary Note 17) Tenth Exemplary Embodiment (FIG. 58)

A liquid crystal display device which includes a liquid crystal exhibiting negative dielectric anisotropy sandwiched between a pair of substrates, wherein liquid crystal molecules constituting the liquid crystal are initially aligned almost vertically to the pair of substrates, n is an integer of 3 or larger, and display units each including at least n-pieces of pixels from a first pixel for displaying a first-viewpoint image, a second pixel for displaying a second-viewpoint image, to an n-th pixel for displaying an n-th viewpoint image are arranged in matrix, wherein tilt directions of the liquid crystal molecules when a voltage is applied are within a plane that is in parallel to an average direction along which a plurality of borders between the first pixel and the second pixel neighboring thereto are arranged, and are different from each other by 180 degrees between the first pixel and the neighboring second pixel.

(Supplementary Note 18) Eleventh Exemplary Embodiment (FIG. 60)

A liquid crystal display device which includes a liquid crystal exhibiting negative dielectric anisotropy sandwiched between a pair of substrates, wherein liquid crystal molecules constituting the liquid crystal are initially aligned almost vertically to the pair of substrates, n is an integer of 3 or larger, and display units each including at least n-pieces of pixels from a first pixel for displaying a first-viewpoint image, a second pixel for displaying a second-viewpoint image, to an n-th pixel for displaying an n-th viewpoint image are arranged in matrix, wherein: the first to n-th pixels are constituted with a plurality of sub-pixels, respectively; the sub-pixel is constituted with a first domain and a second domain; and tilt directions of the liquid crystal molecules when a voltage is applied are within a plane that is at an angle of 45 degrees with respect to an average direction along which a plurality of borders between the first pixel and the second pixel neighboring thereto are arranged, are different from each other by 90 degrees between the first pixel and the neighboring second pixel, and are different by 180 degrees between the first domain and the second domain.

(Supplementary Note 21) First Exemplary Embodiment (FIGS. 1A and 1B)

A liquid crystal display device which includes a liquid crystal exhibiting negative dielectric anisotropy sandwiched between a pair of substrates, wherein liquid crystal molecules constituting the liquid crystal are initially aligned almost vertically to the pair of substrates, and display units each including at least a sub-pixel for displaying a first-viewpoint image and a sub-pixel for displaying a second-viewpoint image are arranged in matrix, wherein tilt directions of the liquid crystal molecules when a voltage is applied are different between the sub-pixel for displaying the first-viewpoint image and the sub-pixel for displaying the second-viewpoint image, and are within a plane that is in parallel to a border between the sub-pixel for displaying the first-viewpoint image and the sub-pixel for displaying the second-viewpoint image.

(Supplementary Note 22) Second Exemplary Embodiment (FIGS. 6A and 6B)

A liquid crystal display device which includes a liquid crystal exhibiting negative dielectric anisotropy sandwiched between a pair of substrates, wherein liquid crystal molecules constituting the liquid crystal are initially aligned almost vertically to the pair of substrates, and display units each including at least a sub-pixel for displaying a first-viewpoint image and a sub-pixel for displaying a second-viewpoint image are arranged in matrix, wherein: the sub-pixel for displaying the first-viewpoint image and the sub-pixel for displaying the second-viewpoint image include a plurality of regions, respectively; and tilt directions of the liquid crystal molecules when a voltage is applied are different from each other by 180 degrees between the plurality of regions, and are within a plane that is at an angle of 45 degrees with respect to a border between the sub-pixel for displaying the first-viewpoint image and the sub-pixel for displaying the second-viewpoint image.

(Supplementary Note 23) Third Exemplary Embodiment (FIGS. 10A and 10B)

A liquid crystal display device which includes a liquid crystal exhibiting negative dielectric anisotropy sandwiched between a pair of substrates, wherein liquid crystal molecules constituting the liquid crystal are initially aligned almost vertically to the pair of substrates, and display units each including at least a pixel for displaying a first-viewpoint image and a pixel for displaying a second-viewpoint image are arranged in matrix, wherein: in each of the pixels of the display unit, tilt directions of the liquid crystal when a voltage is applied are different by 180 degrees; the pixel for displaying the first-viewpoint image and the pixel for displaying the second-viewpoint image include a plurality of sub-pixels, respectively; and tilt directions of the liquid crystal molecules when a voltage is applied are different from each other by 180 degrees between the plurality of pixels, and are within a plane that is at an angle of 45 degrees with respect to a border between the pixel for displaying the first-viewpoint image and the pixel for displaying the second-viewpoint image.

(Supplementary Note 24) Fourth Exemplary Embodiment (FIG. 14)

The liquid crystal display device as depicted in Supplementary Note 22, which includes a first display unit and a second display unit as the display unit, wherein: the first display unit and the second display unit are alternately and repeatedly arranged in a direction in parallel to the border; and the tilt directions of the liquid crystal are different from each other by 90 degrees between the plurality of regions.

(Supplementary Note 25) Sixth Exemplary Embodiment (FIG. 17)

The liquid crystal display device as depicted in Supplementary Note 24, which further includes a third display unit and a fourth display unit as the display unit, wherein: the first display unit and the third display unit are alternately and repeatedly arranged in a direction orthogonal to the border, and the tilt directions of the liquid crystal are different from each other by 180 degrees between the plurality of regions; and the second display unit and the fourth display unit are alternately and repeatedly arranged in a direction orthogonal to the border, and the tilt directions of the liquid crystal are different from each other by 180 degrees between the plurality of regions.

(Supplementary Note 26) Fifth Exemplary Embodiment (FIG. 15)

The liquid crystal display device as depicted in Supplementary Note 23, which includes a first display unit and a second display unit as the display unit, wherein: the first display unit and the second display unit are alternately and repeatedly arranged in a direction in parallel to the border; and the tilt directions of the liquid crystal are different from each other by 90 degrees between the plurality of regions.

(Supplementary Note 27) Seventh Exemplary Embodiment (FIG. 19)

The liquid crystal display device as depicted in Supplementary Note 26, which further includes a third display unit and a fourth display unit as the display unit, wherein: the first display unit and the third display unit are alternately and repeatedly arranged in a direction orthogonal to the border, and the tilt directions of the liquid crystal are different from each other by 180 degrees between the plurality of regions; and the second display unit and the fourth display unit are alternately and repeatedly arranged in a direction orthogonal to the border, and the tilt directions of the liquid crystal are different from each other by 180 degrees between the plurality of regions.

Supplementary Note 28

The liquid crystal display device as depicted in Supplementary Note 21 or 22, wherein an external shape of the display unit is a square.

Supplementary Note 29

The liquid crystal display device as depicted in any one of Supplementary Notes 21 to 28, which further includes an optical element for distributing light from the pixel for displaying the first-viewpoint image and light from the pixel for displaying the second-viewpoint image to different directions.

Supplementary Note 30

A liquid crystal display device which includes an optical element for distributing light from each sub-pixel of a display unit constituted with a plurality of sub-pixels in different directions within a plane that includes a direction along which the sub-pixels are arranged, wherein: liquid crystal alignment directions are different between each of the sub-pixels; and the liquid crystal alignment directions within the sub-pixels are set to be different in such a manner that transmittance viewing angle characteristics in a direction along which the sub-pixels are arranged become well-balanced.

Supplementary Note 31

A liquid crystal display device which includes an optical element for distributing light from each sub-pixel of a display unit constituted with a plurality of sub-pixels in different directions within a plane that includes a direction along which the sub-pixels are arranged, wherein: liquid crystal alignment directions are different between each of the arranged sub-pixels; and at least a pair of sub-pixels among the arranged sub-pixels compensate transmittance viewing angle characteristics of each other.

Supplementary Note 32

The liquid crystal display device as depicted in any one of Supplementary Notes 21 to 31, wherein the neighboring display units compensate transmittance viewing angle characteristics of each other.

Supplementary Note 33

The liquid crystal display device as depicted in any one of Supplementary Notes 21 to 32, wherein the first-viewpoint image and the second-viewpoint image are set to be a same image for enabling a 2D image display.

The present invention can be used for a liquid crystal display device which displays images different from each other towards a plurality of viewpoints.

What is claimed is:

1. A liquid crystal display device comprising a liquid crystal exhibiting negative dielectric anisotropy sandwiched between a pair of substrates, wherein liquid crystal molecules constituting the liquid crystal are initially aligned almost vertically to the pair of substrates, and display units each including at least a first pixel for displaying a first-viewpoint image and a second pixel for displaying a second-viewpoint image are arranged in a matrix, wherein:

the liquid crystal display device further comprises an optical element for distributing light from the first pixel and light from the second pixel to different directions;

the first pixel and the second pixel are constituted with a plurality of sub-pixels, respectively;

the sub-pixel is constituted with a first domain and a second domain;

tilt directions of the liquid crystal molecules when a voltage is applied are within a plane that is at an angle of 45 degrees to a border between the first pixel and the second pixel, are different from each other by 90 degrees between the first pixel and the second pixel, and are different from each other by 180 degrees between the first domain and the second domain;

the sub-pixels constituting the first pixel and the sub-pixels constituting the second pixel are arranged in a direction in parallel to the border, respectively; and the first domain and the second domain constituting the sub-pixel are arranged in a direction vertical to the border.

2. The liquid crystal display device as claimed in claim 1, wherein the tilt directions of the liquid crystal molecules when a voltage is applied are different from each other by 90 degrees between the display units neighboring to each other in the direction in parallel to the border.

3. The liquid crystal display device as claimed in claim 2, wherein the tilt directions of the liquid crystal molecules when a voltage is applied are different from each other by 180 degrees between the display units neighboring to each other in the direction vertical to the border.

* * * * *